US012230143B1

(12) United States Patent
Riley et al.

(10) Patent No.: US 12,230,143 B1
(45) Date of Patent: Feb. 18, 2025

(54) # CONTINUOUS REMOTE MAINTENANCE AND MONITORING OF RADIO EQUIPMENT IN AN AIR TRAFFIC MANAGEMENT ENVIRONMENT

(71) Applicant: The United States of America, as represented by the Administrator of the Federal Aviation Administration, Atlantic City Airport, NJ (US)

(72) Inventors: Paul Christopher Riley, Oklahoma City, OK (US); Eli Velazquez, Jr., Oaklohoma City, OK (US); Jessica Anne Horner, Warr Acres, OK (US); Tyler Joseph Darr, Saint Joseph, OK (US)

(73) Assignee: The United States of America, as represented by the Administrator of the Federal Aviation Administration, Washington, DC (US)

( * ) Notice: Subject to any disclaimer, the term of this patent is extended or adjusted under 35 U.S.C. 154(b) by 0 days.

(21) Appl. No.: 18/785,175

(22) Filed: Jul. 26, 2024

Related U.S. Application Data

(60) Provisional application No. 63/552,713, filed on Feb. 13, 2024.

(51) Int. Cl.
*G08G 5/00* (2006.01)

(52) U.S. Cl.
CPC .................................. *G08G 5/0004* (2013.01)

(58) Field of Classification Search
CPC .................................................... G08G 5/0004
See application file for complete search history.

(56) References Cited

U.S. PATENT DOCUMENTS

| | | | |
|---|---|---|---|
| 6,115,743 | A | 9/2000 | Cowan et al. |
| 6,401,014 | B1 | 6/2002 | Hill et al. |
| 6,604,030 | B1 | 8/2003 | Davis et al. |
| 8,306,478 | B2 | 11/2012 | Gross |

(Continued)

OTHER PUBLICATIONS

"PSF Trademark Usage Policy," no author given, no date given; retrieved on Nov. 18, 2024; from the Python Software Foundation; Wilmington, DE, USA; Version 1.4; posted on the Internet at python.org. (Year: 2024).*

*Primary Examiner* — Bernarr E Gregory
(74) *Attorney, Agent, or Firm* — Antonio Papageorgiou; Christopher M. Crane; Lise A. Rode

(57) ABSTRACT

A system for remotely monitoring communications equipment is provided that includes at least one communications remote monitoring panel (CRMP) operatively coupled to a plurality of radios. The CRMP is configured for communicating messages that includes queries for information relating to radio functionality to and information responsive to the queries for information from the plurality of radios using one of a plurality of communication specifications. A first of the plurality of radios is configured to communicate using a first communication specification and a second of the plurality of radios is configured to communicate using a second communication specification, and the CRMP is further configured to determine, for each of at least the first radio and the second radio, an applicable communication specification and communicate with the first radio and second radio using the applicable communication specification.

20 Claims, 31 Drawing Sheets

(56) References Cited

U.S. PATENT DOCUMENTS

| | | | | |
|---|---|---|---|---|
| 10,663,930 | B2 | 5/2020 | Becker et al. | |
| 2004/0160309 | A1 * | 8/2004 | Stilp | G08B 25/10 340/10.2 |
| 2009/0131109 | A1 * | 5/2009 | Cofta | G06F 21/57 455/558 |
| 2015/0145712 | A1 | 5/2015 | Castellanos | |
| 2016/0300493 | A1 * | 10/2016 | Ubhi | G08G 5/0086 |
| 2017/0358213 | A1 * | 12/2017 | Priest | G08G 5/0043 |
| 2017/0374493 | A1 * | 12/2017 | Pereira Cabral | H04W 4/70 |
| 2018/0026708 | A1 * | 1/2018 | Priest | G08G 5/045 370/316 |
| 2018/0247544 | A1 * | 8/2018 | Mustafic | G08G 5/0039 |
| 2018/0352452 | A1 * | 12/2018 | Parthasarathy | G08G 5/0004 |
| 2019/0320383 | A1 * | 10/2019 | Gardner | G08G 5/0004 |
| 2019/0379445 | A1 * | 12/2019 | De Rosa | H04W 72/541 |
| 2020/0128555 | A1 * | 4/2020 | Kreiner | H04W 72/542 |
| 2020/0135034 | A1 * | 4/2020 | Girod | G08G 5/0004 |
| 2020/0372811 | A1 * | 11/2020 | Lindqvist | G08G 5/0004 |
| 2021/0065559 | A1 | 3/2021 | Mayfield et al. | |
| 2022/0101736 | A1 | 3/2022 | Maloney et al. | |

* cited by examiner

CRMP Front Panel (3U Design)

CRMP Front Panel (2U Design)

CRMP Rear Panel (3U Design)

CRMP Rear Panel (2U Design)

CONTINUOUS REMOTE MAINTENANCE AND MONITORING OF RADIO EQUIPMENT IN AN AIR TRAFFIC MANAGEMENT ENVIRONMENT

CROSS-REFERENCE TO RELATED APPLICATIONS

This application claims the benefit of U.S. patent application Ser. No. 65/552,713 filed Feb. 13, 2024, and entitled "Continuous Remote Maintenance and Monitoring of Radio Equipment in an Air Traffic Management Environment," which is incorporated herein by reference in its entirety.

TECHNICAL FIELD

The disclosed embodiments relate to continuous remote maintenance and monitoring of radio and related equipment used in air traffic management of civil airspace, and preferably to the real-time monitoring of radio equipment independent of radio equipment design.

BACKGROUND

The National Airspace System and Airport Terminal and En Route Environments

The National Airspace System (NAS) is a network of air navigation facilities, communications equipment and services, and other major components to enable safe flight within controlled and uncontrolled airspace in the United States. The FAA provides Air Traffic Control (ATC) services in the Airport Terminal environment and the En Route environment to manage air traffic within the NAS, as well as other operational components (surface, oceanic). FIG. 1 provides a simplified description of the NAS, showing the Airport Terminal environment and En Route environment. The FAA also provides flight advisory services to increase pilot awareness and promote safe flight within the NAS.

As seen in FIG. 1, the Airport Terminal environment (105*a*, 105*b*) includes airport terminal facilities and a Terminal Radar approach area. Airport terminal facilities are located at, and support the operation of, airports, which are areas of land or water that are used for the landing and takeoff of aircraft. The Airport Terminal environment (105*a*, 105*b*) includes aircraft departures and arrivals at airport terminals and overflights at low altitudes and typically consists of a 30 to 50 nautical mile radius of airspace surrounding the airport. The Terminal Radar approach area includes aircraft arriving, departing, and transitioning through airspace near airports at an altitude typically between 6,000 and 18,000 feet.

Air traffic facilities in the Airport Terminal environment (105*a*, 105*b*) may include an Air Traffic Control Tower (106*a*, 106*b*) located at an airport and/or a Terminal Radar Approach Control facility (TRACON) (107*a*, 107*b*) that manages air traffic among one or more airports. Air traffic facilities in the En Route environment (101) may include an Air Route Traffic Control Center (ARTCC) (102). The NAS enables air traffic communication between an aircraft pilot and these air traffic facilities, and an aircraft pilot may communicate with several different air traffic facilities depending on the particular circumstances associated with the flight operation. The air traffic control personnel that communicate with aircraft pilots may be located at various types of air traffic facilities and at various locations.

The En Route environment (101) within the NAS includes an ARTCC (102), which is responsible for providing separation and vectoring of aircraft while En Route between airport terminal facilities. There are currently twenty-two ARTCC (102), each one managing one of the 22 regions of the NAS across the United States. Each of the aforementioned 22 regions is further subdivided into sectors (104*a*, 104*b*, 104*c*) to facilitate the management of air traffic and equipment at a smaller scale. A sector may cover several thousand to more than a hundred thousand square miles of territory.

With continuing reference to FIG. 1, the En Route environment (101) generally includes numerous air-to-ground ("A/G") radio communication facilities (103*e*, 103*f*, 103*g*, 103*h*, 103*i*, 103*j*, 103*k*, 103*l*) as part of these air traffic communications.

The FAA also provides flight advisory services to support each of the foregoing NAS operational components. Flight advisory services include transmitting aeronautical and weather information, En Route flight advisories, assistance to lost aircraft, and assistance in emergency situations.

Radio Communication Facilities

As noted above, a single air traffic facility (e.g., tower, TRACON, ARTCC) is generally communicatively coupled to multiple A/G radio communication facilities (103*a*, 103*b*, 103*c*, 103*d*, 103*e*, 103*f*, 103*g*, 103*h*, 103*i*, 103*j*, 103*k*, 103*l*, 103*m*, 103*n*, 103*o*, 103*p*), which allow air-to-ground voice communications for air traffic control operations while aircraft are moving between departure and destination locations.

For the Airport Terminal environment (105*a*, 105*b*), the A/G radio communication facilities (103*a*, 103*b*, 103*c*, 103*d*, 103*m*, 103*n*, 103*o*, 103*p*) are often sited near the tower (106*a*, 106*b*) or TRACON (107*a*, 107*b*) to enable communication between air traffic personnel and pilots who are at close distances from the airport. Currently, the Tower or TRACON and associated A/G radio communication facilities are connected by landlines, fiber, copper cables, or radio link circuits. The landlines or radio link circuits also provide a path for the transmission or reception of control and/or monitoring signals as taught or otherwise described herein, as well as speech between controller and pilot. However, some A/G radio communication facilities may also be located on-site at a Tower or TRACON.

The A/G radio communications facilities (103*a*, 103*b*, 103*c*, 103*d*, 103*m*, 103*n*, 103*o*, 103*p*) serving the Airport Terminal environment (105*a*, 105*b*) may include Remote Transmitters/Receivers (RTR), Emergency Communication System (ECS), and Remote Communications Outlets (RCO). The RTR facility provides remote transmitting and receiving capability for the Tower or TRACON communications and includes ground-based VHF and UHF transmitting/receiving antennas that could be mounted on towers. Each RTR has one or more radio channels operating in the VHF and UHF bands. The RTR typically has separate radio devices to transmit or receive communications (separate transmitters and separate receivers). In addition, each RTR typically has a set of main radio devices and a set of standby radio devices to transmit or receive communications.

FIG. 2 presents the existing equipment generally found at an ARTCC (201) and a remote A/G facility (202) to enable A/G communication. Each of the A/G radio communications facilities (103*e*, 103*f*, 103*g*, 103*h*, 103*i*, 103*j*, 103*k*, 103*l*) may include Remote Center Air/Ground Communication (RCAG) facilities, Back-Up Emergency Communication (BUEC) facilities, and Remote Communications Outlets (RCO). The RCAG facility provides remote transmitting and receiving capability for the ARTCC (201) En Route communications, and includes ground-based VHF and UHF transmitting/receiving antennas. Each RCAG has one or more radio channels operating in the VHF and UHF bands. The RCAG typically has separate radio devices to transmit or receive communications (separate transmitters and receivers). In addition, each RCAG typically has a set of main radio devices to transmit or receive communications and a set of standby radio devices to transmit or receive communications.

The BUEC facility provides backup emergency En Route channels by using remote VHF and UHF transmitter/receiver pairs. It is similar to the RCAG but only provides primary or main radio devices and equipment supporting each En Route sector and does not include standby radio devices. If air-to-ground communication via an RCAG facility fails, then a BUEC facility may provide the communication in lieu of the RCAG. The RCO facility provides remote transmitting and receiving capability for communicating flight services information. The RCO uses ground-based VHF and UHF transmitting/receiving antennas that also could be mounted on towers.

Air traffic personnel communicate with remote A/G radio transmitters and receivers using existing voice switch resources, telecommunications lines, and Radio Control Equipment (RCE).

A Voice Switching and Control System (VSCS) voice switch (203) at the ARTCC (201) allows a controller to interface with the radios (204*a*, 204*b*, 204*c*, 204*d*, 204*e*, 204*f*, 204*g*, 204*h*) at the remote site, such as at a remote RCAG, BUEC, or RCO facility (202). The Air Traffic controller's voice and push-to-talk (PTT) signals are routed to the remote radios (204*a*-204*h*) using existing telecommunications lines (205), where 205 may be one or more lines connecting one or more R-RCEs to C-RCEs, typically through the RCE units (206, 207) located at the ARTCC (201) and the remote A/G facility (202). Receiver audio is routed back to the VSCS (203) from the remote A/G facility (202) through existing telecommunications lines (205), e.g., through the C-RCE and R-RCE units 206, 207.

The Radio Control Equipment (RCE, e.g., C-RCE and R-RCE) units (206, 207) are multiplexer/de-multiplexer units that transmit and receive information between the manned control location, generally referred to herein as the central location, and the typically unmanned, remote locations. A Control RCE unit (206) is provided at the central location (Control RCE or C-RCE), and a Remote RCE unit (207) is provided at the remote location (Remote RCE or R-RCE). Presently, the Control RCE unit (206) and Remote RCE unit (207) are connected by telecommunications lines (205). Typically, a pair of RCE (C-RCE & R-RCE) are associated with the landline link between an ARTCC (201) and each remote facility.

Existing System for Maintenance Monitoring of En Route Communication Equipment

While the existing system capably enables air-to-ground radio communication between air traffic personnel and an aircraft pilot located many miles away, it is not configured for remotely monitoring or control of radio equipment at remote transmitter/receiver locations. More specifically, the A/G radio communication facilities that allow air-to-ground voice communications for ATC operations are often located several hundred miles from the ARTCC (201). Previously, the only way to know the status of a radio (transmitter or receiver) is if Air Traffic can communicate with pilots in the air using the radio. If a controller does not hear a pilot response, the Air Traffic controller switches between available radios to determine where the problem might reside. For example, to identify a malfunctioning radio/facility, Air Traffic personnel would need to switch between the main radios and the standby radios at the RCAG facility or, in the alternative, use a different facility altogether for radio communication, such as a BUEC facility, until the malfunctioning radio/facility is identified. Once the controller believes they have identified the malfunctioning radio/facility, a technician is notified to visit the site to perform troubleshooting of the radio equipment at the remote location to determine the defective equipment and the cause of the malfunction, and determine/perform appropriate corrective action.

It is possible that communications can be interrupted by issues not involving the radio equipment, such as a pilot on the wrong frequency, a pilot out of range, or a poorly modulated pilot signal. However, the radio or related equipment at the remote facility may be the source of communication difficulties. Transmitter issues for the remote equipment could include no/low AC/DC input power, a bad antenna, a bad transmission path, a bad ATR switch, over temperature, high Voltage Standing Wave Ration (VSWR), internal failure, software lockup, etc. Receiver issues for the remote equipment could include no/low AC/DC input power, a bad antenna, a bad transmission path, a bad ATR switch, over temperature, internal failure, software lockup, poor coverage, etc. These issues could occur with one or more of the main radios or the standby radios and involve either the transmitting or receiving radios and related equipment.

Accordingly, there was no way in the prior system for determining the exact cause of the problem at the remote equipment from the ARTCC (201) without a site visit, because the only information being communicated between the ARTCC (201) and remote radio site is audio and PTT signals. Prior systems are also limited because there is also no way of knowing if or when the issue has cleared. Equipment failures are identified only upon attempted use of the equipment. Failed or degraded systems would go unnoticed, which delays assessment of impacts to operations and thus delays restoration efforts. Accordingly, there is a need for systems and corresponding methods for monitoring such equipment that are not so limited.

SUMMARY

In one aspect, a system for remotely monitoring communications equipment, is provided that includes at least one communications remote monitoring panel (CRMP) operatively coupled to a plurality of radios, the at least one CRMP configured for transmitting and receiving messages includes queries for information relating to radio functionality to and information responsive to the queries for information from the plurality of radios using one of a plurality of communication specifications, including a first communication specification and a second communication specification different from the first communication specification, where a first of the plurality of radios is configured to communicate using the first communication specification and a second of the plurality of radios is configured to communicate using the second communication specification, and where the at least one CRMP is further configured to determine, for each of at least the first radio and the second radio, an applicable communication specification, from the plurality of communications specifications, for communicating with the first radio and second radio, and to transmit the messages to the first radio and the second radio using an applicable communication specification.

In one embodiment, to determine the applicable communication specification for communicating with a radio, includes being configured to: detect presence of each of the plurality of radios coupled to the at least one CRMP, in response to detecting radio presence, send a first query in each of the plurality of communications specifications to a present radio in succession until a valid response from the present radio is received, and in response to receiving the valid response from the present radio, set the applicable communication specification for any further queries from the at least one CRMP to the present radio to that communication specification associated with the valid response.

In one embodiment, the at least one CRMP includes a plurality of communication ports, each of the plurality of radios is coupled to the at least one CRMP using one of the plurality of the commination ports, and wherein the applicable communication specification is set for a given communication port until equipment presence at the given communication port is disrupted. In one embodiment, a valid response includes at least one of a radio type and serial number.

In one embodiment, the first communication specification differs from the second specification with respect to at least one parameter selected from the group consisting of: baud rate, message data structure, and message syntax.

In one embodiment, system further includes a data manager (DM) coupled over a communication network to the at least one CRMP, the at least one CRMP and DM configured to communicate messages between each other in a third communication specification different than the first and second communication specifications, the at least one CRMP further configured to translate first and second communications specification messages into third communication specification messages.

In one embodiment, the DM is coupled to the at least one CRMP at least partially via a serial connection, and wherein the at least one CRMP is coupled to at least one of the plurality of radios via an Ethernet connection or via another serial connection.

In one embodiment, the third communication specification uses a plurality of message types, each having a different data structure.

In one embodiment, at least one of the plurality of message types has a variable data structure.

In one embodiment, the variable data structure includes at least one slot having at least one bit for indicating presence of information for an item of equipment coupled to the at least one CRMP, and wherein when presence of information is indicated, the variable data structure includes at least one optional slot for information relating to the present item of equipment.

In one embodiment, when presence of information is indicated for a first item of equipment, the variable data structure includes one optional slot for information relating to the first item of equipment, and when presence information is indicated for a second item of equipment, the variable data structure includes a plurality of optional slots for information relation to the second item of equipment.

In one embodiment, the variable data structure includes one-byte slots, and wherein presence of information is indicated for each item of equipment coupled to the CRMP using at least one bit of a given one-byte slot.

In one embodiment, the at least one CRMP includes a plurality of communication ports, each of a plurality of items of equipment is coupled to the at least one CRMP using one of the plurality of the commination ports, and wherein the given one-byte slot includes a plurality of one-bit presence of information indications, each of the one-bit presence of information indications corresponding to one of the plurality of the communication ports.

In one embodiment, the first radio is coupled to the at least one CRMP via a first audio port and the second radio is coupled to the at least one CRMP via a second audio port, and wherein the variable data structure includes at least one slot for audio presence information for each of the first and second radios.

In one embodiment, the first radio is coupled to the at least one CRMP via a first communication port and the second radio is coupled to the at least one CRMP via a second communication port, the message type includes a radio data message having a variable data structure that includes at least one optional slot, and wherein one of the plurality of one-bit presence of information indications is associated with the first radio and another of the plurality of one-bit presence of information indications is associated with the second radio, and wherein the at least one optional slot includes status information when present for each of the first and second radios.

In one embodiment, at least one item of the plurality of items of equipment includes a power control and detect module that supplies individually switched power to the first radio and the second radio, and that is communicatively coupled to the at least one CRMP to exchange power control and status messages for each of the first radio and the second radio, wherein the first radio is coupled to the at least one CRMP via a third communication port and the second radio is coupled to the at least one CRMP via a fourth communication port, wherein the at least one optional slot includes power status information for each of the first and second radios based on information from the power control and detect module.

In one embodiment, the at least one CRMP is further configured to communicate command messages to the plurality of items of equipment connected to the at least one CRMP, wherein commands to switch power to radios monitored by the CRMP are relayed to the power control and detect module for individually switching power to the radios connected thereto, and commands to reset radios are relayed to radio to be reset.

In one embodiment, the system includes a terminal server (TS) communicatively coupled to the at least one CRMP and the DM, wherein the TS is coupled to the DM via an Ethernet connection, and wherein the TS is configured to encapsulate third communication specification messages and transmit third communication specification messages to the DM via an Ethernet protocol.

In one embodiment, the system includes at least one remote maintenance monitoring and control (RMMC) computer communicatively coupled to the DM, the RMMC computer configured to communicate queries and commands to the at least one CRMP for remotely monitoring and controlling the plurality of radios, and to cause to be displayed at at least once workstation a graphic user interface with form elements therein for users to remotely query and control the plurality of radios coupled to the CRMP.

In one embodiment, the commands include at least one of instructions to factory reset radios, warm reset radios, and switch power to radios, and wherein the queries includes at least one of radio status, radio parameters, power status, event log queries, radio activity, CRMP status, temperature, and voltage measurements.

BRIEF DESCRIPTION OF THE DRAWINGS

In order that features of the present disclosure can be understood in detail, a more particular description may be had by reference to aspects and features, some of which are illustrated in the appended drawings. It is to be noted, however, that the drawings illustrate only certain typical aspects and features of this disclosure and are therefore not to be considered limiting of its scope, and that the description may allow for other equally effective aspects and features. The same reference numbers in different drawings identify the same or similar elements.

FIGS. 7A-D, are diagrams showing a split site configuration of remote radio equipment used in En Route communications between Air Traffic Control and aircraft pilots, according to one embodiment;

DETAILED DESCRIPTION

Figure 1:
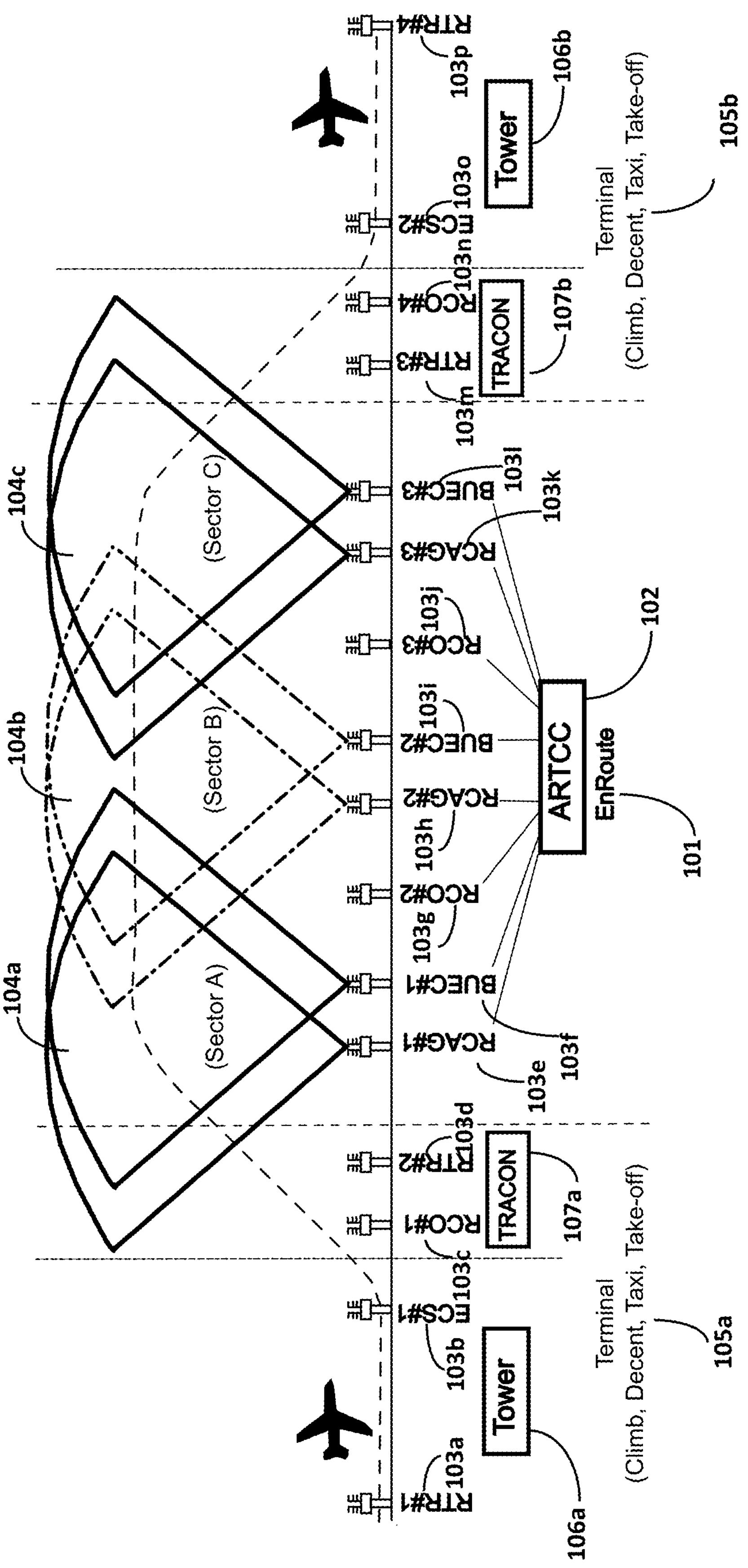
FIG. 1 is a schematic of the National Airspace System that depicts radio communications equipment in the air traffic control environment.
Figure 2:
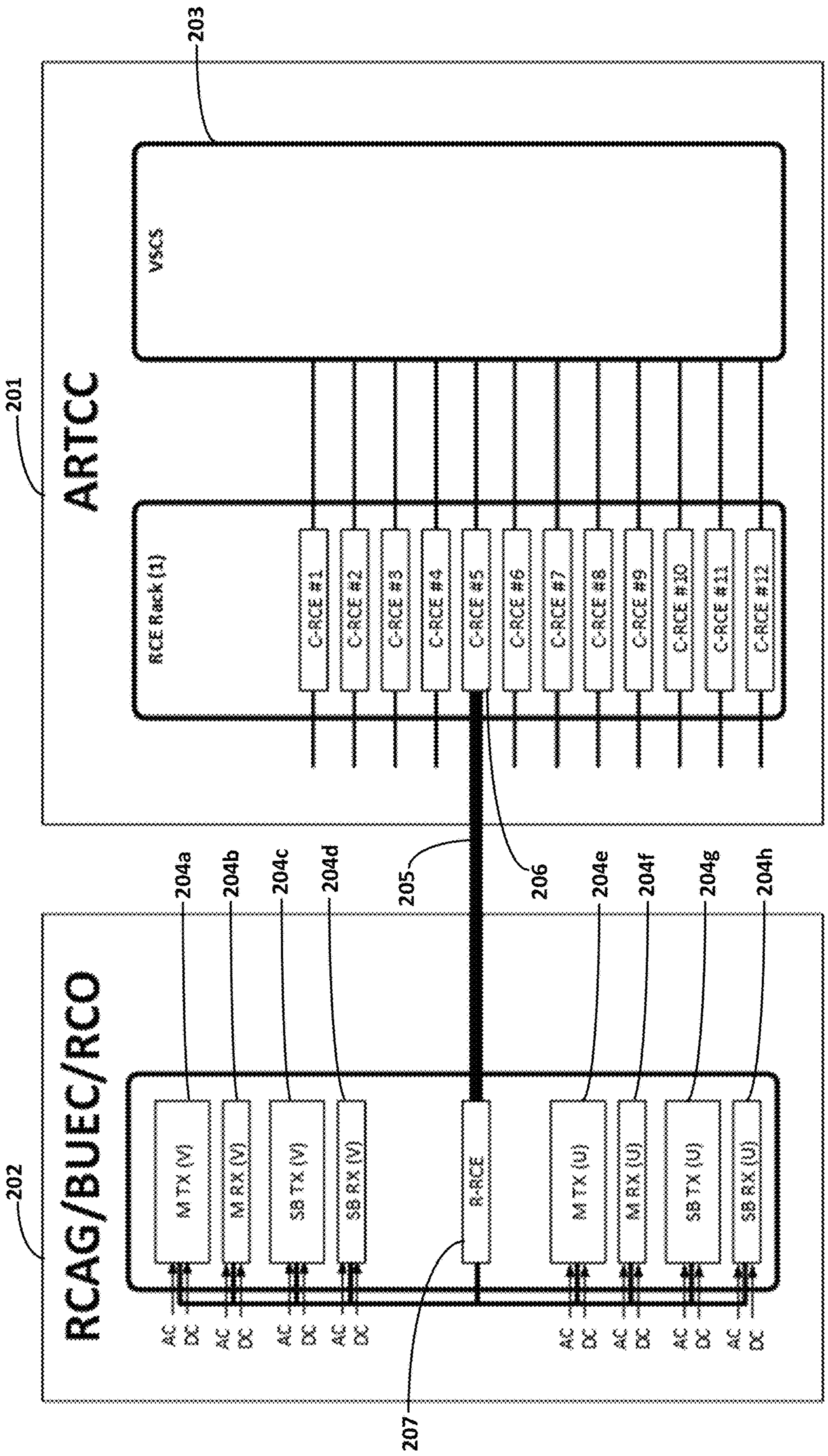
FIG. 2 is a diagram of the present configuration of communications equipment at the ARTCC (201) and a remote A/G facility to enable radio communications between Air Traffic Control and aircraft pilots during En Route operations.

Communications Remote Maintenance Monitoring of Communication Equipment (CRMM) (300)

Referring generally to FIGS. 3A-3D, in a preferred embodiment, the Communications Remote Maintenance Monitoring (CRMM) system (300) implements a remote monitoring and preferably control functionality to existing communications system used in the NAS, such as those systems implemented in the En Route airspace. Although the CRMM system (300) may be discussed herein in relation to the NAS, it is understood that the teachings herein are applicable generally to monitor and/or control any system that uses remote equipment.

In the preferred embodiment, the CRMM system (300) actively gathers information on radio and equipment function(s) for display to FAA air traffic and maintenance personnel, preferably in in real-time. At a large scale, the information gathered by the CRMM system (300) may be used to provide a real-time view of the radio communication system, for example, to show the overall function or "health" of the system being monitored. At a smaller scale, the system (300) may provide more granular detail on specific radio and equipment function, for example, to identify malfunction or failure of specific radios and equipment, or even the specific fault that caused the malfunction/failure remotely. In this regard, the CRMM system (300) provides real-time monitoring and control capabilities that were not previously available to maintenance personnel, including because the equipment itself is not capable of self-diagnostic and/or self-reporting performance issues, and/or incapable of being controlled/reset remotely, etc.

In the preferred embodiment, the CRMM system (300) is also configured to gather and provide information from radios and equipment of different manufacture. This facilitates the easy deployment of the CRMM system (300) into the NAS, which contains radios and equipment of varying manufacture. Previously, the different manufacture of radios prevented the application of a single system to provide overall status of radio communications at a sector level or regional level. To provide a useful and informative description of the status of the radio communication system agnostically, it is desirable to assimilate information from all the radios and equipment, regardless of manufacture or location.

In the preferred embodiment, the equipment in the CRMM system (300) communicate with each other to enable remote monitoring capabilities as described further below and to provide read-only CRMP messages to the Remote Maintenance Logging System (RMLS) (344), which is used for storing the information collected by the CRMM (300) for use by other applications. In the preferred embodiment, the CRMM system (300) includes a NAS Infrastructure Service (NIS) tool (347) for monitoring of service and equipment, by obtaining information from the RMLS (344), correlating the status and data determined or derived from the RMLS to the appropriate Air Traffic sector, and displaying the real-time status and impacts of radio and equipment operation in the NIS Tool (347). The NIS Tool (347) is preferably configured for recording, tracking, prioritizing, and reporting service threads for radios and equipment at RCAGs and other facilities. The NIS tool (347) thus provides users with a perspective of radio and equipment operation at a regional scale and sector scale, which is useful for situational awareness, maintenance planning, and the resolution of communication problems.

As further described below, the CRMM system (300) may also provide monitoring and control capabilities to internal users at an ARTCC (201) using Remote Maintenance Monitoring Control (RMMC) workstations. Internal users preferably also have real-time control capabilities in addition to monitoring capabilities. To promote security, the system (300) is preferably configured so that users outside of the central location, e.g., the ARTCC (201), do not have control capabilities of radios and equipment. The CRMM system (300) preferably prevents messages from an external source from entering the CRMM system (300). Control capabilities may also be limited to specific users based on assigned responsibilities, such as authorized maintenance technicians.

The preferred CRMM system (300) fits within the existing communications system, which simplifies its implementation. The components and devices of the CRMM system (300) are added to the existing systems to accomplish the maintenance monitoring of remotely-located radios and equipment, in a manner that was not previously possible. The CRMM system (300) utilizes the added new components along with the existing system components to gather information and communicate with remote radios and equipment.

Overall Description of CRMM (300) Operation

A description of CRMM system (300) operation and elements is provided to give an overall understanding of the principles of the structure, function, manufacture, and use of the systems and techniques disclosed herein. One embodiment of the CRMM system (300) is set forth in FIG. 3A.

In this embodiment, the CRMM system (300) includes a Communications Remote Monitoring Panel (CRMP) (301) that is used to gather and collect various parameters and information from radios (307*a*, 307*b*, 307*c*, 307*d*, 307*e*, 307*f*, 307*g*, 307*h*) and other equipment at remote locations operatively coupled locally to the CRMP (301), and to convey that information over a communication network, e.g., RCE (205), to a central location, such as an ARTCC (311). In addition to CRMP (301) data, the RCE (205) concurrently communicates voice and VSCS information between the remote A/G facilities and the ARTCC (311). The CRMP (301) is therefore operatively/communicatively coupled to the other system (300) components to receive queries from users at the central location, e.g., ARTCC (311), or elsewhere on the network on the status of the remotely-located equipment, such as radios (307*a*-307*h*), and can also execute commands that are received by the CRMP (301) at the remote location, from the central or other locations on the network. The CRMP (301) is preferably installed in or near the radio equipment rack for each A/G channel located at an A/G communication facility (304). A facility may include several radio equipment racks, which may each include several radios coupled to the CRMP (301), as shown in FIG. 3B. The system (300) may include a single CRMP (301) for monitoring all or fewer than all the facility radios, or multiple CRMPs (301) for monitoring a subset of the facility radios, such as one CRMP (301) for each radio equipment rack. Moreover, CRMPs (301) may be interconnected and configured to operate as master/slave(s) (FULL/LITE), as discussed in greater detail below.

The CRMP (301) enables communication with radios (307*a*-307*h*) and other remote equipment of different manufacture so that the CRMP (301) may be deployed in most or all the FAA facilities with radio equipment. The widespread deployment of the CRMPs (301) at remote facilities enables a complete, real-time description of the operational status of the radio communications within a region or airspace sector. The CRMP (301) can communicate with other CRMPs (301) that are installed at the same facility or at another facility. The inter-connection of CRMPs (301) can enable the monitoring and control of various remotely-located radios and equipment at a remote facility or among several remote facilities that may not have a direct connection to the RCE (205), as discussed in further detail below.

Figure 3A:
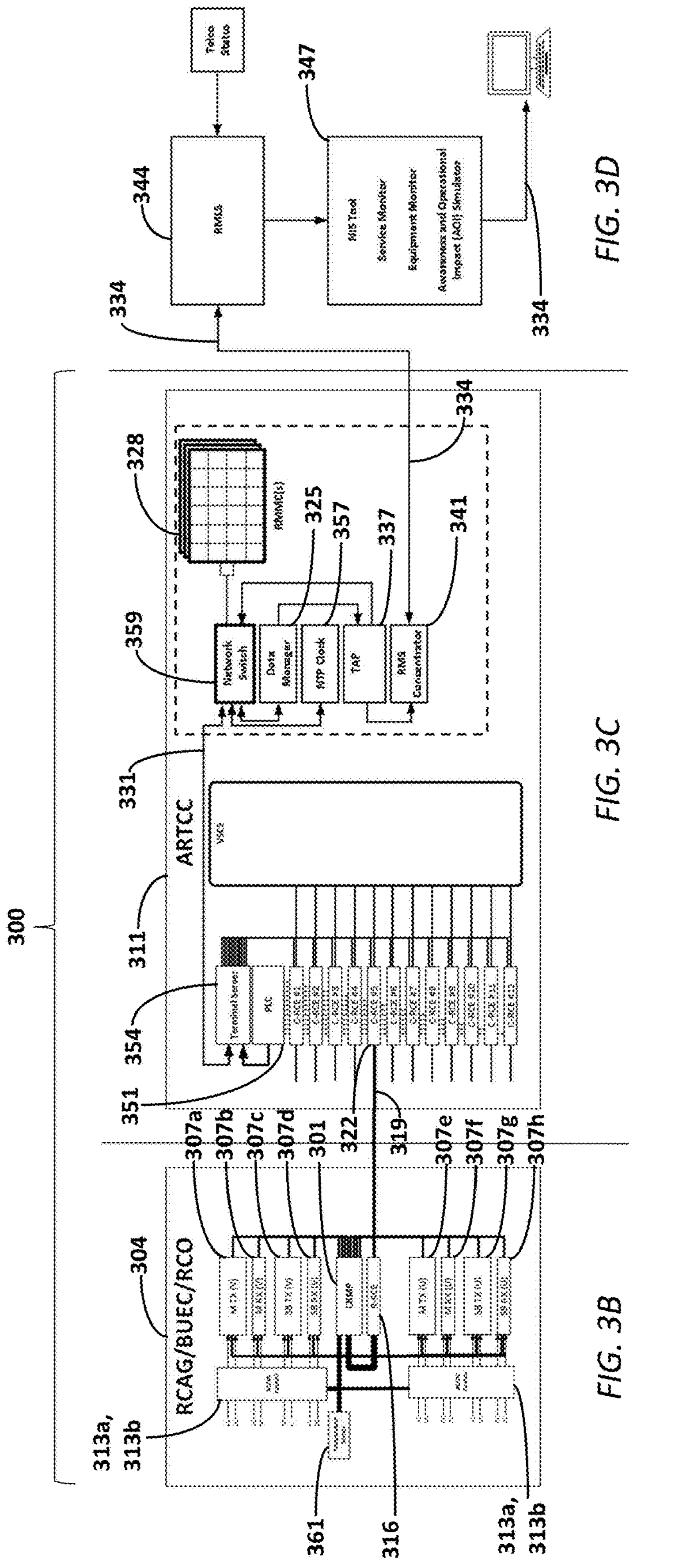
FIGS. 3A-3D, are diagrams showing installation according to one embodiment of a Communications Remote Maintenance Monitoring (CRMM) (300) system, including a Communications Remote Monitoring Panel (CRMP) (301), along with equipment at the ARTCC (311) and a remote A/G facility that are used, for example, for En Route radio communications between Air Traffic Control and aircraft pilots, in accordance with various aspects of the present disclosure.
Figure 3B:
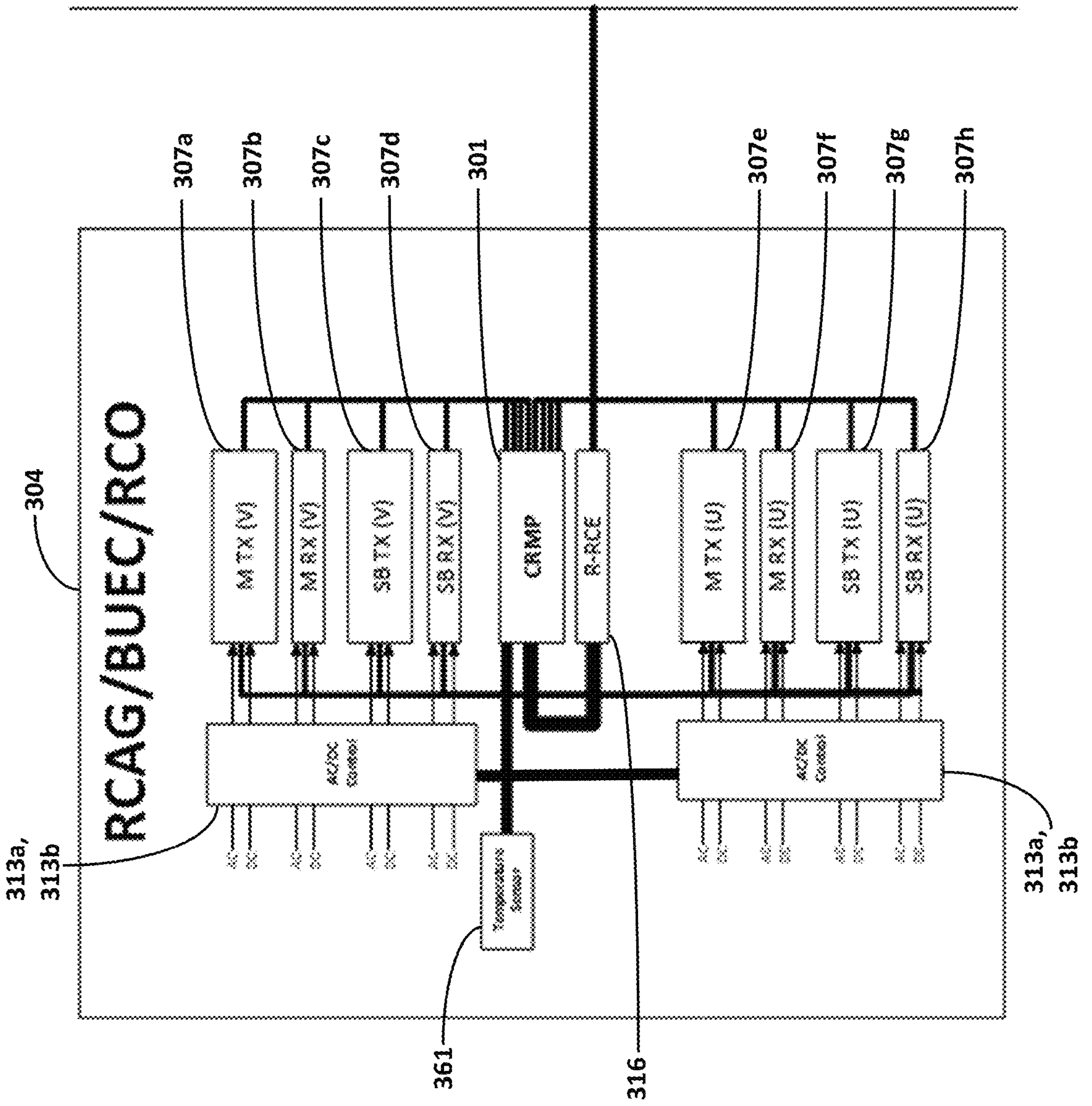

In the embodiment of FIG. 3A, the CRMM system (300) may include a remotely-located AC Control/Detect module (313*a*) to monitor and control the AC power to the remote radios (307*a*-307*h*) and equipment. The CRMM (300) may also include a remotely-located DC Control/Detect module (313*b*) to monitor and control DC power to the remote radios (307*a*-307*h*) and equipment. In one embodiment, the AC and DC Control/Detect module(s) (313*a*, 313*b*) are distinct components interposed between the radios (307*a*-307*h*) and the CRMP (301). That is, the AC and DC Control/Detect module(s) (313*a*, 313*b*) are configured to provide switched AC and/or DC power to each of the radios (307*a*-307*h*) individually. The CRMP (301) and/or the AC and DC Control/Detect module(s) (313*a*, 313*b*) may further be configured to communicate with each other to collect information on the AC or DC power presence for each of the radios and equipment. For example, the CRMP (301) may poll the AC and DC Control/Detect module(s) (313*a*, 313*b*) for the AC/DC status of each of the radios (307*a*-307*h*). In response to the polling message, the AC and DC Control/Detect module(s) (313*a*, 313*b*) may send a reply message that includes the power status of each of the radios (307*a*-307*h*) connected to the CRMP (301). Alternatively, the AC and DC Control/Detect module(s) (313*a*, 313*b*) may send power status information for each of the radios connected to the CRMP (301) periodically (without polling). The status information may be binary, i.e., on or off, or may include more granular operating parameters, e.g., voltage, current, etc. The CRMP (301) may also communicate with the AC Control/Detect module (313*a*) and/or the DC Control/Detect module (313*b*) to assert power commands. That is, the CRMP (301) may send power commands to the AC and DC Control/Detect module(s) (313*a*, 313*b*) for controlling/switching the power supplied to the individual radios (307*a*-307*h*).

Figure 3C:
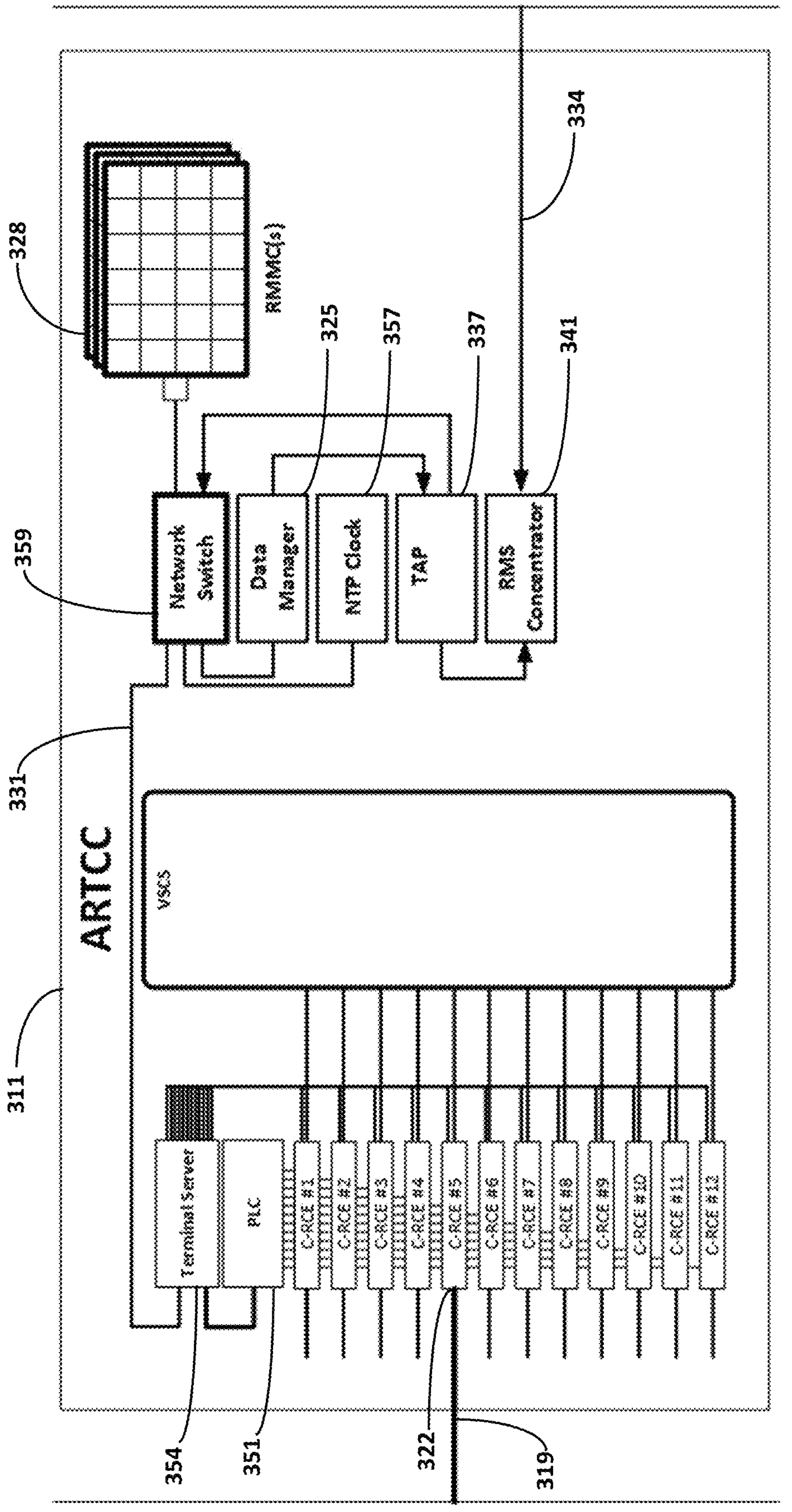

The CRMP (301) communicates with a central location, such as an ARTCC (311) to transmit or receive information on the status of radios (307*a*-307*h*) and related equipment, such as the AC and DC Control/Detect module(s) (313*a*, 313*b*). In one embodiment, the CRMP utilizes the Remote RCE (316) equipment at the remote location to transport information from the CRMP (301) along existing network/telecommunications lines (319) to a Control RCE (322) equipment for distribution to other components within the CRMM system (300). In one embodiment, the CRMM system (300) includes a Data Manager (325) located at the ARTCC (311) (FIG. 3A, 3C). The Data Manager (325) and other components at the central location, e.g., at the ARTCC (311), may be a software module executed on a server or servers(s), or may be dedicated hardware configured and/or programmed to perform its respective functionality.

The Data Manager (325) generally organizes the transmission of messages between the CRMP (301) and users at the central location, e.g., the ARTCC (311). In this embodiment, data regarding radio (307*a*-307*h*) and other equipment (e.g., 313*a*, 313*b*) may be sent in the form of messages from the CRMP (301) to the Data Manager (325), via a communication network, e.g., RCE (319). Messages between CRMP (301) and the Data Manager (325) may be communicated using various communications technologies, including Ethernet protocols, such as Internet Protocols ("IP"), such as UDP, TCP, TCP/IP, etc., as well as non-Ethernet protocols. In one embodiment, communication over the RCE (205) is accomplished with a serial connection, using an appropriate serial standard, such as RS-232. In this and other embodiments, the CRMP (301) may use a novel messaging protocol, discussed below, which minimizes the impact that the CRMM system (300) has on the, e.g., bandwidth, of the existing network, particularly the portion that interconnects the CRMP (301) with the central location, e.g., the RCE (205). Once the data message arrives at the Data Manager (325), the Data Manager will process the message to determine its validity, for example, via a checksum confirmation.

When the Data Manager (325) receives a valid message from the CRMP (301), the Data Manager relays that message to one or more, or preferably all Remote Maintenance Monitoring and Control (RMMC) computer, i.e., servers/workstations, (328) connected to the Data Manager (325), preferably via an internal LAN (331). The RMMC (328) are configured as part of a secure system that enable users to monitor and control radios (307*a*-307*h*) and equipment assigned to a given ARTCC (311) through a workstation within that ARTCC (311). Personnel at the ARTCC (311) can access the RMMC (328) to view site data for real-time troubleshooting, availability, and informational purposes, as discussed further herein.

Preferably, an RMMC server/workstation (328) is communicatively coupled with an IP connection to the Data Manager (325) to send/receive messages with remote CRMPs (301). The Data Manager (325) receives queries and commands from the RMMC (328) and routes these messages to the appropriate CRMP (301) associated with the remote radio or equipment of interest. Although there may be dozens of CRMPs (301) in order to monitor many different radios in different sectors, the Data Manager routes the message to the appropriate CRMP (301) being monitored or queried. When the CRMP(s) (301) is/are connected to the central location via a serial connection, the serial CRMP messages may be converted to Ethernet/IP by encapsulating the CRMP message and transmitting it to the DM (325) via TCP/IP and vice-versa, for example, using the Terminal Server (354), as shown in FIG. 3A.

RMMC (328) users can monitor the function and operation of remote radios (307*a*-307*h*) and equipment, and query equipment parameters. The RMMC (328) displays or causes to be displayed at workstations one or more graphical user interface(s) (GUI) for users to perform various CRMM functions, including factory resets of radios, warm (software) resets of radios, power control of radios, power cycling of the R-RCE unit (316), plot current and historical data, view radio settings and status (Normal/Alert/Alarm/Fail or unknown operational state), and/or query radio event logs. Exemplary interface screens are depicted in FIGS. 8A-8L. The RMMC (328) users are able, vis-à-vis the GUIs, to view the status or health of remote radios (307*a*-307*h*) and equipment to determine the capacity for radio communications at a regional scale or sector scale, or even more granularly at a facility scale and a rack/channel scale. In a preferred embodiment, Air Traffic operations are not impacted by CRMM monitoring capabilities/functions (radio status, radio parameters, power status, event log queries, parameter queries, radio activity, CRMP status, temperature, voltage measurements), but resets (warm and factory) and power control would impact Air Traffic operations. In a preferred embodiment, for security purposes, remote queries, resets, and power ON/OFF capabilities are limited to authorized personnel at the ARTCC (311).

The CRMM system (300) preferably also conveys messages to an external LAN (334) to allow larger, preferably more limited access to the status of the remote radios and equipment. In this embodiment, I Data Manager (325) relays messages through a Network Isolation Device (337) to a Remote Monitoring System (RMS) Concentrator (341). The Network Isolation Device (or Test Access Point, TAP) (337) is generally used to provide one-way communication of messages from the CRMM system (300) to an external LAN (334) in order to maintain security. The Network Isolation Device (337) promotes security by limiting the flow of information to one direction and by isolating the internal network inside the ARTCC (311) from the external LAN (334) and external network. Thus, no entity outside the ARTCC (311) may access the CRMM system (300) or radios and equipment through the external LAN (334) and external network. In this regard, messages that could impact the operation of the remote facility and more specifically the radio (307*a*-307*h*) and other equipment are blocked from the Data Manager (325) and thus the CRMP (301).

The RMS Concentrator (341) organizes the messages for further transmission. More particularly, the RMS Concentrator (341) runs code to parse CRMP (301) messages received from the Data Manager (325), therewith extracting radio (307*a*-307*h*) and other equipment data points, maintains a database of the data points for all sites assigned to a given ARTCC (311) or other central location, and sends updated data points to the Remote Monitoring and Logging System (RMLS) (344).

RMLS (344) is preferably a database for storing FAA infrastructure data, including data associated with remotely-located radios (307*a*-307*h*) and equipment. The RMLS database stores the data provided by the CRMM (300) to enable users to search and query the information. Users of a workstation on the external LAN (334) or similar network can view the overall status of the radios (307*a*-307*h*) and equipment at a large scale to assess the function of the radios and equipment. This information may be provided using a NAS Infrastructure System (NIS) Tool (347), which is available on workstations connected to the network behind a firewall on the external LAN (334) to enable users to view the real-time status of radios (307*a*-307*h*) and equipment. The NIS Tool (347) enables users to view the operation of specific radios (307*a*-307*h*) and equipment or to view the overall operation of the radio communication capabilities at a regional scale or other scale. The data in RMLS (344) is queried by the NIS Tool (347) to develop service threads that provide tools for determining service-level availability, reliability, trending, reporting, and service impacts that assist in decision-making. External users on the external LAN (334) or similar network are preferably prevented from controlling the remote radios (307*a*-307*h*) and equipment, for example by blocking external messages from entering the Data Manager (325) and/or the RMMC (328); however, internal users on the internal LAN (331) or similar network at the RMMC workstation (328) can assert control of remote radios (307*a*-307*h*) and equipment.

Figures 4A, 4B, 4C, 4D:
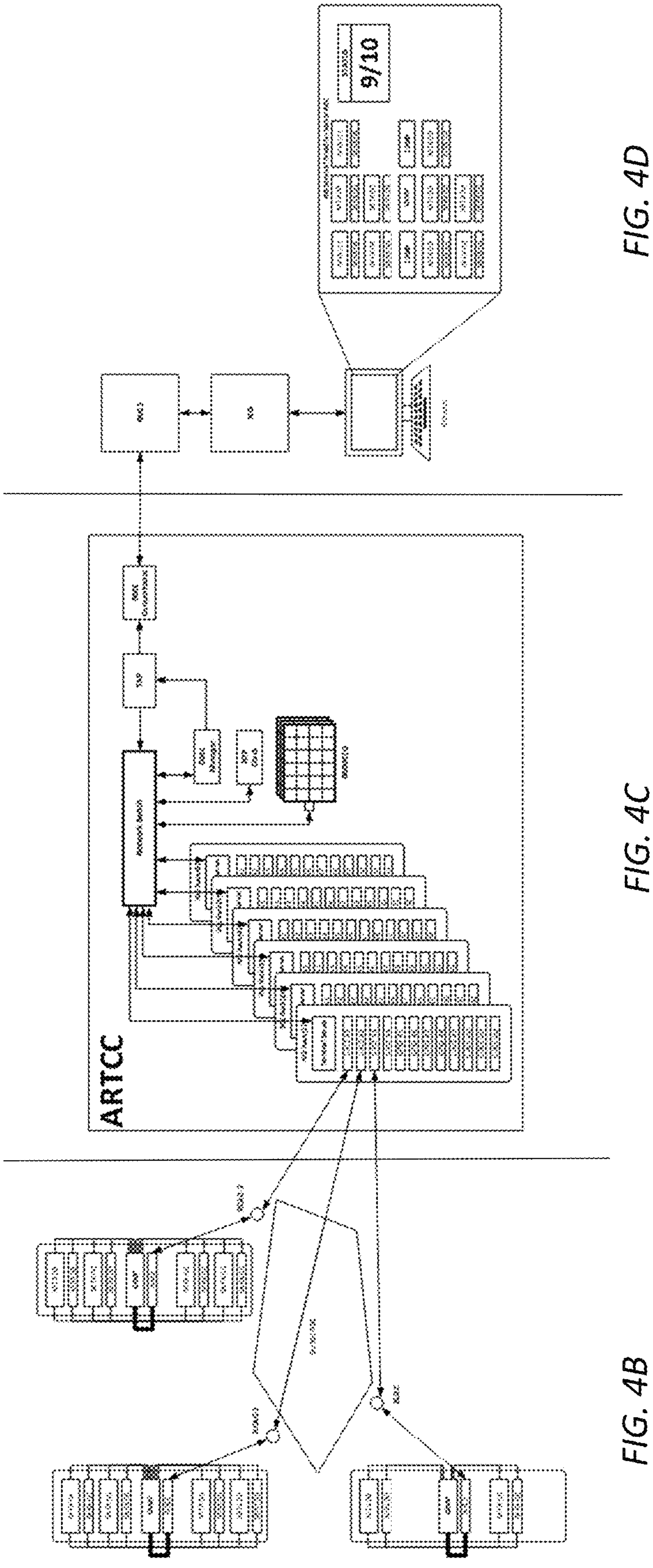
FIGS. 4A-D, are diagrams showing an exemplary installation of a (CRMM) (300) system to serve multiple remote A/G facilities, according to one embodiment.
Figure 4B:
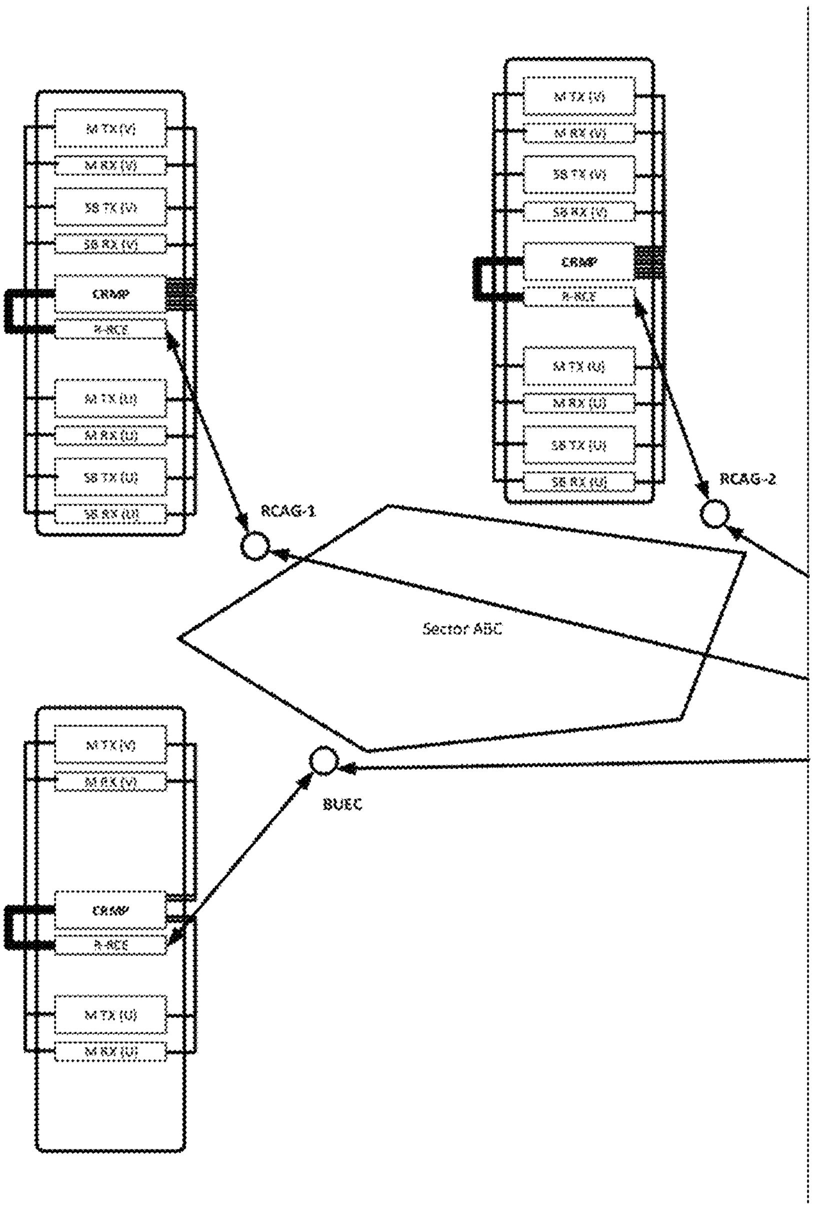
Figure 4C:
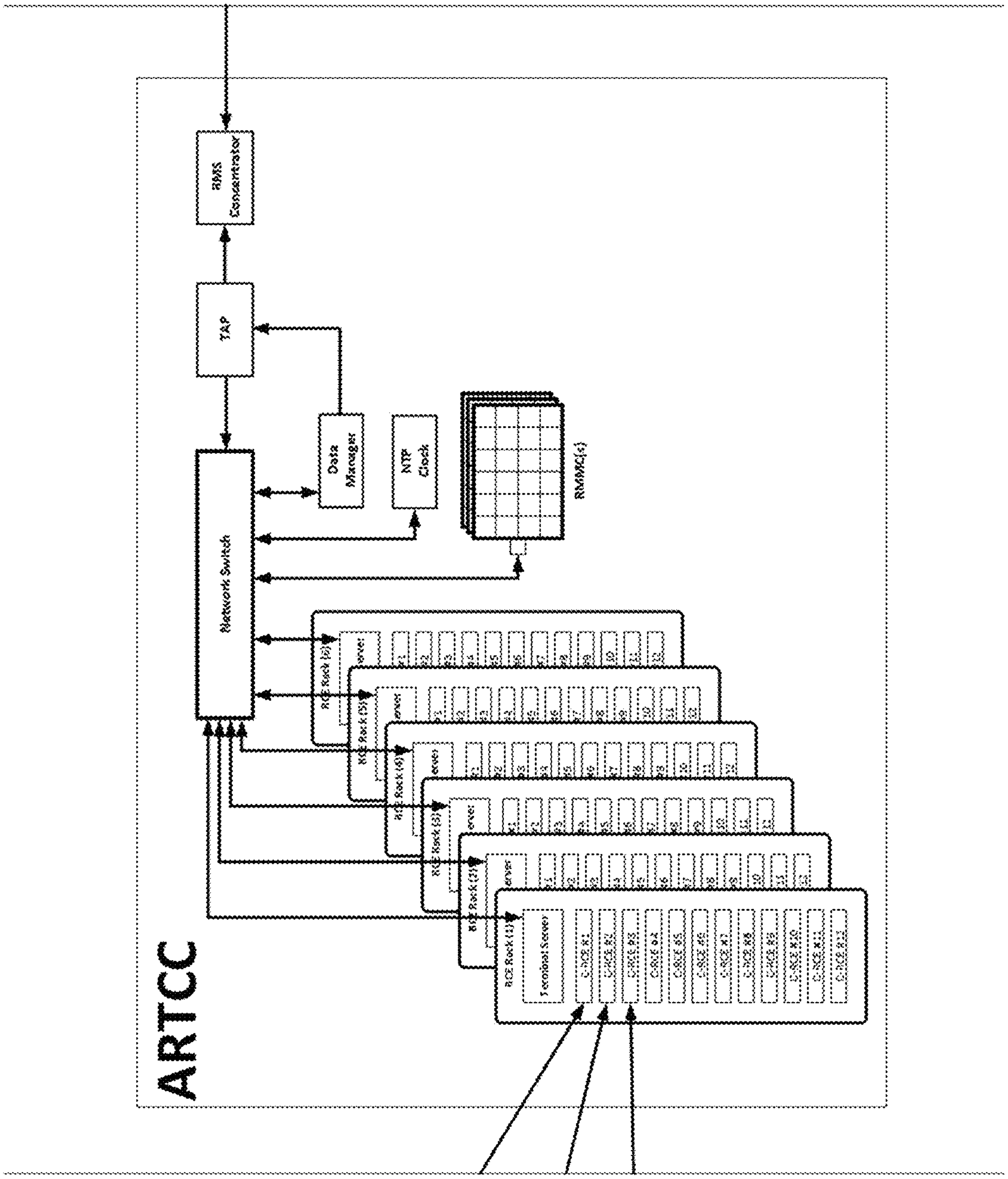
Figure 4D:
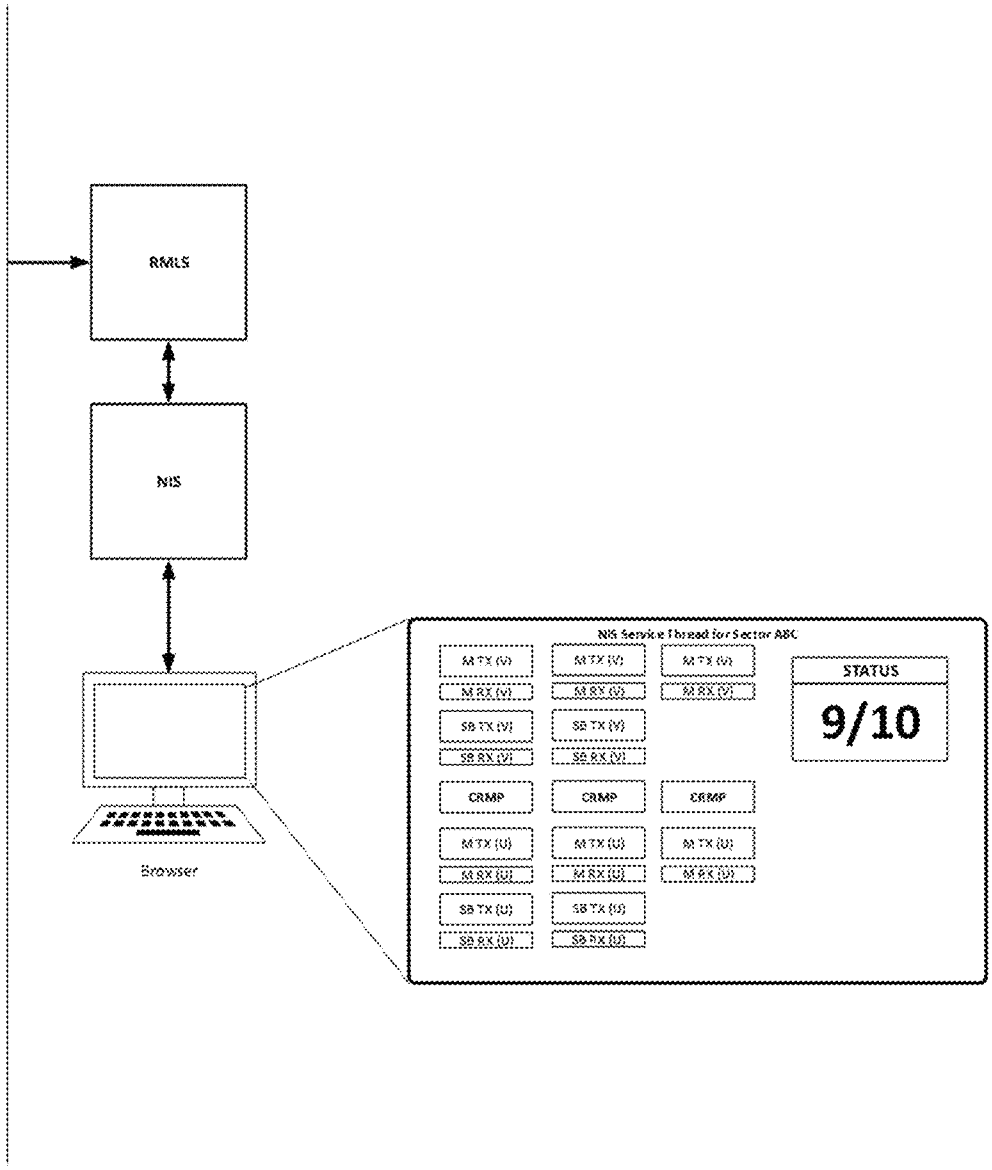

The NIS Tool (347) preferably collects the data from RMLS (344) and groups the data at the service/system level. The radio state, primary and back-up communication line status to radio site, and CRMP (301) status may be combined to determine the service/system level status. The NIS tool may display the status of each subcomponent and the overall impact each subcomponent has on the overall service/system. The overall system/service impact may be determined by an impact metric scale. Using the status of each subcomponent, an impact metric scale is determined for each service/system. The impact metric scale may be a calculation of the proportion that a single piece of equipment has on the overall service/system status. The overall service/system status may be assigned a lower impact metric scale value when there is less radio and equipment redundancy (such as when there are fewer radios operating properly within a sector). A higher impact metric scale value is assigned to the overall service/system status when there is more radio and equipment redundancy (such as when there are more radios operating properly within a sector). The impact metric scale value of a service/system can be viewed through the NIS Tool (347), as shown in FIG. 4D.

As further described below, other components of the CRMM system (300) assist in enabling communication between the remotely-located radios (307*a*-307*h*) and equipment and internal and external users. In one embodiment, a Programmable Logic Controller (PLC) device (351) is provided to poll status information from up to 12 C-RCE units (322), including status of telecommunications lines (319) and selection of A/G channel (e.g., RCAG/BUEC selection)

at the remote A/G communication facility (304). The PLC (351) enables a regular flow of information to enhance the monitoring and control capabilities provided by the CRMM system (300) to include the status of the RCE lines and/or units. In one embodiment, the CRMM system (300) includes a Terminal Server (354), which enables the transfer of data messages between the Data Manager (325) and the remotely-located CRMPs (301) via, for example, a serial connection, an Ethernet connection, or a combination thereof, e.g., RCE/Serial between the CRMP (301) and the Terminal Server (354) and IP between the Terminal Server (354) and the Data Manager (325). There may be multiple Terminal Servers in order for the Data Manager (325) to communicate with numerous CRMPs (301). The CRMM system (300) may also include a Network Time Protocol (NTP) Timeserver (357) which provides a date and time stamp for all incoming CRMP messages. A time stamp may also be added at the remote location, e.g., by the CRMP (301). A Network Switch (359) may be used to connect the components of the CRMM System (300) and the internal LAN (331), as shown in FIG. 3C.

In one embodiment, the CRMM equipment (300) preferably interfaces with A/G radios (307*a*-307*h*) using an existing radio Maintenance Data Terminal (MDT) port. The MDT port is generally used for onsite preventive and/or corrective maintenance, for initial radio alignment, and for onsite troubleshooting. Alternatively, the CRMP (301) may interface with radios (307*a*-307*h*) using available ports on the radios other than the MDT port, whether or not the given radio includes an MDT and corresponding MDT ports. The ports on the radios and other equipment may be serial (DB-9, DB-15, DB-25, USB-A/B or C, etc.), Ethernet/IP, etc. The CRMP (301) includes corresponding ports for interfacing with the equipment. The CRMP (301) preferably includes several different types of ports to interface with each of the different manufacture equipment, as shown in FIGS. 9A-9D. CRMM equipment (hardware and software) (300) is preferably organized to ensure that monitoring radio and other equipment does not affect Air Traffic control. A/G radios were designed such that data traffic on the MDT port or other ports, including query of configuration settings and error event logs, do not affect radio operation. In this regard, existing radios and equipment are not natively configured to be remotely monitored and controlled, in the manner disclosed herein.

FIG. 4A shows an embodiment in which the CRMM system (300) is deployed to communicate with multiple A/G facilities within a sector. As noted above the ARTCC (311) typically serves more than one sector. The CRMM system (300) therefore may include multiple Control RCE (206) equipment, terminal servers, and Programmable Logic Controllers (351) to collect data and communicate with CRMPs (301) located at multiple A/G facilities throughout sectors and the region. The implementation of CRMM (300) to serve a region can include up to 200 or more CRMPs installed at remote A/G facilities throughout the region.

CRMM (300) Elements

In one embodiment, the CRMM (300) includes at least the following elements at locations that are remote from the ARTCC (311):

Communications Remote Monitoring Panel (CRMP) (301)

Figure 5:
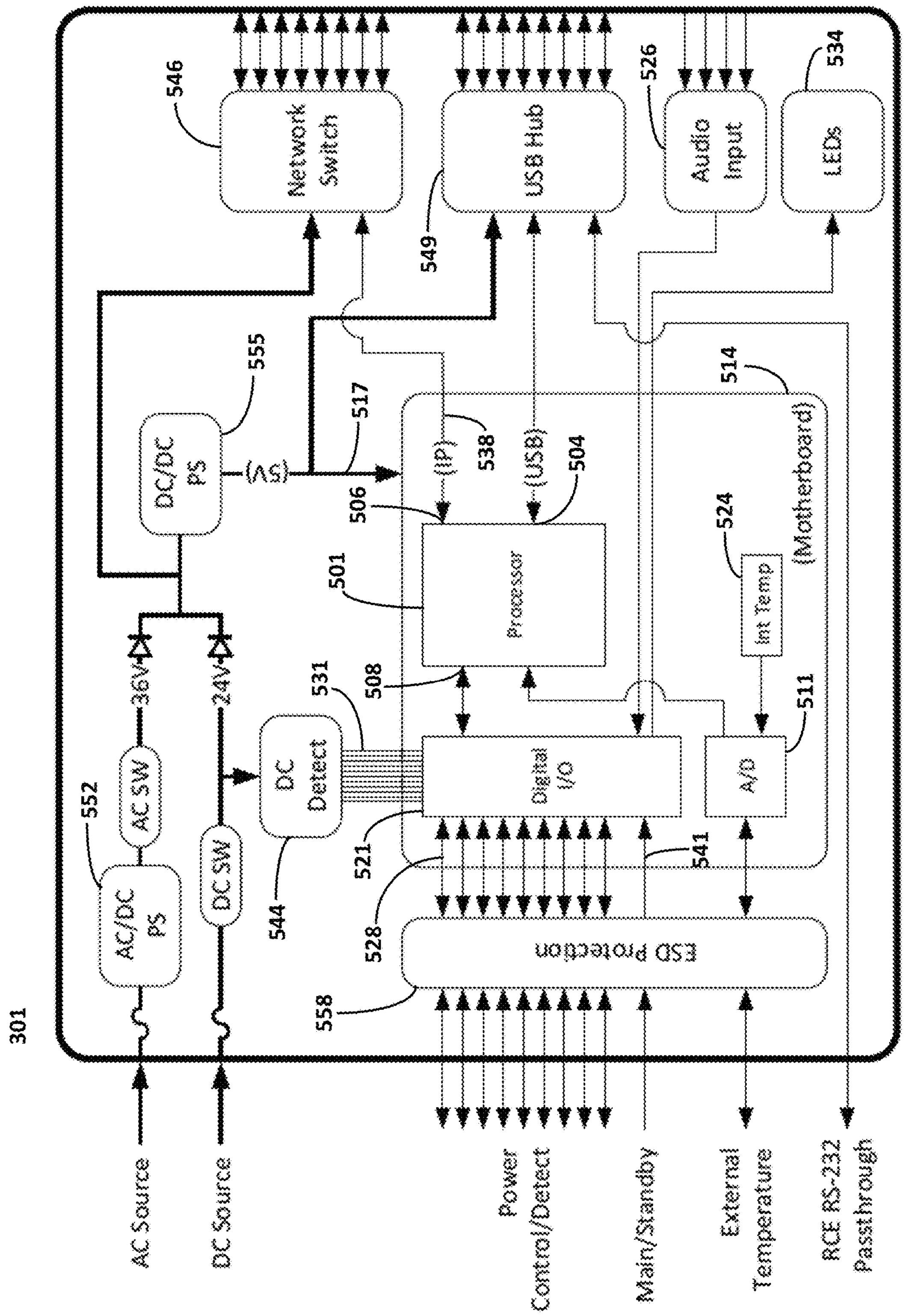
FIG. 5 is a block diagram of a Communications Remote Monitoring Panel (CRMP) (301) according to one embodiment.

As shown in FIG. 5, the CRMP (301) is generally an apparatus containing a computer processor and other components that communicate with one or more radios and other equipment at a remote facility to collect health/status information The CRMP (301) is preferably installed at a remote Air-to-ground (A/G) communication facility (304) having radios/equipment that provide one or more A/G channels (e.g., RCAG, BUEC, RTR, RCO, and ECS). One CRMP (301) is preferably used for each A/G channel located at a remote A/G facility (304). The A/G channel (e.g., RCAG, BUEC, etc.) typically includes radios and equipment to transmit or receive information between air traffic control personnel and one or more pilots. There may be one or more A/G channels (RCAGs, BUECs, etc.) at a remote A/G facility (304) to serve one or more sectors.

Figure 9A:
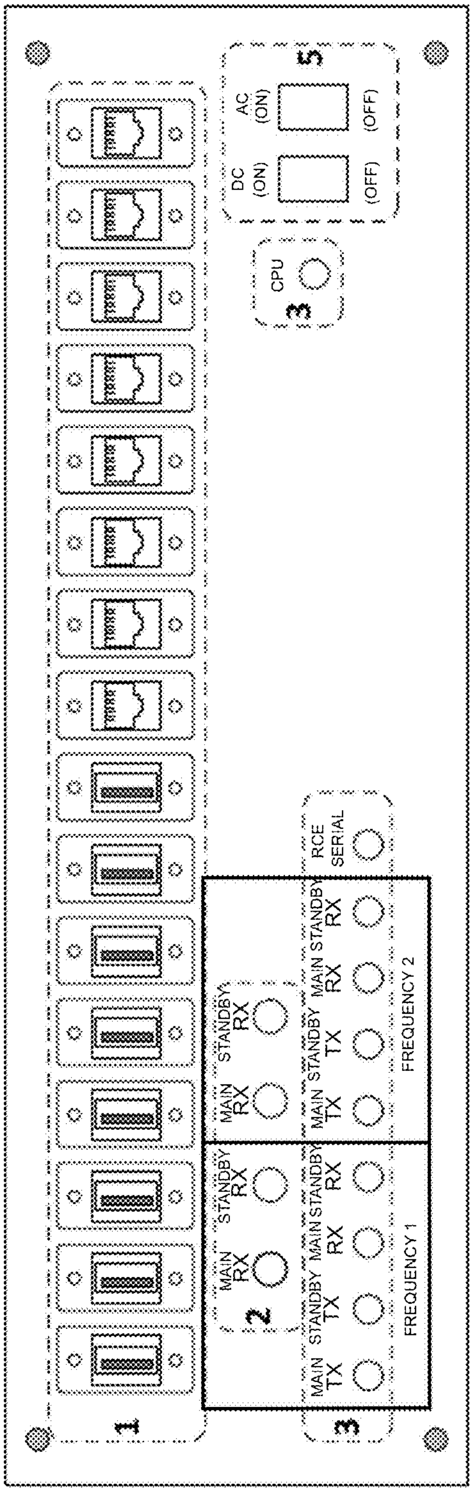
FIGS. 9A-9D, depict exemplary front and rear panel layouts for the CRMP (301)
Figure 9B:
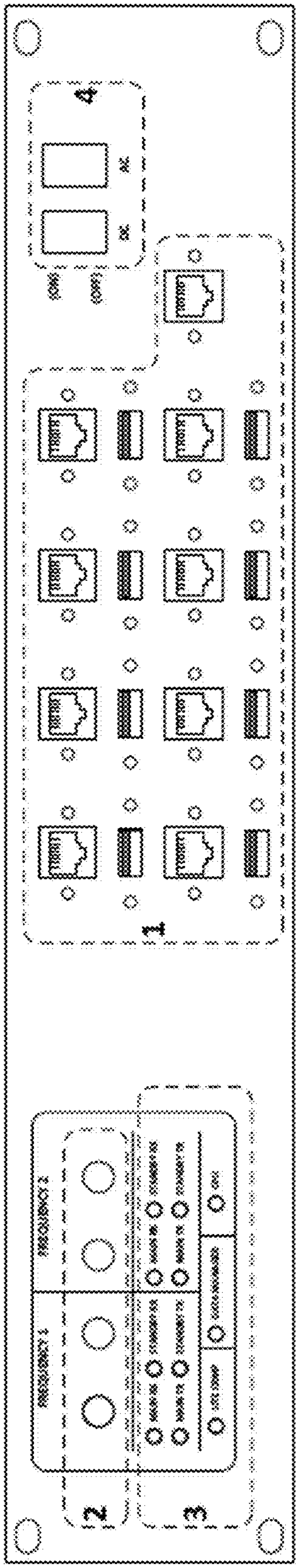
Figure 9C:
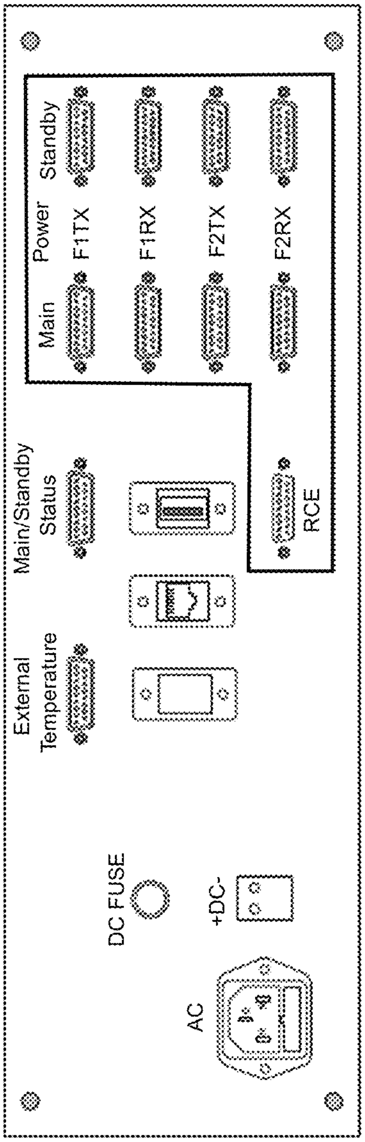
Figure 9D:
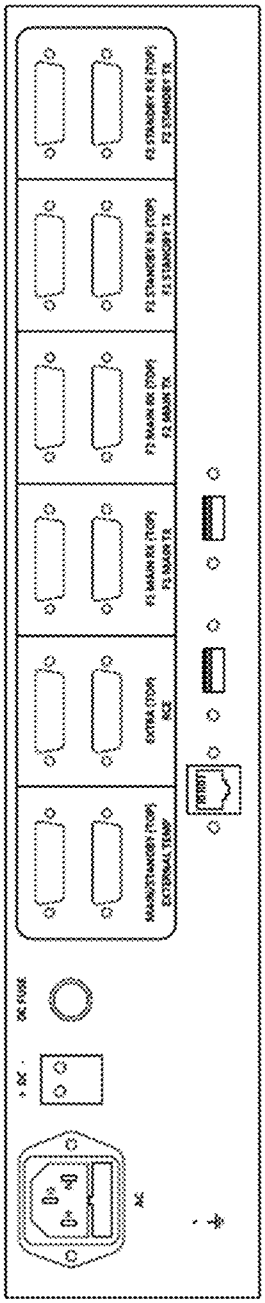

The CRMP (301) is preferably programmed to automatically detect the presence of and communicate with a plurality of different radio series (currently deployed radios). Because different radio manufactures may have different connections, structures, and capabilities, the CRMP provides several options to communicate information with different radio types (serial/IP, baud rates, ports, and radio series command structures). In this regard, the CRMP (301) may include a plurality of different port types, such as Ethernet/IP, serial, etc., as well as audio input/output interfaces, such as TS/TRS, etc. As the CRMP (301) concurrently interfaces with multiple radios for each channel, the CRMP (301) preferably includes a plurality of ports for each of a plurality of different types of communication ports. Exemplary CRMP (301) port layouts are shown in FIGS. 9A-9D. In a preferred embodiment, the CRMP (301) includes one interface/port for each radio and other equipment that the CRMP (301) interfaces with. For example, to monitor/control a rack consisting of eight radios, the CRMP may include eight USB, eight Ethernet/IP, as shown in FIGS. 9A-9B, and eight audio input/output ports (only four shown in FIGS. 9A-9B). The CRMP (301) also preferably connects to other equipment as necessary, which may include Alternating Current (AC) Control module(s) (313*a*), Direct Current (DC) Control module(s) (313*b*), temperature sensor(s) (361), and Remote Radio Control Equipment (Remote RCE) (316). In this regard, the CRMP (301) may also include eight (e.g., serial) ports for power status communication, as shown in FIGS. 9C-9D.

The CRMP (301) is preferably configured to collect and report its own temperature data, DC voltage data, and internal CRMP health status information. The CRMP (301) preferably interfaces with the AC and DC Control devices (313*a*, 313*b*) to detect and control AC/DC power provided to an individual radio (remote troubleshooting and status indications). The interface to the AC and DC Control/Detect module(s) (313*a*, 313*b*) may be via a serial or other type of connection. The CRMP (301) can also collect data from an external temperature sensor (361) outside of the CRMP enclosure to monitor temperature of the site/equipment rack, which may similarly interface with a serial or other type of connection.

The CRMP (301) gathers all the information and sends messages to the Data Manager (325) and other components of the CRMM system (300). In one embodiment, this is carried out using a RS-232 or other serial connection, as shown in in FIGS. 9C-9D. As discussed herein, the CMRP (301) may communicate messages concurrently with voice and VSCS information over a serial type of telecommunication connection, such as the RCE (205). The CRMP (301) preferably uses a novel message format designed to minimize bandwidth usage.

In one embodiment, the CRMP (301) uses several types of CRMP messages, each having a format or data structure for communicating specific information based on the message type. Exemplary message types include a radio data message, temperature message, acknowledge radio message, power status message, timestamp request message, radio event log message, radio parameter message, RCE message, etc. The message for a given type generally includes information specific to the equipment being monitored/connected to the CRMP (301). For example, a radio data message may include information relating to some or all of the radios being monitored by the CRMP (301), whereas the temperature message may include information from one or more temperature sensors functionally coupled to the CRMP (301). Similarly, the power status message may include information relating to the AC/DC power status or parameters of the AC and DC Control/Detect module(s) (313*a*, 313*b*) and/or all or some of the radios connected to the AC and DC Control/Detect module(s) (313*a*, 313*b*) and/or the CRMP (301).

One or more of the message types may have a fixed structure, such as a fixed number and/or arrangement of slots, message length, etc. For example, the temperature message may a header that includes an indication of a message type, followed by the payload, which includes a first slot for internal CRMP (301) temperature and a second slot for an external (e.g., rack) temperature, received from the corresponding sensors attached to the CRMP (301). An exemplary temperature message data structure is provided in Table A below.

TABLE A

| Byte | 0 | 1 | 2 | 3 | 4 |
|---|---|---|---|---|---|
| Description | Message Begin | Message Type/Header and optional bits | Internal Temperature | External Temperature | Checksum |

One or more of the message types may have variable structure, such as a variable number and/or arrangement of slots, message length, etc. For example, the radio data message may include a header that similarly identifies the message type, and a payload that includes information regarding, for example, audio presence and/or whether a radio is set as a main or standby for at least one of the radios being monitored by the given CRMP (301), as determined by information from the audio ports, the VSCS (203), etc. The slots may have a fixed length, for example, a one-byte slot length. In a preferred embodiment, each of all or of fewer than all of the bits in a given slot corresponds to one of the communication ports ($P_m$) and thus corresponds to one of the radios or equipment being monitored by the CRMP (301). For instance, in an eight radio to one CRMP setup, each of the bits in a one-byte slot may provide binary information for one of the eight radios connected to the CRMP (301). For example, the first-fourth bits of a second slot may indicate audio presence for radios R1-R4, and the fifth-eighth bits may indicate whether each of radios R5-R8 are set as main or standby, or any combination thereof.

In one embodiment, the header of a message further includes information regarding whether the message includes optional information, e.g., in one or more additional slots appended to the end of the message. For example, the header slot may include one or more bits, each of which indicate whether the data message includes one or more slots of optional information. For instance, four bits of a one-byte header may be reserved to indicate the existence of at least four optional slots. One of the bits may indicate the addition of more than one slot of generally related information. For example, a first bit in the message header may indicate that the squelch/PTT confirmation byte is present, which in turn may cause the addition of an optional one-byte slot to the message structure, where each bit of the additional slot provides corresponding squelch/PTT information for each of the eight radios connected to the CRMP (301). Similarly, a second bit may indicate that power and modulation bytes are present, which dictates the addition of one-byte slots for TX RF power for each of the transmitters connected to the CRMP (301), and a third bit may indicate that Automatic Gain Control (AGC) bytes is present, which dictates the addition of one AGC slot for each of the receivers connected to the CRMP (301). Finally, a fourth bit may indicate one or more errors being present, which causes one or more one-byte slots with each bit of the additional error slot representing an error status of each of the radios connected to the CRMP (301). An exemplary radio data message structure is provided in Table B below.

TABLE B

<table>
<tr><th></th><th colspan="9">Byte</th></tr>
<tr><th>Desc.</th><th>0<br>Message Begin</th><th>1<br>Message Type/Header and optional bits</th><th>2<br>A-D: Audio Presence<br>E-H: Main/Standby Selection</th><th>3<br>Timestamp (low byte)</th><th>4<br>Timestamp (high byte)</th><th>5<br>Checksum</th><th>6<br>(OPT)<br>Squelch/PTT Confirms<br>A-D: TX;<br>E-H: RX<br>(Sent if Bit D in byte #1 is set)</th><th>. . .<br>(OPT)</th><th>16<br>(OPT)<br>Error Status<br>(Sent if Bit A in byte #1 is set)</th></tr>
<tr><td></td><td></td><td>< 0 | ABCD ></td><td>< ABCD | EFGH ><br>A: F2 RX SB<br>B: F2 RX M<br>C: F1 RX SB<br>D: F1 RX M<br>E: F1 TX<br>F: F2 TX<br>G: F1 RX<br>H: F2 RX</td><td></td><td></td><td></td><td>< ABCD | EFGH ><br>A: F2 TX SB<br>B: F2 TX M<br>C: F1 TX SB<br>D: F1 TX M<br>E: F2 RX SB<br>F: F2 RX M<br>G: F1 RX SB<br>H: F1 RX M</td><td></td><td>< ABCD | EFGH ><br>A: F2 TX SB<br>B: F2 TX M<br>C: F1 TX SB<br>D: F1 TX M<br>E: F2 RX SB<br>F: F2 RX M<br>G: F1 RX SB<br>H: F1 RX M</td></tr>
</table>

The radio data message may be sent at predefined intervals of time, such as every 0.5-1.0 seconds. Other messages may be sent on a different schedule, e.g., every 60 seconds, and/or in response to certain events (event-based) or in response to a query/request from the central location. In one embodiment, slots 1-5 of Table B above are required for each radio data message sent from the CRMP (301) to the central location. In another embodiment, radio data messages may include one or more optional slots, such as optional slots 6-16. The radio data message may be sent to the central location with all available slots, even if there is no data for any one or more of the optional slots. In this instance, the optional bits in the header would indicate that data in certain of the associated optional slots is not present and can therefore be overlooked. In another embodiment, the message may be sent with only the optional slots that have data to report. In this instance, the optional bits in the header dictate which optional slots to include and therefore the length of the data message itself. In the exemplary message structure (Table B), an indication of presence is bits A-D of slot 2 may result in a message length of all 16 slots, whereas an indication of presence only in bit A may result in a message length of only 6 of the 16 or more available slots.

A full data message (with all required and optional slots whether information is available or not for those slots) may be sent initially and then periodically by the CRMP (301) or may further be sent in response to a request from the Data Manager (325), for example, in the case of a bad checksum. At other times, the data message may contain the required slots and optional slots, but only if the specific information reported to the central location in a prior data message has changed.

An acknowledge radio message may include a similar header and a payload that includes a text string relating to the status of one or more items of equipment being monitored. The text string may be a number, e.g., 0-99, that may be converted at the central location to a text message. For example, 0 may be translated into the status message "Warm Reset Initiated", 1 may be "Factory Reset Initiated", etc. Acknowledge radio messages may be communicated on an as-needed basis, for example, in response to a request or command from the Data Manager (325). The radio event log message may similarly report radio events to the Data Manager (325) for display in a log of events for each of the radios connected to the CRMP (301).

Power status messages may be sent on an event-based basis (when something changes) or periodically, for example, if an event has not happened in over 60 seconds). The power status message generally includes a header, preferably with optional bits, and a payload that provides the power related information for the equipment being monitored by the CRMP (301). The power related may include power presence as well as operating parameters.

The timestamp request messages may be initiated by the CRMP (301) to request the current time from the Data Manager (325). The timestamp response from the Data Manager (325) may be used to timestamp outgoing messages from the CRMP (301).

The radio parameter information message may include a similar header and payload, which may include a text string reporting one or more operating parameters for each of the radios being monitored by the CRMP (301). This message may similarly be sent periodically and on an as needed basis. The RCE message may include a payload that reports the status of the network interconnecting the CRMP (301) with the central location. RCE messages may be sent on an event-based basis (when something changes), or periodically (if an event has not happened in over 60 seconds, for example).

Messages between CRMP FULL and LITE are preferably in the CRMP message format. In this regard, the CRMP FULL may relay messages from the CRMP LITE, or may parse the LITE messages and may send messages to the Data Manager (325) that consist of a compilation of information from the equipment connected to both the CRMP FULL and CRMP LITE in a single message. If CRMP LITE information is not available, the CRMP FULL may send messages periodically or on an as needed or event basis (when something has changed) to the Data Manger (325). The CRMP FULL may communicate the CRMP LITE information on an event basis when it becomes available and/or changes.

The CRMP (301) includes USB and Ethernet/IP connections/ports to connect to radios of different manufacture. The CRMP (301) may be connected to radios of certain manufacture by a serial connection through the USB ports in conjunction with a USB-to-Serial adapter. The CRMP (301) may be connected to radios of other manufacture by an Ethernet/IP connection.

The CRMP (301) can be powered by AC power and/or DC power. In a preferred embodiment, the AC input is the primary power source, and DC input is the back-up power source for the CRMP (301).

CRMP Elements.

One embodiment of the CRMP (301) is presented in FIG. 5 and FIG. 6 and is further described below.

Motherboard.

In one embodiment, the CRMP (301) includes a motherboard (514) that, in turn, preferably includes several components, including the following: CRMP processor (501); digital I/O (521); an Analog to Digital (A/D) converter (511); and internal temperature sensor device (524).

In a preferred embodiment, the CRMP Processor (501) is a System on a Chip (SOC) computer with a Linux based operating system. The SOC (501) computer preferably has USB ports (504), a network port (506), Inter-Integrated Circuit (I2C) synchronous, multi-master/multi-slave, single-ended, serial communication bus, Serial Peripheral Interface (SPI), and digital input/output pins (508) that facilitate the various CRMP (301) functions.

Digital I/O (521) preferably provides expansion I/O capabilities and interconnections to/from the CRMP Processor (501) to the other components internal and external to the CRMP (301).

In addition to the above, in a preferred embodiment, the motherboard (514) interconnects DC input power (517) and digital I/O (521) for the CRMP Processor (501), Inter-Integrated Circuit (I2C) (not shown), and Serial Peripheral Interface (SPI) hardware (not shown) within the CRMP (301). The motherboard (514) also preferably provides connectors/connectivity for A/D conversion, including an A/D converter (511), and circuitry for an internal temperature sensor device and/or circuitry (524). The motherboard (514) further preferably provides connectors/interconnectivity for the Audio Detect Board (526), power detect/control circuits (528), DC voltage detection circuitry (531), front panel LEDs (534), internal network switch status contacts (538), and RCE Main/Standby selection (541), as will be further described below.

Software

The CRMP software (not shown) executed by CRMP processor (501) preferably executes a multi-threaded Python™ program. The CRMP software is preferably installed remotely by the Data Manager (325) or locally using an interface port on the CRMP front panel.

In one embodiment, the CRMP software executes regular queries for presence of radios (307*a*-307*h*) and equipment. In one operation, a CRMP software script searches USB ports (504) for serial connectivity to radio devices and the DM (325). This may be achieved by detecting power (V+/−) at serial port power pin, for example. Alternatively, presence may be determined based on a similar signal from the serial ports of the AC and DC Control devices (313*a*, 313*b*)

associated with each of the radios/equipment. If a radio device is detected, the CRMP (301) automatically detects the radio type and serial number. The script uses the serial number to determine what function the radio device performs in the rack (Main/Standby, F1/F2). Once a radio device is detected, the script periodically queries the monitoring data from the radio and performs any remote commands/queries (Event Log query, parameter setting query, warm/factory reset, etc.) sent by the DM (325).

In another operation, the script searches IP addresses for radio devices that are connected to the CRMP (301) through an IP connection and detects the radio type and serial number. The script uses the serial number to determine what function the radio performs (e.g., Main/Standby, F1/F2). Once a radio device is detected, the script queries the monitoring data from the radio periodically and performs any remote commands/queries (e.g, Event Log query, parameter setting query, warm/factory reset, etc.). The IP addresses of the radios are preferably set prior to connecting to the CRMP (301). Any radio can be connected to any port, but each radio must have a unique IP address to communicate with the CRMP (301).

In another operation, in one embodiment the script hosts Maintenance Data Terminal (MDT) connections. The MDT connections execute software that allows users to configure the CRMP (301) mode of operation and associate radios with their operational function (e.g., main vs. standby).

As discussed, the CRMP (301) may include multiple types of communication interfaces, such as serial and Ethernet/IP. Even though different radios may use the same type of physical interface, the equipment communication specification, e.g., the protocol, command(s), data structure, and/or syntax, used may nonetheless differ between radios. For example, serial communications over a common serial connection port may occur using 300, 1200, 2400, 4800, 9600, 19200, 38400, 57600, 115200 or other standard and non-standard baud rates. Even at the same baud rate, the radios or other equipment may be configured to communicate using a particular protocol, data structure, and/or syntax for command(s), query (ies), etc. For instance, a first radio may use serial at a baud rate of 38,400, a second radio may use serial at a baud rate of 9600, and a third radio may use an IP telnet session. All three radios may use different command/query syntax, etc.

Therefore, in addition to detecting presence of the radio or other equipment, the CRMP (301) preferably executes a routine to identify and set for each port the communications specification to be used between the CRMP (301) and each of the radio (307*a*-307*h*) and other equipment. Once set, the specification used persists for a given communication port until presence of the equipment at that port is disrupted, for example, when a new radio is placed into service or when an existing radio or other equipment is reset, etc.

The identification of the applicable communication specification for each port may be achieved in a variety of ways. In one embodiment, the CRMM system (300), e.g., the CRMP (301), uses a template for each of the possible specifications. For example, a first template may specify the baud rate, protocol, etc. for a first radio and a second template may specify the baud rate, protocol, etc. for a second radio, where at least one of the first and second templates have at least one parameter that differs between them. The CRMM system (300) may maintain such templates for each radio or other equipment available in the NAS. The templates may be maintained locally at the CRMP (301) and updated periodically as new equipment becomes available. This allows the addition of radios and other equipment without needing to modify the code to accommodate the new communication specification.

When equipment presence at a given port is first detected, the CRMP (301) in response sends queries/requests to the equipment formatted using each of the communication specifications/templates in succession until a valid response from the equipment is received. For example, the CRMP (301) may send a first query using the first specification associated with a first radio. If a valid response is received, then the CRMP (301) knows what kind of radio is present on the given port and will use the specification associated with that kind of radio for further communication. If a valid response is not received, the CRMP (301) sends a second query using the specification associated with the second radio, etc. Similar searching may be performed by the CRMP (301) to determine the applicable communication specification on the IP communication ports. The CRMP (301) continues querying the radio (307*a*-307*h*) and other equipment using each of the available templates/specifications, in succession, until the equipment sends a valid response containing the requested information, e.g., the radio type and serial number, etc. Thereafter, messages between the respective equipment and the CRMP (301) will continue using the applicable communication specification. The CRMP (301) may further be configured to confirm based on the type of radio and serial number that the applicable communication specification is correct and/or select a more appropriate communication specification, if for example, the query triggers a valid response from multiple radios that nonetheless use a different communication specification.

The CRMP (301)-DM (325) communication specification (e.g., syntax/data structure) likely differs from the CRMP (301)-radio/equipment specification. As such, the CRMP (301) preferably translates messages/commands or portions thereof (queries/syntax, etc.) received from the Data Manager (325) before relaying them to the radio (307*a*-307*h*) and other equipment. Alternatively, the Data Manager (325) may send messages/commands to the CRMP (301) formatted for the particular radio that is being interrogated/controlled. For example, the Data Manager (325) may send a "soft reset" command in a first syntax for a first radio and the same command in second syntax, different from the first syntax, for a second radio.

In addition to the above, and with further reference to FIG. 5, a CRMP software script interfaces with the Analog to Digital (A/D) converter (511) on the motherboard (514) to measure the internal and external temperatures. The script preferably detects AC power presence, DC power presence, assert power, audio presence, internal network switch health/status, DC voltage measurements, and Main/Standby selection from the Remote RCE.

As described below, a combination of software and hardware elements validate that the CRMP power is present and that the CRMP software is running. The power control functions of the CRMP are tied to the software/hardware validation to prevent the CRMP (301) from removing AC/DC power if the CRMP (301) is not powered or the CRMP software stops running. In other words, the AC and DC Control/Detect module(s) (313*a*, 313*b*) may be configured to normally provide AC/DC power to the radio (307*a*-307*h*) and other equipment so that any fault with the CRMP (301) will not interrupt the operation of the equipment. In one embodiment, power control is released within seconds of either CRMP power loss or CRMP software stopping for any reason.

In a preferred embodiment, the following safeguard prevents the CRMP (301) from inadvertently removing AC or DC power from a connected device (e.g., radio or RCE). When operating normally, the CRMP software toggles the output state of a digital output pin on the motherboard (514) to create a square wave signal. If the CRMP software terminates for any reason, the output signal stops toggling. The output pin state is monitored by low-pass filtering the square wave to create an average level of the toggling output signal. This averaged signal is passed to two comparator circuits (not shown): one to ensure the output signal has not stopped in the "high" state, and a second to ensure the output signal has not stopped at the "low" state. The output of these two comparators are logically ANDed together to generate a new signal that represents if the output signal is still toggling. The logically ANDed comparator output is then logically ANDed with the Power Control functions of the CRMP Processor (501). For power OFF assertion to occur, the CRMP (301) must be powered; the CRMP (301) must be ON; the CRMP software must be running normally; and the CRMP Processor (501) must be asserting a Power OFF signal. In all other cases, power control is disabled, and all connected devices receive power. Additionally, the CRMP software monitors the power control assertion outputs to ensure the actual output matches the desired output/state. If a mismatch occurs, the CRMP (301) attempts to correct the mismatch, and will disable the toggling output signal if correction attempts fail.

Audio Detect Board

The Audio Detect Board (526) preferably receives the audio output from radio receivers and/or transmitters via audio ports, to the extent that receivers and/or transmitters are configured with audio output, as shown in FIGS. 9A-9B, and rectifies and low-pass filters the audio signal, and then compares the filtered signal level to an adjustable reference voltage. In certain configurations, the CRMP (301) may be configured to monitor output from receivers only, in which instance the CRMP (301) may be configured with four audio input ports and corresponding circuits. The Audio Detect Board (526) outputs whether the audio level is above or below a reference voltage. The reference voltage is set to differentiate between a non-receiving condition (either no audio or weak audio) and a receiving condition (strong audio). In one embodiment, the Audio Detect Board (526) only measures the amplitude of the audio. The reference voltage is internal to the CRMP (301) and is preferably aligned during assembly so that adjustments are generally not needed in the field. Audio Detect Board (526) outputs are received and processed by the CRMP Processor (501) and transmitted to the CRMM (300) system to convey audio presence for a radio receiver. Audio presence may be depicted at the CRMP (301), e.g., via LEDs on the front panel or internally within the CRMP (301), and/or at the central location/ARTCC (311) via the GUIs. This presence of audio status helps with fault identification and troubleshooting remotely of transmitters and receivers. For example, the threshold comparison of the audio signal from the receiver may be used to see if the receiver is demodulating audio.

DC Voltage Detect

The DC voltage detect board (544) enables monitoring and measurement of DC voltage input to the CRMP, e.g., from the DC Control/Detect module(s) (313*b*). FIG. 6 shows one embodiment of components of the DC Voltage Detect board (544) used to measure DC voltage input to the CRMP (301).

Figure 6:
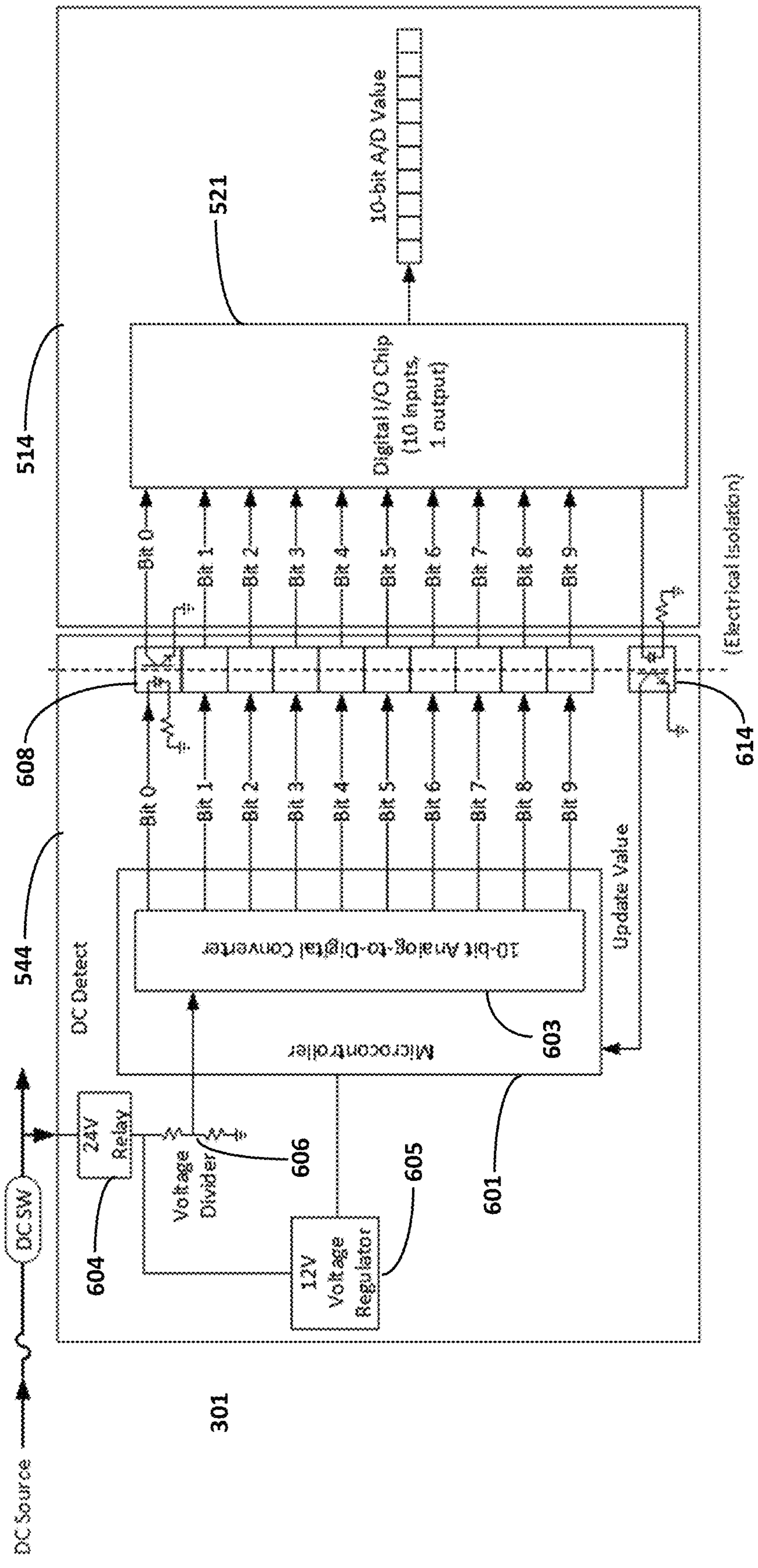
FIG. 6 is a diagram showing components of the DC Voltage Detect Board used to measure DC voltage input to the CRMP Motherboard/Processor (514, 501), according to one embodiment.

In the embodiment of FIG. 6, the DC voltage detect board (544) includes a microcontroller (601) with a built-in 10-bit A/D converter (603) to digitize the DC voltage that will be applied to the CRMP (301). The incoming DC voltage may first be routed through a 24V DC relay (604). This relay (604) provides low-voltage DC-cutout functionality for the circuit, preventing the microcontroller (601) from operating below its intended minimum voltage (approximately 6V DC). The output of the relay connects to two circuits: a voltage regulator (605) and a resistive voltage divider (606). The voltage regulator (605) regulates the incoming DC to 12V to power the microcontroller (601). The voltage divider (606) divides the DC voltage to keep the incoming voltage below a maximum rating of the microcontroller A/D inputs. In a preferred embodiment, the voltage divider (606) divides the DC voltage by seven to keep the incoming DC voltage below 5V.

When a DC voltage measurement is performed, a sample average may be taken on the DC voltage to remove noise/variations. In a preferred embodiment, the DC voltage detect board (544) performs a ten-bit A/D conversion of the DC voltage and uses each of the ten bits to drive ten opto-isolators (608). The opto-isolators (608) provide electrical isolation between the DC input circuitry and the CRMP processor (501)/motherboard (514). Each opto-isolator output is read in by digital I/O chips (521) on the motherboard and the CRMP software reconstructs the 10-bit value.

An eleventh opto-isolator (614) may be present on the DC Voltage Detect board (544) and is controlled by the CRMP software. The CRMP software toggles the state of the opto-isolator when the A/D value has been acquired. The detect board takes a DC voltage measurement every time a rising or falling edge is detected on the eleventh opto-isolator (614).

Network Switch

Referring back to FIG. 5, a network switch (546), which is preferably unmanaged, is included in the CRMP (301). This network switch (546) provides electrical protection for the CRMP processor (501) and IP connectivity to radios and/or an MDT. The externally accessible network ports may be internally connected to a network switch within the CRMP (301). These ports provide IP connectivity to radio equipment so equipped. The switch can also provide external connectivity for future IP reporting and connectivity. In an unmanaged state, the network switch (546) does not require configuration and enables connectivity to radios or devices without specifying channels or data rates.

USB Hub

The CRMP (301) also preferably includes a multi-port USB hub (549), which provides further electrical protection for the CRMP processor (501) as well as USB connectivity between the processor and any radios connected to the CRMP (301) through USB, for example, using a USB-to-serial adapter. In one embodiment, the USB hub (549) is used to connect the CRMP to a Remote RCE through a serial port, in order to communicate with the CRMM system (300). The hub also preferably provides external connectivity for future USB devices/sensors/interfaces.

Power and ESD

The CRMP (301) further preferably includes an AC/DC power supply unit (552) as well as a DC/DC power supply unit (555), according to one embodiment. The CRMP also preferably includes an Electrostatic Discharge (ESD) protection device (558).

AC Control/Detect Module and DC Control/Detect Module

In addition to the foregoing components, the CRMM (300) preferably also includes an AC Control/Detect Module (313*a*) and a DC Control/Detect Module (313*b*). The AC Control/Detect Module (313*a*) is an apparatus to detect the presence of AC power for each radio (307*a*-307*h*) and Remote RCE (316). The AC Control/Detect Module (313*a*) preferably receives signals from the CRMP (301) to apply/remove AC power from a device remotely. In one embodiment, the AC Control/Detect Module (313*a*) contains circuitry to control and detect AC presence for a single piece of equipment. In another embodiment, the AC Control/Detect Module (313*a*) contains circuitry to control and detect AC presence for up to five pieces of equipment connected thereto. The DC Control/Detect Module (313*b*) is an apparatus to detect the presence of DC power for each radio (307*a*-307*h*) and Remote RCE (316). The DC Control/Detect Module (313*b*) receives signals from the CRMP (301) to apply/remove DC power from a device remotely. The DC Control/Detect Module (313*b*) contains circuitry to detect and control DC power for a plurality of devices.

Referring now to FIGS. 3A and 3C, the CRMM (300) preferably also includes the following elements co-located at the central location, e.g., the ARTCC (311):

Terminal Server

The Terminal Server (TS) (354) is preferably a commercially off the shelf (COTS) gateway device that converts the serial communications to and from the CRMP (301) to Internet Protocol (IP) packets used by the various CRMM devices at the central location, e.g., the ARTCC (311). The TS (354) enables communication between the CRMP (301) and the CRMM devices connected on the internal LAN (331). The TS (354) is installed within or near the Control RCE (C-RCE) equipment at the ARTCC (311). A TS (354) connects one or more C-RCE (322) to the CRMM network switch (359). More than one TS (354) may be needed to enable communication with a plurality of CRMPs (301), depending on the number of CRMPs (301) that are included. For example, FIGS. 4 and 4B show multiple terminal servers to enable communication with a plurality of CRMPs.

In one embodiment, a single serial port on the TS (354) connects to a single C-RCE RS-232 pass-through port using the provided C-RCE breakout boards (not shown). This conversion allows scalability at the ARTCC (311). The TS (354) preferably contains a plurality of serial ports to transmit or receive serial data and one or more IP connections to transmit or receive IP data. A Programmable Logic Controller (PLC) (351) in the C-RCE rack is also connected to one of the serial ports on the TS (354).

During installation, each TS (354) is preferably assigned a unique IP address for use on the CRMM internal IP network. Each physical serial port on the TS is also preferably assigned a unique IP port number. The Data Manager (325) uses the unique IP port number to distinguish between the individual serial ports on a single TS (354). A Data Manager (325) (discussed below) preferably uses the IP address and the IP port number to connect to CRMPs (301) and PLCs (351). The TCP/IP connection for each serial port is setup to transmit or receive any packets as they arrive to the TS (354). This prevents buffering delays and helps with troubleshooting.

Data Manager

The Data Manager (DM) (325) is preferably a COTS computer installed at the ARTCC facility (311) to manage the data messages and routing of information between the various CRMM devices located at, e.g., the ARTCC (311). The DM (325) handles all the messages to and from the CRMPs (301).

The DM (325) performs one or more of the following functions: (1) manage all monitoring messages to/from the CRMPs (301) through the TS (354); (2) use the NTP server (357) to timestamp CRMP messages; (3) relay all CRMP messages to the RMS concentrator (341) for upload into RMLS (344); (4) manage the connections and messages to/from one or more RMMC positions (328); and, (5) associates the incoming CRMP messages with a Facility ID, Facility type, Sub-ID, sector, and additional information described below.

In a preferred embodiment, each CRMP message is associated with a Facility ID, Facility Type, sub-ID, and sector. These four pieces of information uniquely identify the equipment being monitored by the CRMP (301). A unique Facility ID is assigned to each radio communications facility to identify the specific facility. The Facility Type represents the type of radio communication facility, e.g., RCAG, BUEC, RCO, etc. A facility Sub-ID may be designated to differentiate among multiple RCAG/BUEC channels that may be located at a specific facility. Each radio communications facility is associated with a specific sector of the NAS based on the physical location of the facility or the operation of the facility. As described in Background above, each of the 22 regions of the NAS are further subdivided into sectors (104*a*, 104*b*, 104*c*) to facilitate the management of air traffic and equipment at a smaller scale (sector area may range from several thousand to over a hundred thousand square miles).

In one embodiment, the DM (325) executes custom Python code, but it will be understood that other suitable computer languages may be used. The DM (325) manages all the incoming/outgoing messages from/to each individual CRMP (301) through the TS (354). An ARTCC (311) may have over 200 separate pairs of Remote RCE (316) and Control RCE (322) ("RCE pairs"), each with its own CRMP (301). As an illustrative example, FIGS. 4A and 4C depict multiple RCE pairs that communicate with a DM. The DM (325) uses a Network Time Protocol (NTP) server (357) (described in more detail below) to timestamp incoming and outgoing CRMP messages and to synchronize CRMP clocks. The DM (325) relays CRMP messages to a RMS Concentrator (341) (described in more detail below) for upload into RMLS (344), preferably using User Datagram Protocol (UDP) through the Network Isolation Device (337). The Data Manager (325) hosts the TCP connection and handles the CRMP messages to/from a RMMC Position (328).

As noted above, the Data Manager (325) also correlates the Facility ID, Facility type, Sub-ID, and sector with incoming CRMP messages. This information is needed for uploading data into RMLS (344). If the CRMP message data is corrupt or the CRMP sends a request, the Data Manager (325) responds to the CRMP accordingly. The DM (325) uses a configuration file to associate a CRMP connection on a TS (354) to a Facility ID, Facility Type (e.g., RCAG, BUEC, RTR, RCO, ECS), Sub-ID, and sector (for informational purposes). The configuration file is created using the Data Manager Configuration Software (DMCS) application. The DMCS may be installed on the maintenance data terminal (MDT). In a preferred embodiment, the DM Python script parses the configuration file created by the DMCS.

The configuration file contains the IP connection information for all CRMP connections and PLC devices (351) available at the ARTCC (311). The following information is included for each CRMP entry in the configuration file: IP address and IP port number on the Terminal Server for each CRMP connection; Facility ID; Facility Type (RCAG, BUEC, RCO, ECS, RTR, etc.); Sub-Identification Number (Sub-ID); the associated Sector (for informational purposes); Site Reference Number; RCAG/BUEC pairing information; Power and Telco presence, and Dual BUEC mode. The Python code periodically checks for new configuration files and updates the CRMP connections.

The Sub-Identification Number provides a way to differentiate between multiple equipment racks located at a single Facility ID and Facility Type combination. This is useful because the RMLS data is organized using Facility ID and Facility Type combinations. The Site Reference Number is used to indicate where the equipment is located in the ARTCC (311) equipment room for troubleshooting purposes. The reference number is also used internally by the Data Manager and RMMC to associate the PLC data to a specific site. The RCAG/BUEC selection information is only available from a Control RCE (322) connected to a BUEC. The Data Manager can internally associate the RCAG/BUEC selection information from a BUEC RCE with its paired RCAG so that the RCAG/BUEC selection status for the RCAG is correct. Dual BUEC mode is where a single CRMP (301) simultaneously monitors two BUEC channels, instead of requiring one CRMP (301) for each of the two BUEC channels. The Dual BUEC selection information is sent from the DM to the CRMP (301) to configure the CRMP (301) for Dual BUEC mode.

The DM (325) may modify (adds to) incoming CRMP messages to indicate AC power presence and DC power presence. The DM (325) modifies messages from the PLC (351) to hide/show (RCE) trunk presence between the central location and remote location. Technicians at the ARTCC (311) can select the power presence and trunk presence information for each site. This information is used to hide/show AC power, DC power, and/or Trunk status information on the RMMC (328) based on the site configuration, and designates the site of the radios (307*a*-307*h*) or telecommunication lines (trunks) (319).

The following information is preferably included for each PLC device (351): the IP address and IP port number on the TS (354) for each PLC device connection, and a listing of the sites monitored by the PLC device (351) (a single PLC device can monitor up to 12 Control RCEs).

The DM (325) may also be connected to the CRMM network switch (359). The DM (325) preferably contains an IP port for connection to the internal LAN (331) used with the CRMM (300).

Programmable Logic Controller

The Programmable Logic Controller (PLC) (351) is preferably a COTS industrial controller that monitors the status of the telecommunications lines (trunks) (319) and Remote Communications Air/Ground (RCAG) or Back-Up Emergency Communication (BUEC) selection status for each C-RCE (322) installed at the ARTCC (311). In one embodiment, the PLC (351) is connected to the digital outputs of one or more C-RCE. The PLC regularly polls each connected C-RCE on the status of the trunk lines and the current RCAG/BUEC selection status for the C-RCE. The PLC (351) sends messages on the status to the Data Manager (325) through a serial port on the TS (354). More than one PLC may be needed to enable monitoring through a plurality of C-RCEs, depending on the number of C-RCEs that are included.

The PLC (351) preferably uses a combination of periodic-based and event-based methods to send status messages to the Data Manager (325). In one embodiment, the PLC sends a periodic status update to the Data Manager every 2 seconds if the data points remain unchanged. When a data point does change, an immediate update is sent to the Data Manager.

Network Switch

The Network Switch (NS) (359) is preferably a COTS network switch that interconnects at least the following CRMM IP devices at the ARTCC (311): Terminal Servers (TS) (354), Data Manager (325), Remote Maintenance Monitor and Control (RMMC) Position(s) (328), NTP server (357), and Network Isolation Device (337). The NS preferably includes a plurality of IP ports for connecting the various IP devices within the CRMM system together. To maintain security boundaries, the Remote Monitoring System (RMS) Concentrator (341) is not connected to the network switch.

Remote Maintenance and Monitoring Control (RMMC) Position

The RMMC (328) is a computer that processes and displays the CRMP data and, in one embodiment, on a touch-screen display. It is preferably embodied as a system-on-chip (SOC). There can be multiple RMMCs (328) at an ARTCC (311). The RMMC (328) generally runs communications remote monitoring software that communicates with the Data Manager (325) to display monitoring data from remote A/G facilities coming into the ARTCC (311). The RMMC (328) preferably includes a touchscreen-based graphical user interface (GUI) that allows users/technicians at the ARTCC (311) to view the incoming radio/site data real-time through indicators, text boxes, and plots.

The RMMC (328) preferably allows the user to execute on-demand remote query/control commands: remote radio resets (warm, factory, and power ON/OFF control), remote radio parameter queries, radio event log queries, and R-RCE power cycles, and plotting of historical data for troubleshooting). Multiple RMMCs (328) can be connected to the CRMM network switch (359), allowing multiple locations to view the CRMM/CRMP data.

In a preferred embodiment, each RMMC position is equipped with a configuration printed circuit board (not shown) that connects directly to the SOC. This board provides IP address configuration information and a jumper that enables/disables the power and reset controls in the GUI. When the communications remote monitoring software launches, the IP address configuration pins are read in and the IP address of the SOC is assigned (to minimize IP address conflicts on the CRMM network). The power and reset control enable/disable setting is also read when the communications remote monitoring software launches.

Network Time Protocol (NTP) Server

The NTP Server (357) is preferably a COTS time server installed at an ARTCC (311). The NTP server (357) is used to maintain accurate date and time stamps on all CRMM/CRMP messages. The NTP server (357) preferably connects to an output of a Global Positioning System (GPS) receiver, which includes an Inter-Range Instrumentation Group (IRIG) time code to provide synchronized time for the Data Manager (325) and other devices on the CRMM network. The IRIG time code standard provides a standard protocol to promote time synchronization. As known to those of skill in the art, the GPS receiver acquires signals from geosynchronous satellites and provides date and time information over the network to service facilities in the NAS. The NTP Server (357) preferably connects to the CRMM system using an IP port.

Network Isolation Device.

The Network Isolation Device (337) is a COTS device that provides deterministic data transfer unidirectionally. The Network Isolation Device (337) provides isolation between the CRMM network that utilizes the internal LAN (331) and an external LAN (334) and limits the flow of data to one direction. The Network Isolation Device (337) allows the Data Manager (325) to send outgoing messages to the RMS Concentrator (341) but blocks all incoming messages from outside the CRMM network. The Network Isolation Device (337) prevents an entity outside the ARTCC (311) from accessing radio equipment through the external LAN (334). In a preferred embodiment, the Network Isolation Device (337) includes IP ports for connection to the Data Manager (325), Network Switch (359) and the RMS Concentrator (341).

Remote Monitoring System Concentrator

The Remote Monitoring System (RMS) concentrator (341) is preferably a COTS computer that is programmable and establishes a connection to RMLS (344) to upload CRMM data. The RMS Concentrator (341) receives CRMP messages from the Data Manager (325) through the Network Isolation Device (337), parses them, and sends the data points across an external LAN (334) for upload to RMLS (344). The RMS Concentrator (341) converts the custom CRMP messages into Common Message Handling Protocol (CMHP) (FAA-E-3039) messages to upload data into RMLS (344). CMHP is an FAA-developed application-level protocol that is designed for TCP/IP users and adds functionality, including message delivery assurance, regardless of the number of sockets traversed between end-systems. It will be understood that similar commercially-available application-level protocols with similar functionalities are available.

In one embodiment, the RMS Concentrator (341) runs custom Python and C/C++ code to parse the incoming messages from the Data Manager (325). The RMS Concentrator preferably runs a separate database process to manage the data points and the RMLS CMHP connection. In a preferred embodiment, the Network Isolation Device (337) connects to the RMS Concentrator (341) using a LAN card (PCI card) and the external LAN (334) connects to the RMS Concentrator using an IP port.

Figure 3D:
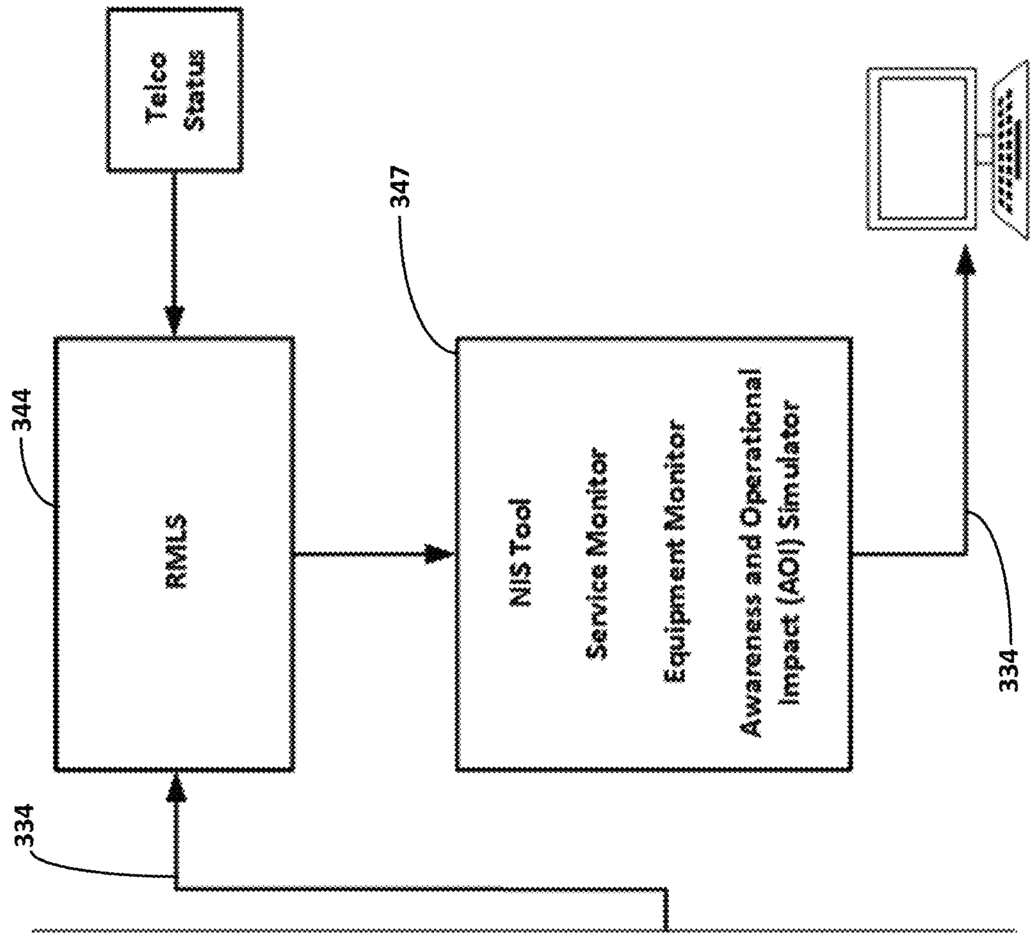

In addition to the above, output data and information of the CRMM (300) may be used to provide important information to additional systems. As seen in FIGS. 3A and 3D, two of those systems include the FAA's Remote Monitoring and Logging System and NAS Infrastructure (NIS) Tool, which provide monitoring information for a variety of FAA infrastructure, including, but not limited to, radios and equipment. Personnel use these applications to monitor and maintain facilities and equipment, such as A/G radio facilities, and to develop situational awareness of overall system status and coordinate appropriate maintenance response. Each will be briefly described below.

Remote Monitoring and Logging System

The Remote Monitoring and Logging System (RMLS) (344) is an FAA database system that stores data from various FAA systems. The RMLS (344) implements logging, monitoring, and control functionality for FAA equipment in the NAS. The RMLS (344) provides a single repository across the FAA for all remote maintenance and logging data provides monitoring capabilities to remote personnel, engineering groups, program offices, and other NAS users. The RMLS (344) includes dedicated databases to help track, organize, and report maintenance, outage and notification events for radio communications equipment, radar, navigation equipment, and other equipment in the NAS. RMLS (344) provides a common platform for recording, tracking, and reporting maintenance and administrative activities related to the operational performance of NAS facilities and equipment.

Personnel can use a Microsoft® Windows®-based application with RMLS (344) (known as Event Manager) to create and modify logs to track and coordinate events for equipment in day-to-day operation. Each event provides specific data corresponding to type, facility, location, time, duration, status, point of contact, assigned personnel, and additional information. Personnel can use Event Manager and other applications to query and filter the events data to generate reports describing equipment operation and maintenance, to schedule and coordinate maintenance requests, and to automate the creation of logging data. These functions facilitate the coordination and implementation of monitoring, control, and maintenance of equipment across a wide array of facilities and personnel.

The RMS Concentrator (341) generally prepares the data from the CRMM (300) to the format used by RMLS (344). The RMLS (344) updates the databases to include data on the status of various devices and systems, including radios and equipment, radio settings, power outages, and other information provided by the CRMM (300). RMLS (344) can thereby include event logs, reports, and maintenance requests for the radios (307*a*-307*h*) and equipment. By including the data from the CRMM (300) into RMLS (344), the RMLS (344) presents a more complete description of the status and operation of the remote air-to-ground facilities and enhances the scheduling and tracking of maintenance of these facilities.

NAS Infrastructure Tool

The NAS Infrastructure Tool (NIS Tool) (347) displays service function in an accessible graphical user interface to allow personnel to view the operation of systems and equipment in various formats, such as geographic or grid. Personnel can see the health or status of a radio communication system to determine whether it is in normal, alert, or alarm status. The NIS Tool (347) pulls data from RMLS (344) and provides service-level status information of each sector at the ARTCC (311) in real-time or near real-time, e.g., ~2 minute intervals. Service status may be presented as full service, reduced service, loss of service, or unmonitored. As noted previously, a sector can include one or more radio sites, and the NIS Tool (347) is programmed to assess availability/redundancy among all the radios in a sector. The NIS Tool (347) enables a high-level perspective of radio communications service to provide an overall operational impact and situational awareness of the NAS.

The information presented in the NIS Tool (347) is developed using logical flows to represent the system of interest, such as an A/G facility (RCAG, BUEC, RCO, etc.). A service can be defined for an A/G communication system that includes individual service threads, including logs and event data from RMLS (347) that are based on CRMM data, for all the equipment that make up the system, such as radios (307*a*-307*h*), trunk lines (319), voice switches, Remote RCEs (316) and Control RCEs (322), etc. The NIS Tool (347) can show the service level or health of the air-to-ground system, as well as the status of the individual equipment components that make up the A/G system. The NIS Tool (347) thus enables system monitoring and equipment monitoring for the air-to-ground system.

The NIS Tool (347) queries the CRMM data input to RMLS (344) to determine service-level availability, reliability, trending, reporting, and service impacts for air-to-ground radio communication systems, which assists in decision-making. Personnel can use the NIS Tool (347) to visualize the impact of equipment and facility outages on airspace sectors and to assess the impacts to airspace communication. Based on the impact level provided by a pre-determined scale (known as impact metric scale, as described above), personnel can view the overall status of radio communications for an airspace sector and prioritize and schedule needed maintenance response.

The NIS Tool (347) provides system alarms, telecommunication status messages, and maintenance logs for an air-to-ground system. The NIS Tool (347) can annunciate alarms and can also update with information from technicians at a remote air-to-ground facility (RCAG, BUEC, RCO, etc.). The details of the service threads for facility and equipment may be displayed in the NIS Tool. Personnel can also view the historical operation of an air-to-ground service using a timeline available with the NIS Tool.

CRMM Monitoring Capabilities and Benefits

As noted above, the CRMM (300) may provide real-time monitoring for A/G radios of different manufacture that are installed at either remote locations or a central location. This includes remote monitoring of radios at RCAG, BUEC, and RCO A/G facilities. In addition to radio equipment, the CRMM (300) also monitors other information related to the equipment and communications service in real-time.

In one embodiment, the CRMM (300) collects the following data states for radios in real-time: radio state (Normal, Alert/Alarm, Fail, Unknown); AC power presence; DC power presence; transmitter radio frequency (RF) output; transmitter transmit state; receiver receiving state; receiver audio output presence; and receiver receive RF signal strength. In this embodiment, the CRMM (300) collects the following radio settings or parameters in real-time for informational, tracking, and troubleshooting purposes: radio serial number; radio type; operating frequency; radio clock time; firmware version(s) loaded in the radio; oscillator setting; receiver squelch threshold setting(s); audio output level setting; mute parameter(s); mode of operation; and antenna transfer relay setting(s). The CRMM (300) also preferably collects the following data in real-time that can be used for tracking or troubleshooting purposes: CRMP (301) internal temperature; radio rack temperature; primary and backup communication line status to remote site; primary or backup radio selection status; primary or backup radio site selection; DC voltage; and CRMP status.

In one embodiment, the CRMM (300) enables the following real-time monitoring and control functions to internal users at RMMC stations (328): query and view radio parameters; query and view radio event logs; real-time information on radio and equipment; control power to monitored devices; query and view monitoring equipment status; view real-time radio data and historical radio data; power control (ON/OFF or reset); radio warm reset; and radio factory reset.

The CRMM (300) also preferably provides the following remote troubleshooting functions: remote query of radio configuration settings, remote query of radio event logs, remote warm/factory reset for radios, and remote AC/DC power ON/OFF for radios and the remote RCE.

It will be appreciated that the CRMM (300) enables continuous, real-time monitoring of the full communications service thread for operational impacts. It provides the ability to view and analyze radio equipment parameters, view line status of remote radio equipment and shout lines, and perform remote radio resets.

The enhancements from CRMM (300) also include at least the following: improved real-time situational awareness of radio equipment and systems, optimization of maintenance, improved predictive maintenance, improved logging, reduction of impacts to air traffic services, increased visibility of all critical systems in a service thread, additional real-time monitoring of radio parameters at remote sites, completion of remote corrective tasks, added efficiencies and cost avoidance. CRMM (300) also assists with spectrum analysis and radio-frequency interference investigations.

Personnel can view the availability of communications services in each airspace sector of the ARTCC (311) and, with the use of sector-specific impact metric scales (described above under CRMM operation), obtain a more detailed view of the impact that a specific radio outage may cause to air traffic control services. This enables personnel to focus on NAS service outages as opposed to specific equipment failures. Personnel will know the real-time status of all systems that have a critical role in providing service.

The CRMM (300) also enables proactive maintenance. Personnel such as FAA air traffic and maintenance personnel can identify equipment that degrades in real time, initiate an immediate response, and notify others of available equipment to mitigate impacts to operations. Knowing the criticality of the outage allows personnel to appropriately prioritize and schedule a response.

The CRMM (300) also enables predictive maintenance. The data obtained from radios can be used to better understand when the systems are likely to fail and allow repair or update to maintenance schedules before an outage occurs. As an example, temperature data may be collected to determine the effects on radio performance. This information is used to anticipate failures and to ensure the most optimal rack design for the equipment. In another example, collected data is used to analyze the performance of main-to-standby radios to identify whether a drift in performance values should trigger a troubleshooting site visit. Such analyses optimize the maintenance programs.

It will be appreciated that the CRMM (300) system is unique because it enables the monitoring of different types of radios agnostically and is not specific to a particular radio design. The CRMM (300) according to the preferred embodiment is platform-independent. It is the first system to enable communication with radio equipment of different vendors.

CRMM in the Airport Terminal Environment

While the above description focuses on the application of CRMM (300) to radio communication facilities in the En Route environment (101), CRMM (300) may also be used with radio communication facilities in the Airport Terminal environment (105*a*, 105*b*). The application of CRMM to radio devices in the Airport Terminal environment (105*a*, 105*b*) provides very similar monitoring capabilities and benefits that are realized with CRMM deployment in the En Route environment (101). As in the En Route environment, the CRMP (301) would be a key component of the CRMM system (300) for gathering various parameters and information from radio devices and equipment in the Airport Terminal environment and communicating such information through CRMM.

Most or all of the CRMM elements that are physically located at an ARTCC (311) could be physically located at a tower or TRACON to accomplish remote monitoring and control of radio devices. Referring to FIGS. 3A and 3C, in one embodiment, the various CRMM elements located at the ARTCC (311) could be located at a tower or TRACON to enable remote monitoring and control of radio devices for the Airport Terminal environment. In another embodiment, the RMMC (328) could be omitted from the CRMM elements located at a tower or TRACON, and remote monitoring (only) of radio devices could be conducted using the NIS Tool (347) via the external LAN (334). In the latter embodiment, space limitations or other constraints may not enable RMMC (328) installation in the tower or TRACON. In another embodiment, the Remote RCE (316) and Control RCE (322) units could be replaced by other equipment to transmit and receive information between the remote location (e.g., radio communication facility) and the central location (tower or TRACON).

Radio communication equipment serving the Airport Terminal environment may be located in more than one facility, rather than co-located in the same facility as is often the case for radio devices serving the En Route environment. For example, in the Airport Terminal environment, main radio transmitters may be located in a separate building than the standby or backup transmitters; radio transmitters may be located in a separate building from the radio receivers; and so on. This contrasts with the En Route environment where radio communications devices are typically located in the same building because those radio devices are at far distances from the central location (ARTCC (311)), and it is more practical to co-locate radio devices in a common building. The alternate configurations for locating radio devices in the Airport Terminal environment would not change the components of the CRMM system (300) or its operation.

Full/Lite Functionality

In another embodiment, the CRMM (300) is arranged to enable monitoring and control of remote radio equipment that may not be located in a single facility ("split-site configuration"). An example of split-site configuration is provided in FIGS. 7A-7C. The split site configuration may occur for remote radio equipment used in En Route communication or for radio devices that serve the Airport Terminal environment.

Figures 7A, 7B, 7C:
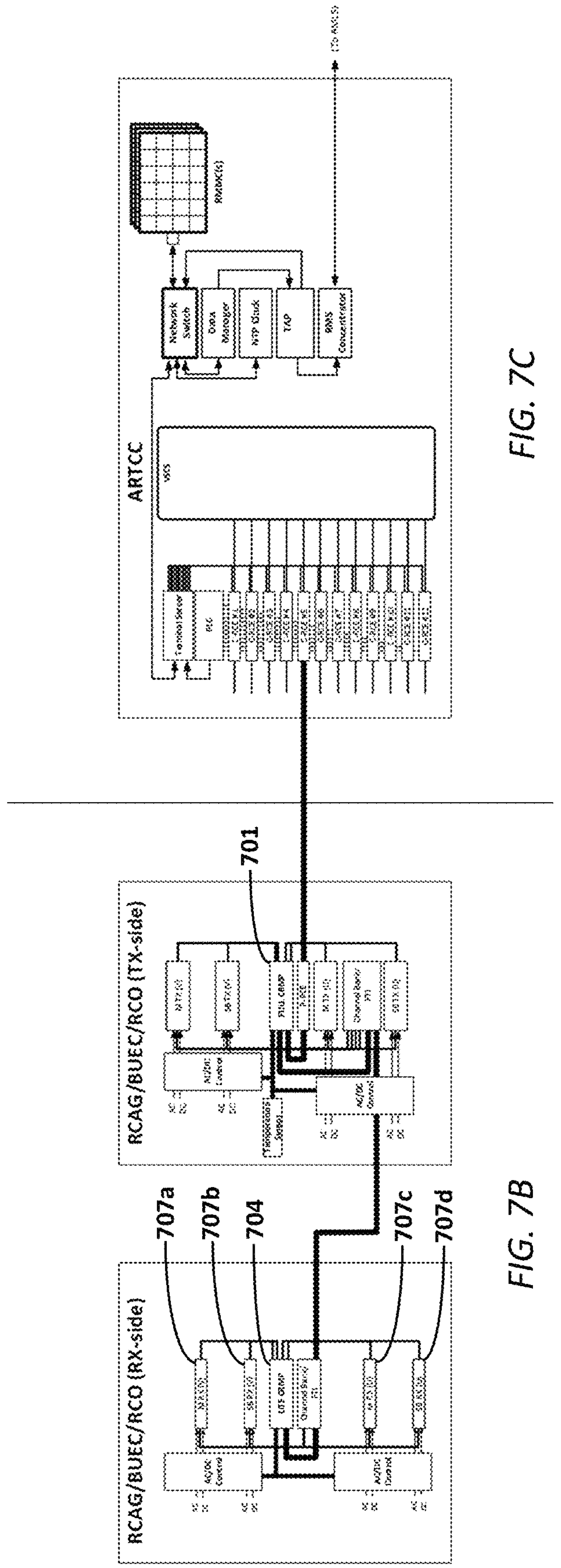
Figure 7B:
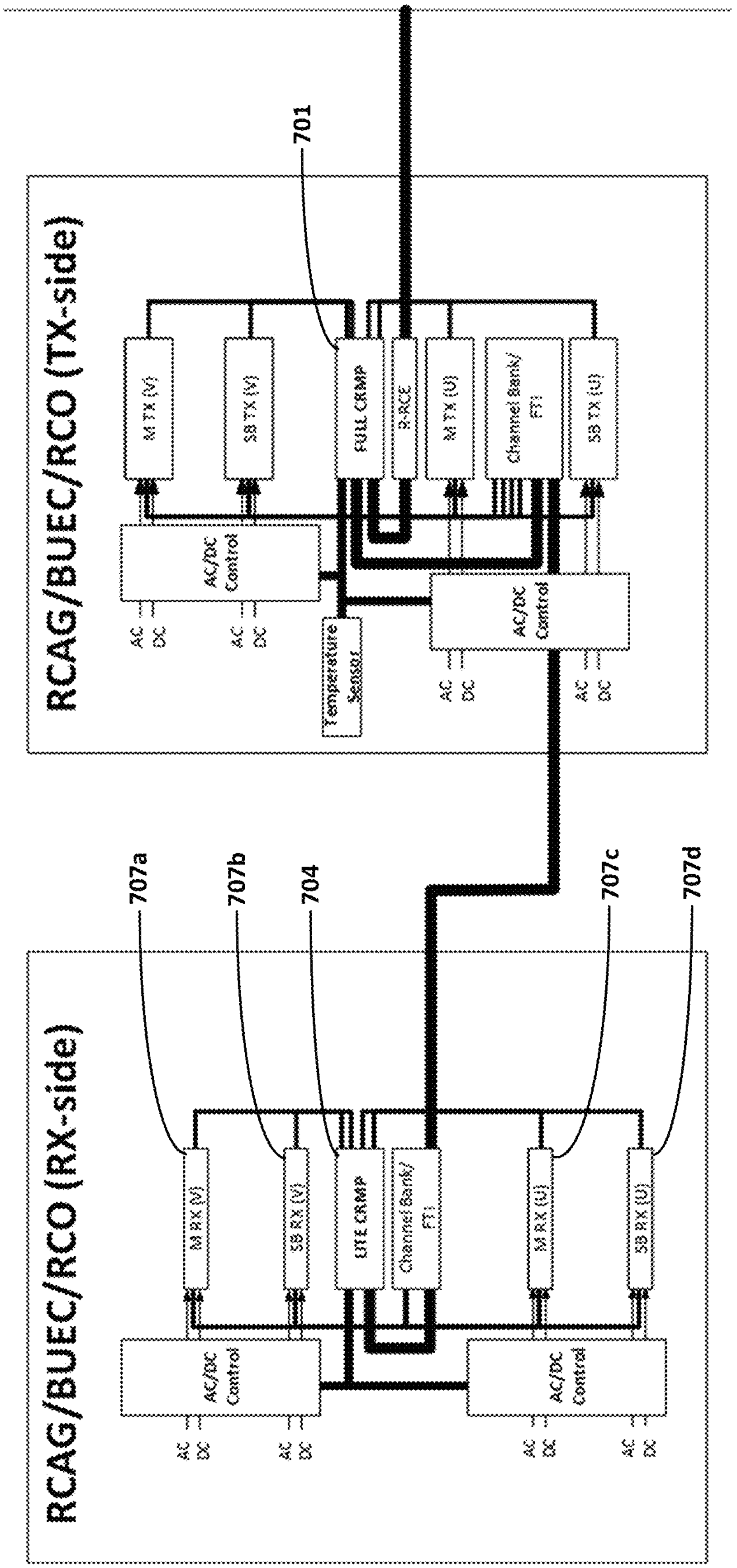
Figure 7C:
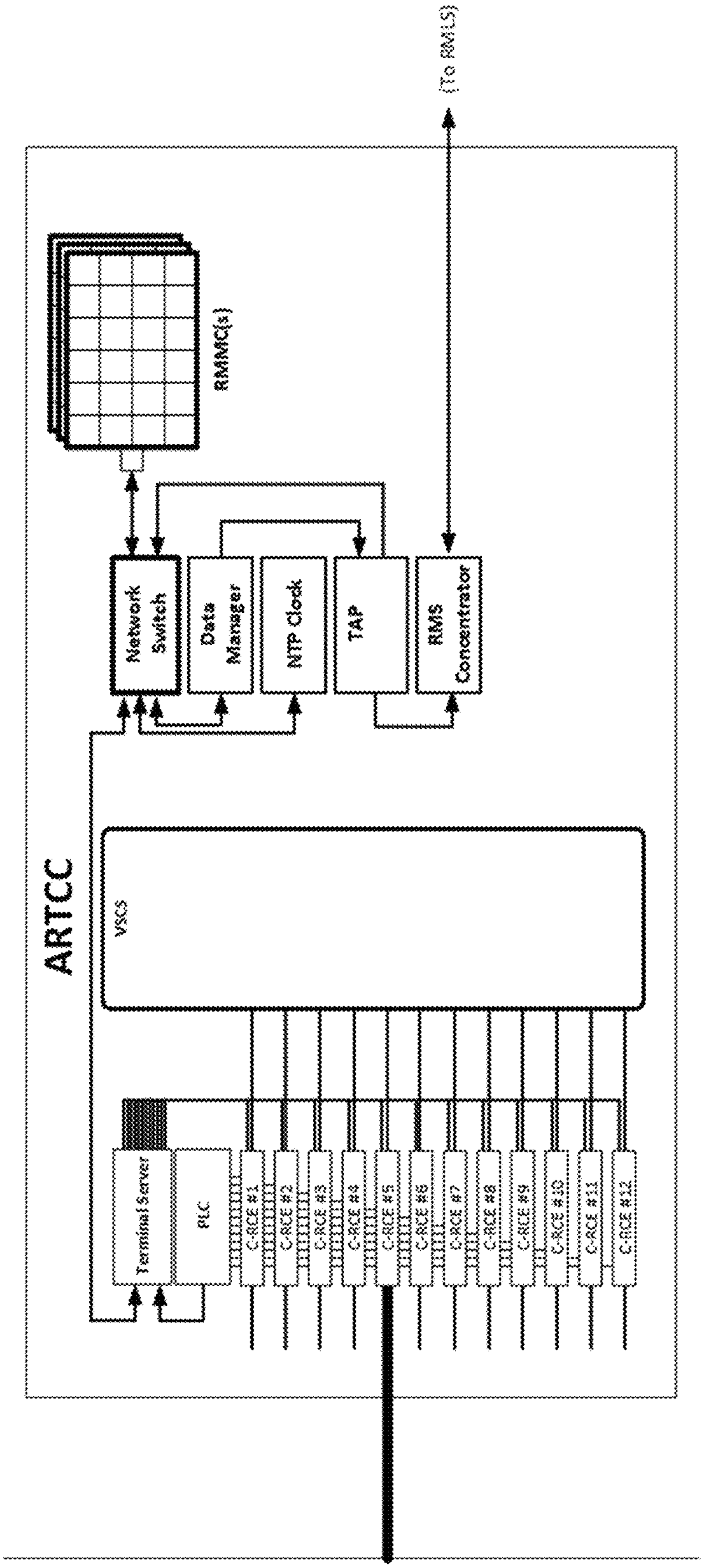
Figure 10:
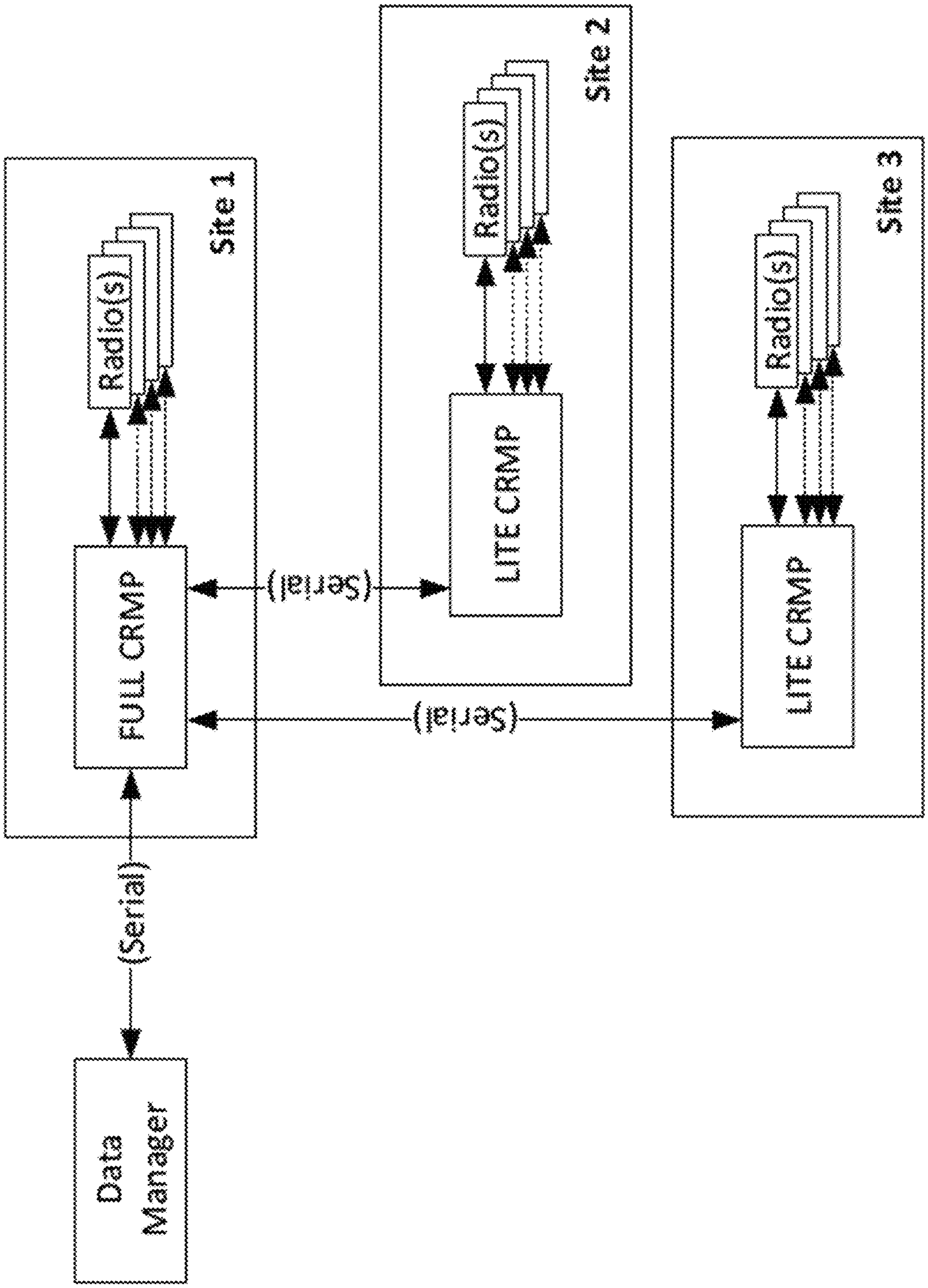
FIG. 10 is diagram showing CRMP (301) deployed in a Full/Lite configuration, according to one embodiment.

In the split-site configuration, the CRMP code is modified to implement CRMP functionality in either a "FULL" mode or a "LITE" mode. The FULL CRMP mode functions the same as the CRMP functions described above, where the CRMP (301) sends and receives messages from the DM (325) through, for example, a serial or other type of connection. The FULL CRMP (701) can also accept connections from LITE CRMPs. The split-site configuration using a FULL CRMP and one or more LITE CRMP can be applied to a variety of facilities to enable remote maintenance monitoring of radio devices. For example, the main radio devices in one facility may be separated from the standby radio devices in another facility. In another example, the radio transmitters may be separated from the radio receivers, as shown in FIGS. 7A-7B. Multiple LITE CRMPs (704) may be connected directly to a FULL CRMP (701) in parallel (as shown in FIG. 10) or serially. In one embodiment, the FULL and LITE CRMPs are configured for passthrough, serial connectivity.

The LITE CRMP (704) connects to nearby radios (such as receivers), attempts to connect to a FULL CRMP (701), and relays the information from the physically direct connected radios (707_a_-707_d_) to the FULL CRMP (701). In one embodiment, the FULL and LITE CRMPs communicate with each other using a separate serial connection. The FULL CRMP may operate as a master that collects information from the LITE CRMPs connected thereto. As a master, the FULL CRMP may request updates from any and all connected/detected LITE CRMPs. The FULL CRMP may then merge the LITE CRMP data with the FULL CRMP data before sending the consolidated message to the DM (325). There is no limit on the number of LITE CRMPs that can connect with the FULL CRMP.

Graphic User Interfaces (GUIs)

Figure 8A:
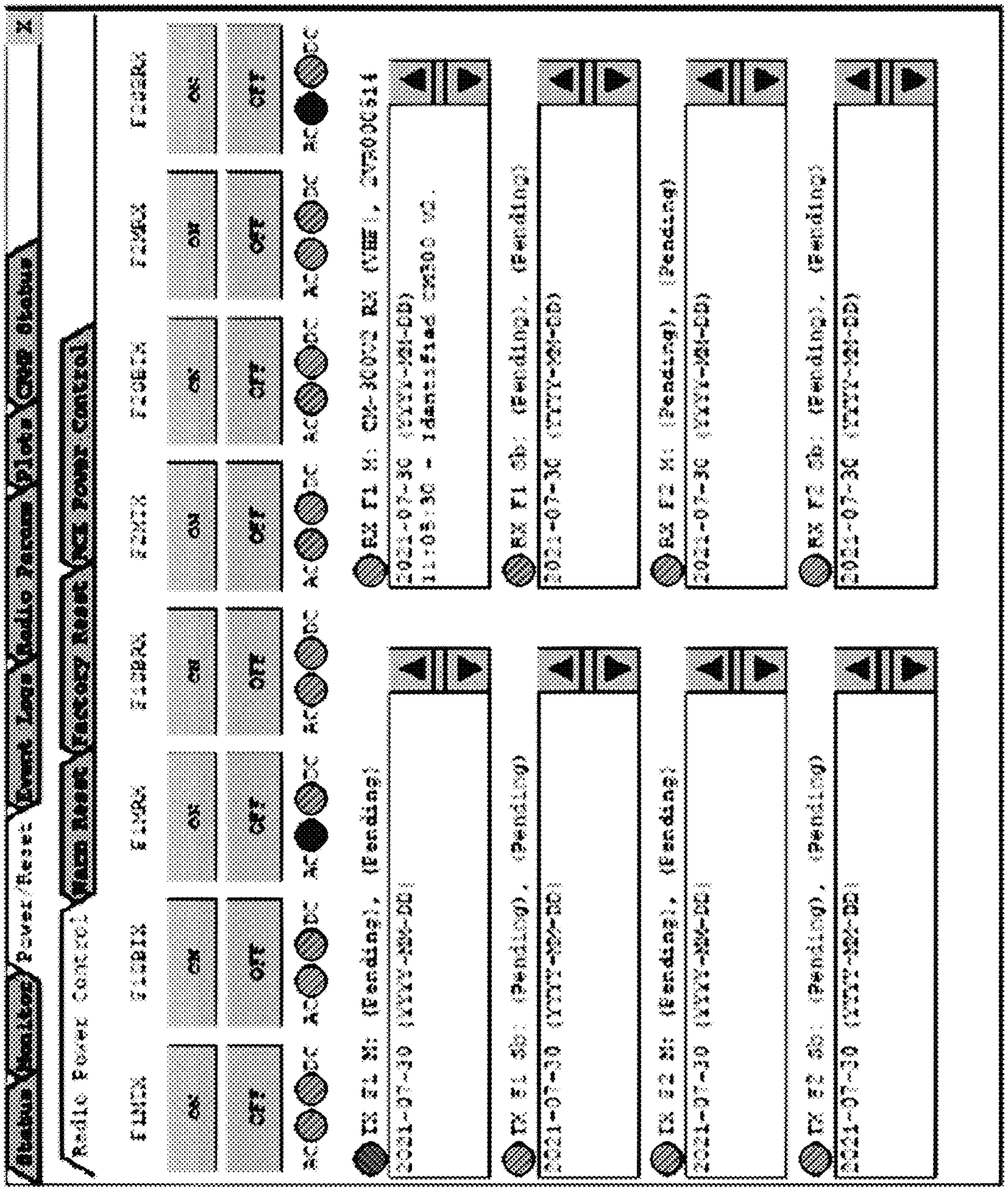
FIGS. 8A-8L, depict exemplary graphic interface screens for monitoring and controlling radios and equipment at remote communications facilities.

Various interfaces can be generated, for example, at the RMMCs, for users to visualize the data collected in the system (300). Exemplary GUIs are shown in FIGS. 8A-8L. Generally, a set of GUIs may provide data and allow users to query/submit commands via a plurality of hierarchical tabs. For example, a first set of tabs may be provided each selectable for access to a set of high-level functionalities, such as Status, Monitor, Power/Reset, Event Logs, Radio Parameters (Params), Plots, and CRMP Status. Selecting a tab from the high level, expands the interface to include a second, lower set of functionalities relating to the selected tab. For example, selecting the Power/Reset may result in a second set of selectable sub-tabs that include: Radio Power Control, Warm Reset, Factory Reset, and RCE Power Control tabs and related functionality, as shown in FIG. 8A.

In a preferred embodiment, the Radio Power Control GUI shown in FIG. 8A includes a list of the radios or other equipment being monitored by the given CRMP (301). Adjacent or below the radio ID may be a plurality of buttons for toggling the power of each of the radios (ON/OFF). For each of the radios, the AC and/or DC power status may also be provided. The status may be displayed with appropriately colored graphics, such as a green circle indicating that the power is present and a gray circle indicating that the power is not present for each of the radio AC and DC power sources. In one embodiment, the TX or RX status of each of the radios may be displayed with each of the radios in another colored graphic, e.g., a blue circle, as well the date(s) of the status. This information may be obtained from the CRMP (301) via audio port or serial connections to the radios (307_a_-307_h_), as discussed above. Preferably, the TX and RX status of the radios is determined based on information from the serial ports, and the audio presence indicators in the GUI are driven by information from the Audio Detect Board (526).

Figure 8B:
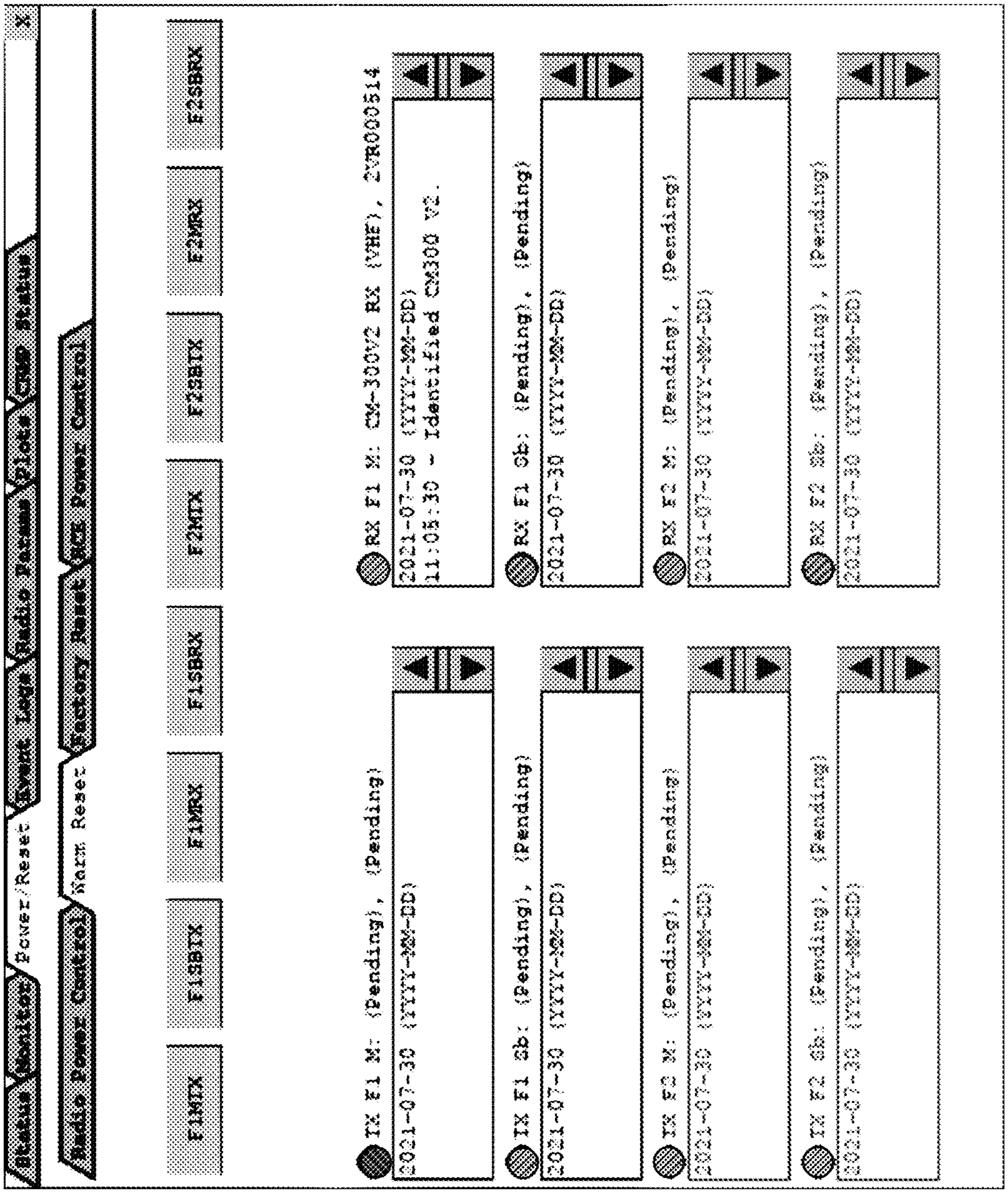
Figure 8C:
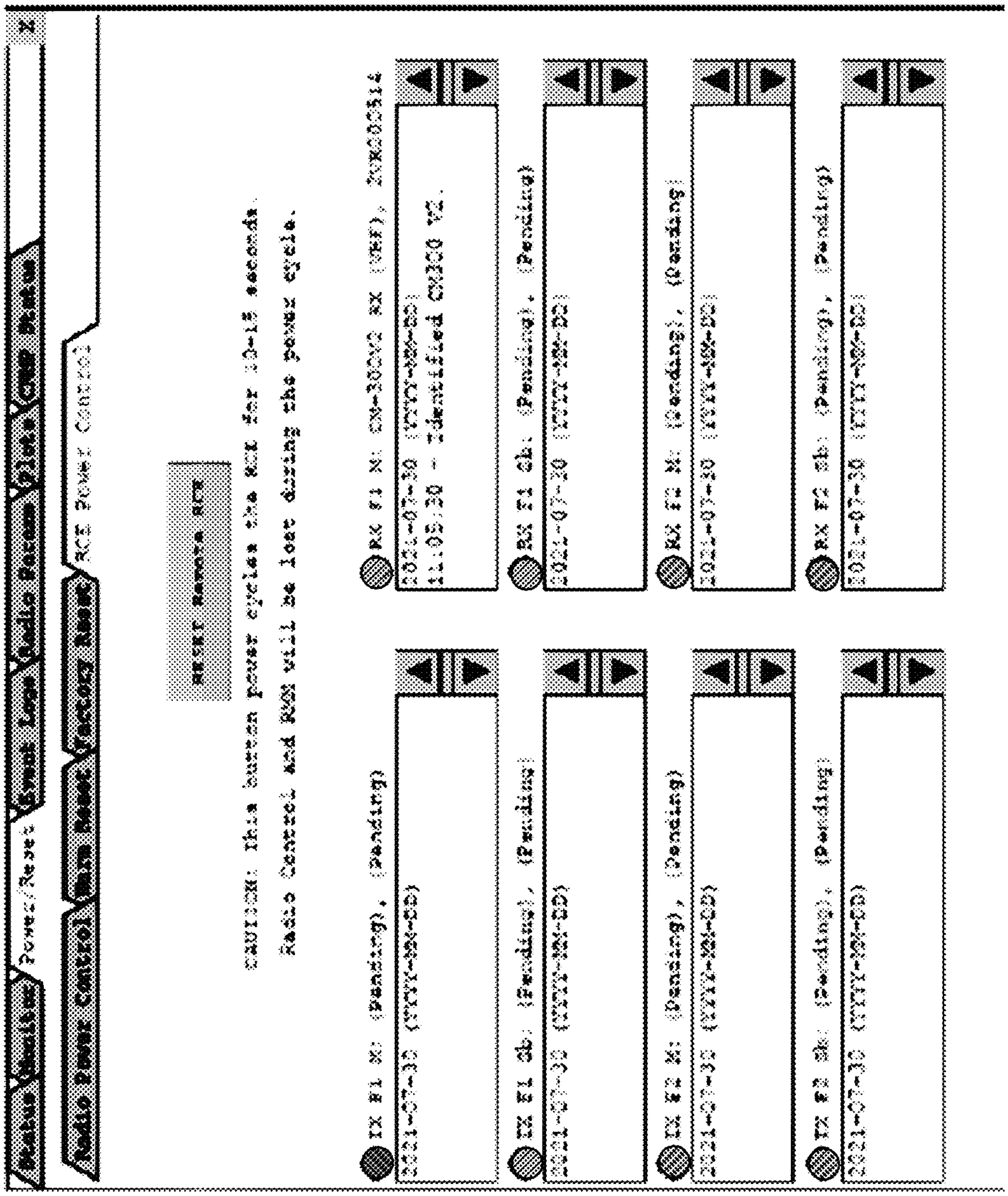
Figure 8D:
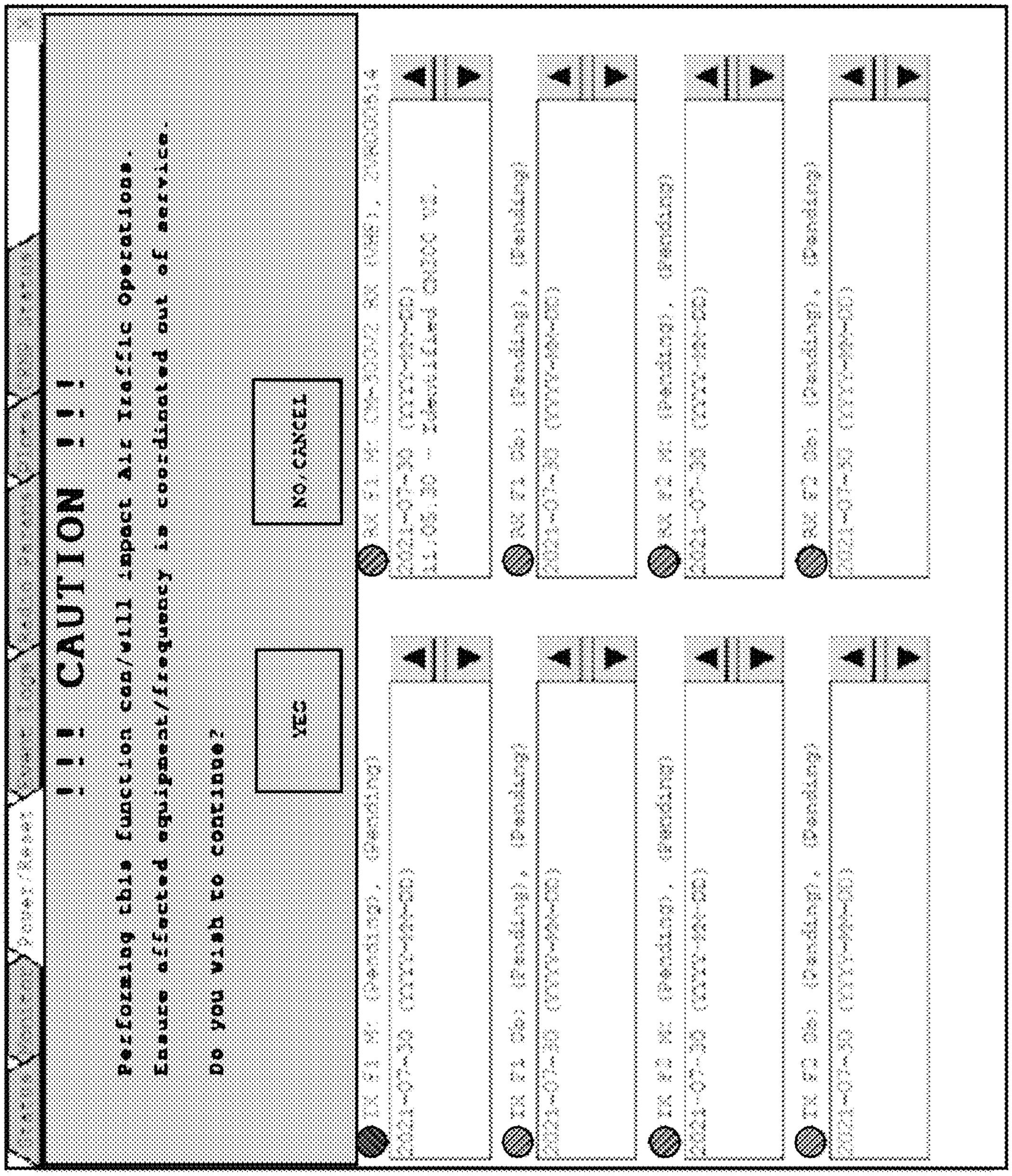
Figure 8E:
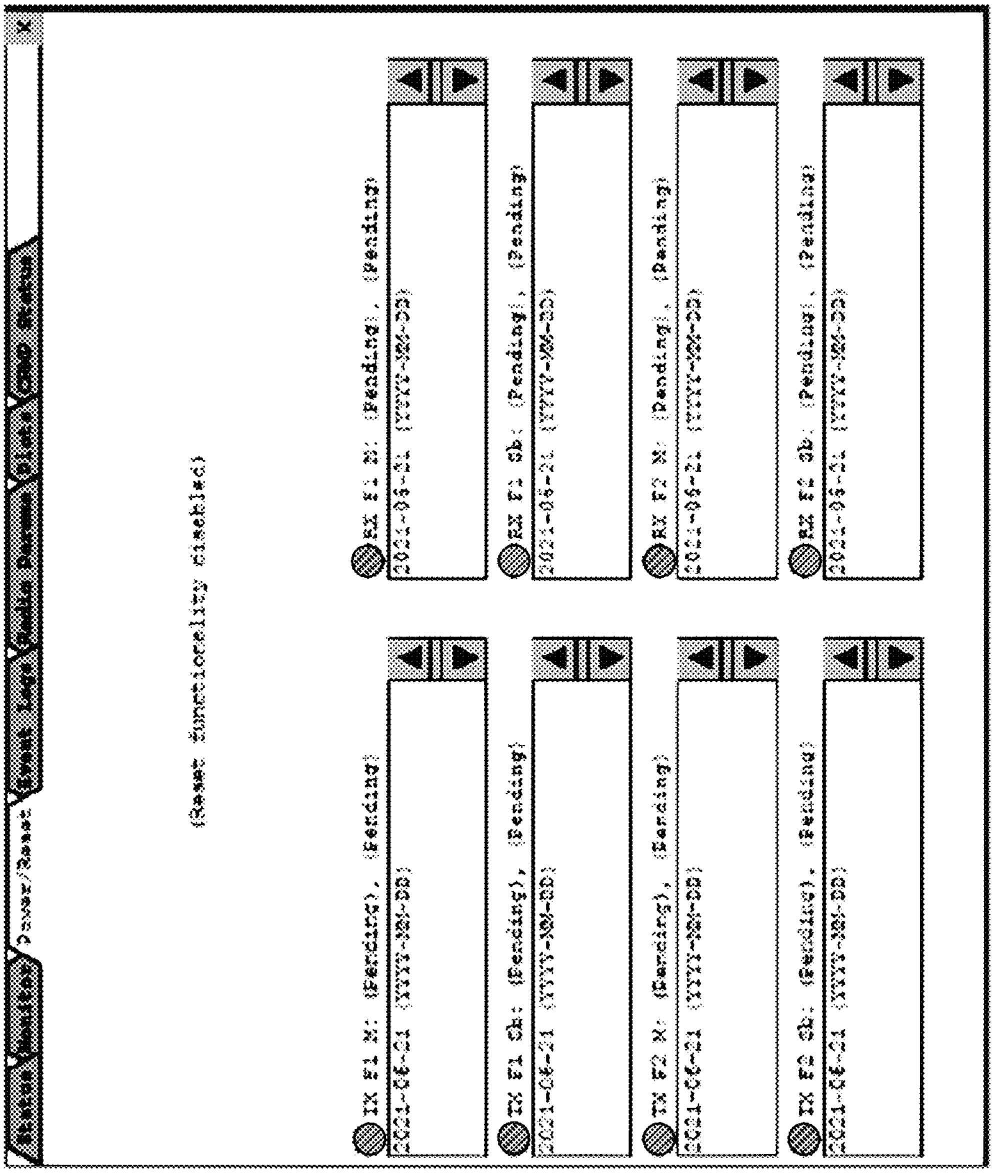

In one embodiment, a Warm Reset GUI is provided, as shown in FIG. 8B, that includes the list of includes a list of the radios or other equipment being monitored by the given CRMP (301) for warm resetting the selected radio. A similar configuration may be provided for factory resetting the selected radio, as well as the RCE (as shown in FIG. 8C). FIG. 8D depicts a warning message for each attempted command that will impact radio operations. When limited access is given, the GUI power commands functionality may be disabled, as shown in FIG. 8E.

Figure 8F:
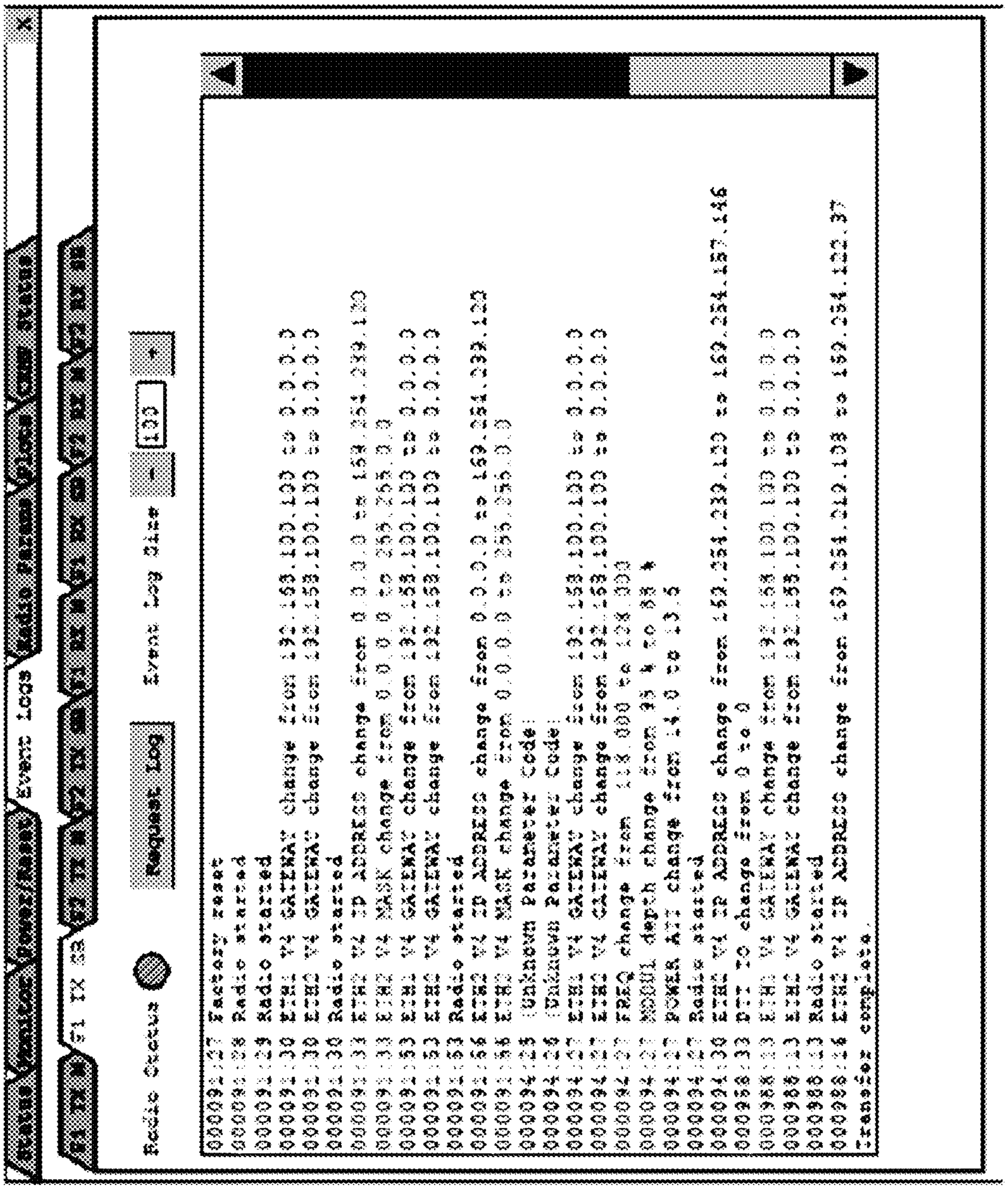

In one embodiment, an Event Log GUI is provided, as shown in FIG. 8F, which displays a selectable sub-tab for each of the radios or other equipment being monitored by the given CRMP (301). When selected, the GUI includes the status of the selected radio as well as a button or other form element that when selected sends a Request Log query to the given radio through the CRMP (301). The log retrieved from the selected radio may be displayed as shown.

Figure 8G:
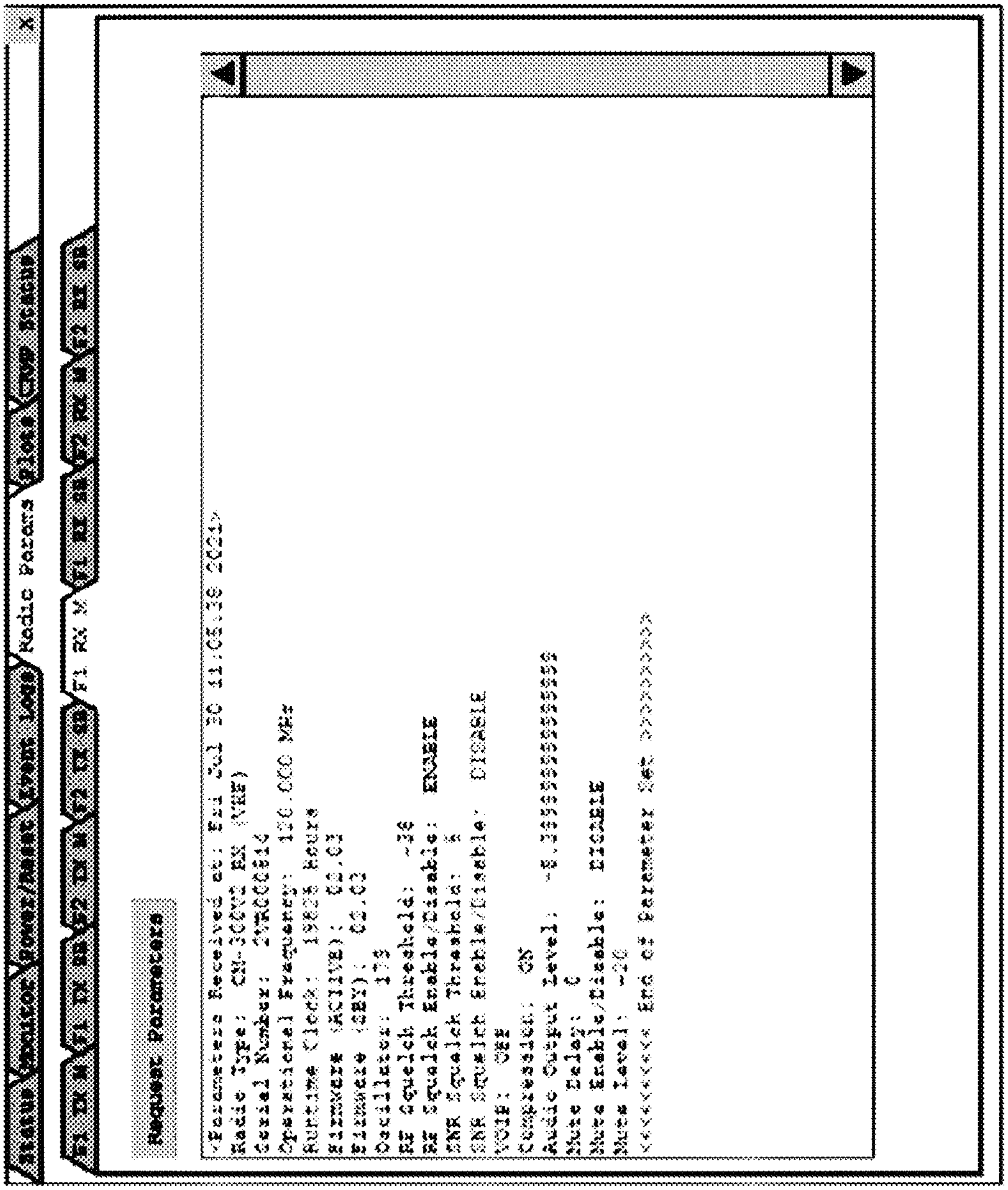

In one embodiment, a Radio Parameters GUI is provided, as shown in FIG. 8G, which displays a selectable sub-tab for each of the radios or other equipment being monitored by the given CRMP (301). When selected, the GUI includes the status of the selected radio as well as a button or other form element that when selected sends a Request Parameters query to the given radio through the CRMP (301). The operating parameters retrieved from the selected radio may be displayed as shown.

Figure 8H:
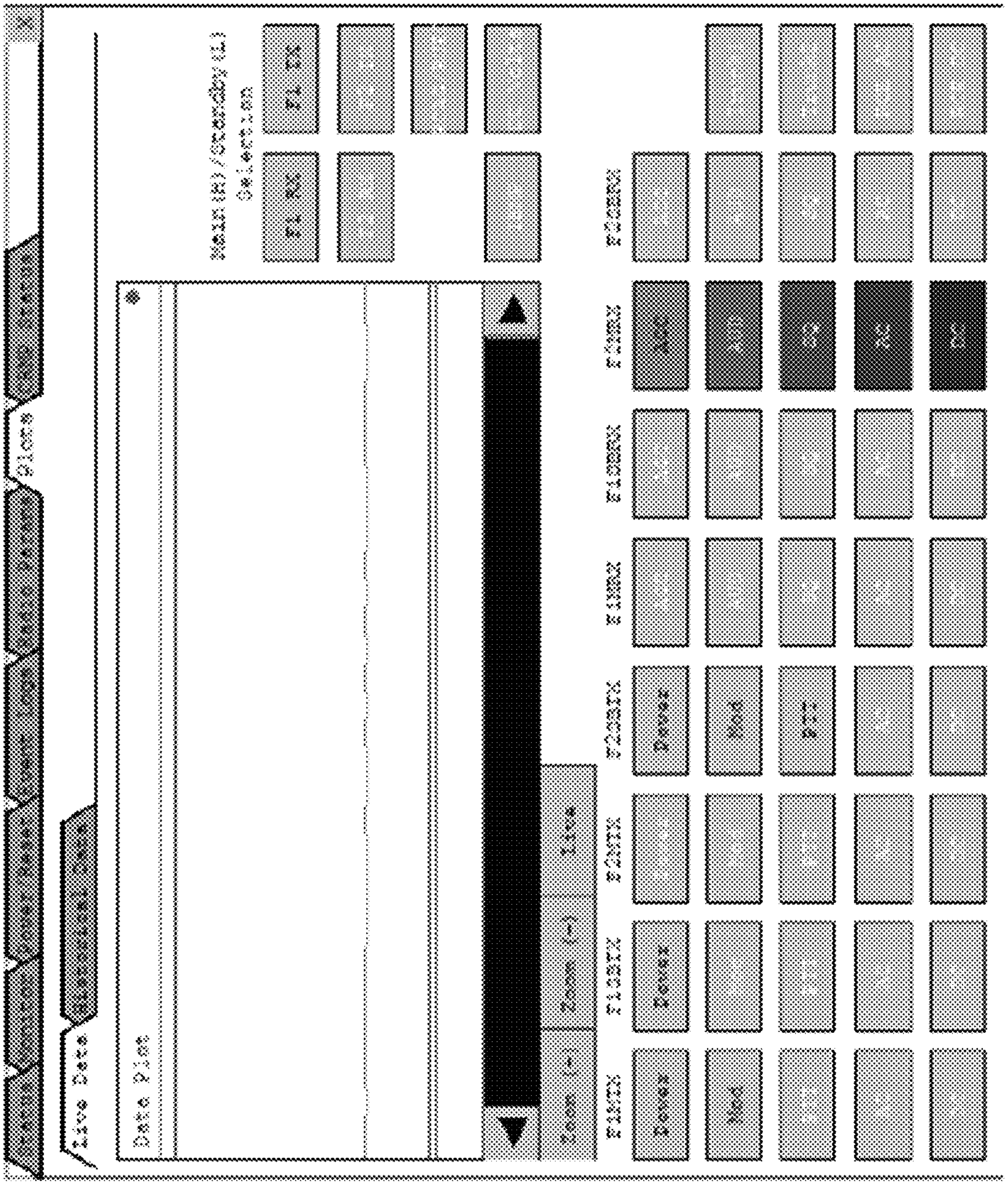
Figure 8I:
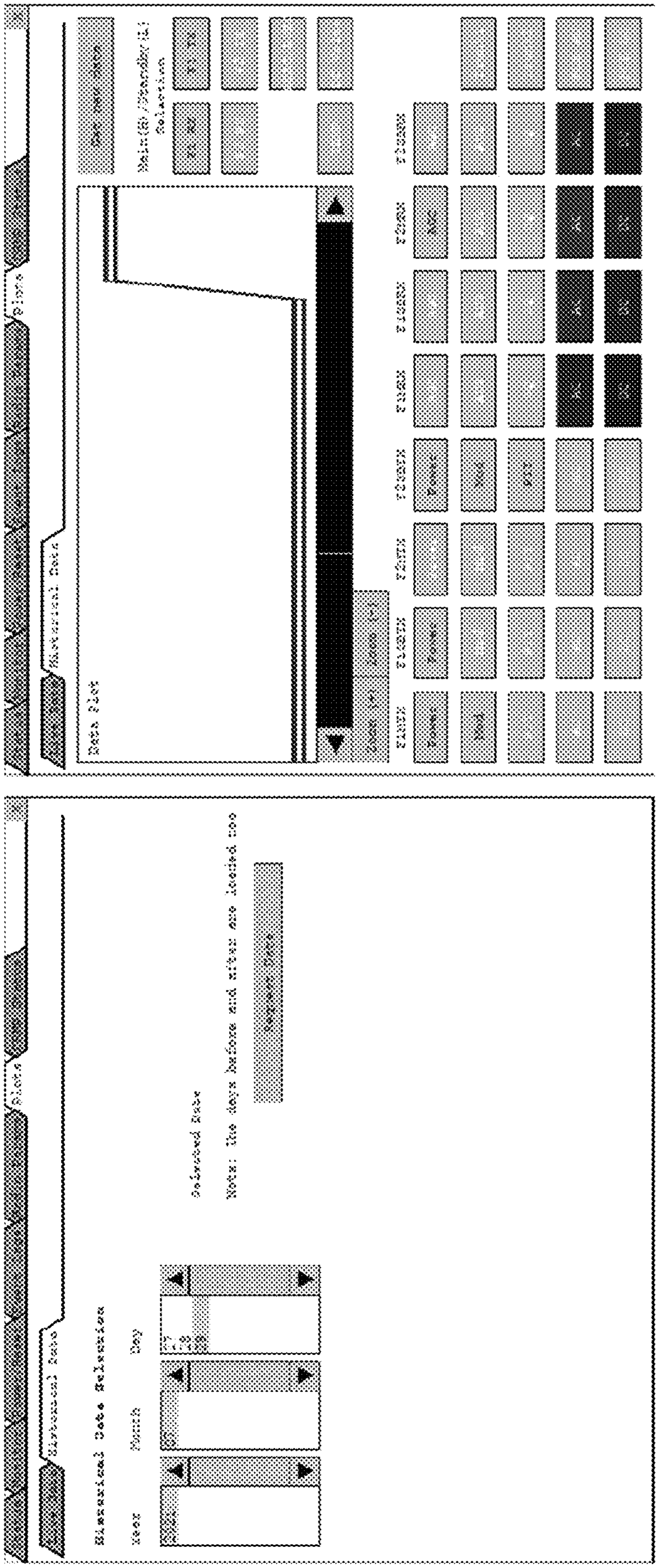

In one embodiment, a Plots GUI is provided, as shown in FIG. 8H, which displays a selectable sub-tab for Live and Historical data for each of the radios or other equipment being monitored by the given CRMP (301). When the Live sub-tab is selected, the GUI includes a plot or graph that displays the operating parameters of any one of the selected radios, such as Power, Mod, PTT, AC, DC, etc. As shown, the parameters may be selectable for the plot in the form of a matrix of selectable buttons with the selected operating parameters shown in distinguishing color schemes for graphing, as shown. FIG. 8I depicts the Historical Data sub-tab, which allows users to specify the date or date range for one or more operating parameters and a request data button for querying the CRMM (300) for the requested data. As shown, the historical operating parameters for a plurality of radios may be selected for graphing as shown.

Figure 8J:
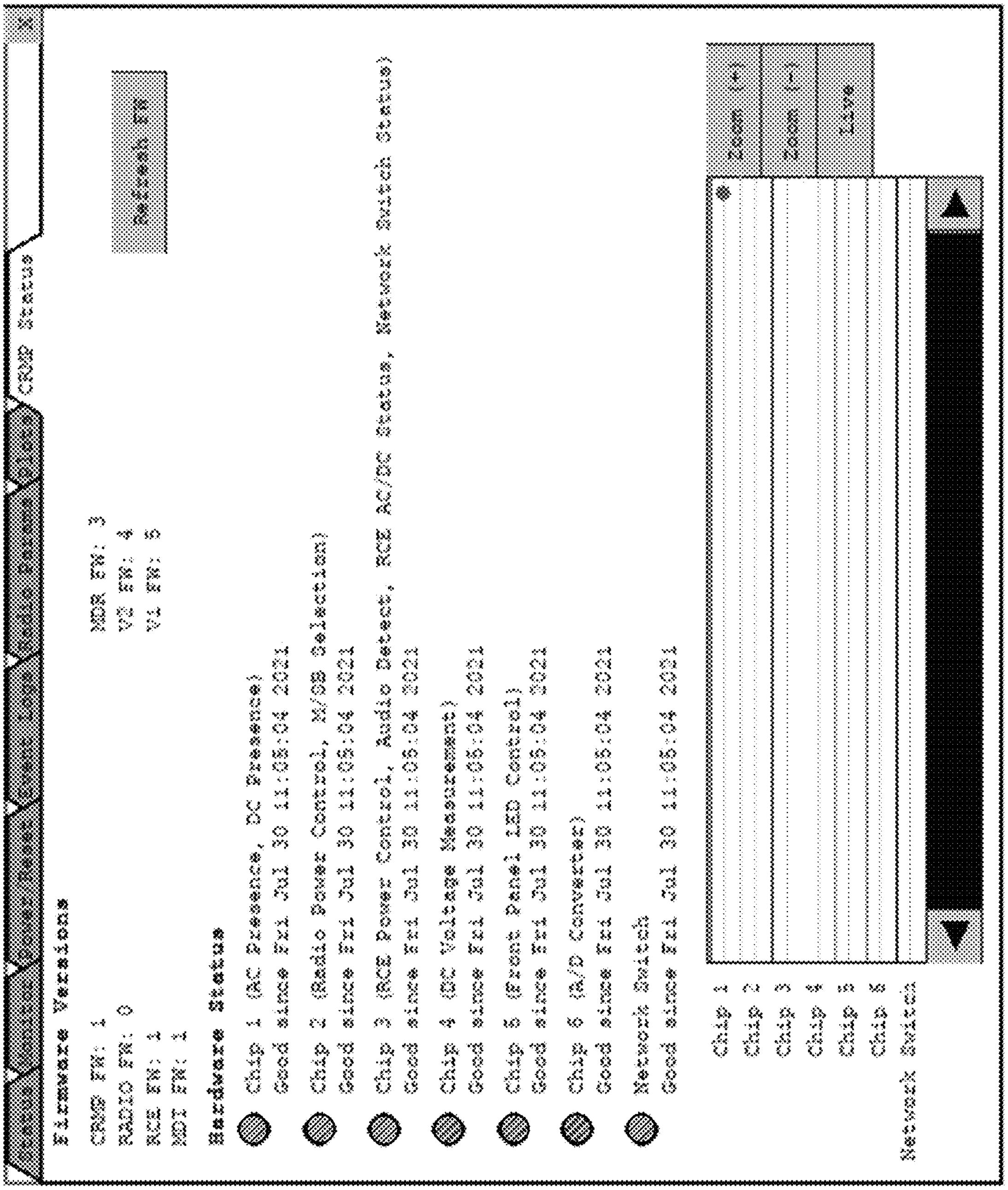

In one embodiment, a CRMP Status GUI is provided, as shown in FIG. 8J, which displays the status of a given CRMP (301) along with certain CRMM system (300) components connected thereto. For example, AC/DC presence, power control, RCE Power Control, Audio Detect, as well as various other component operating parameters. In one embodiment, a plot of the operating parameters may be displayed for each of the CRMM system (300) components, shown.

Figure 8K:
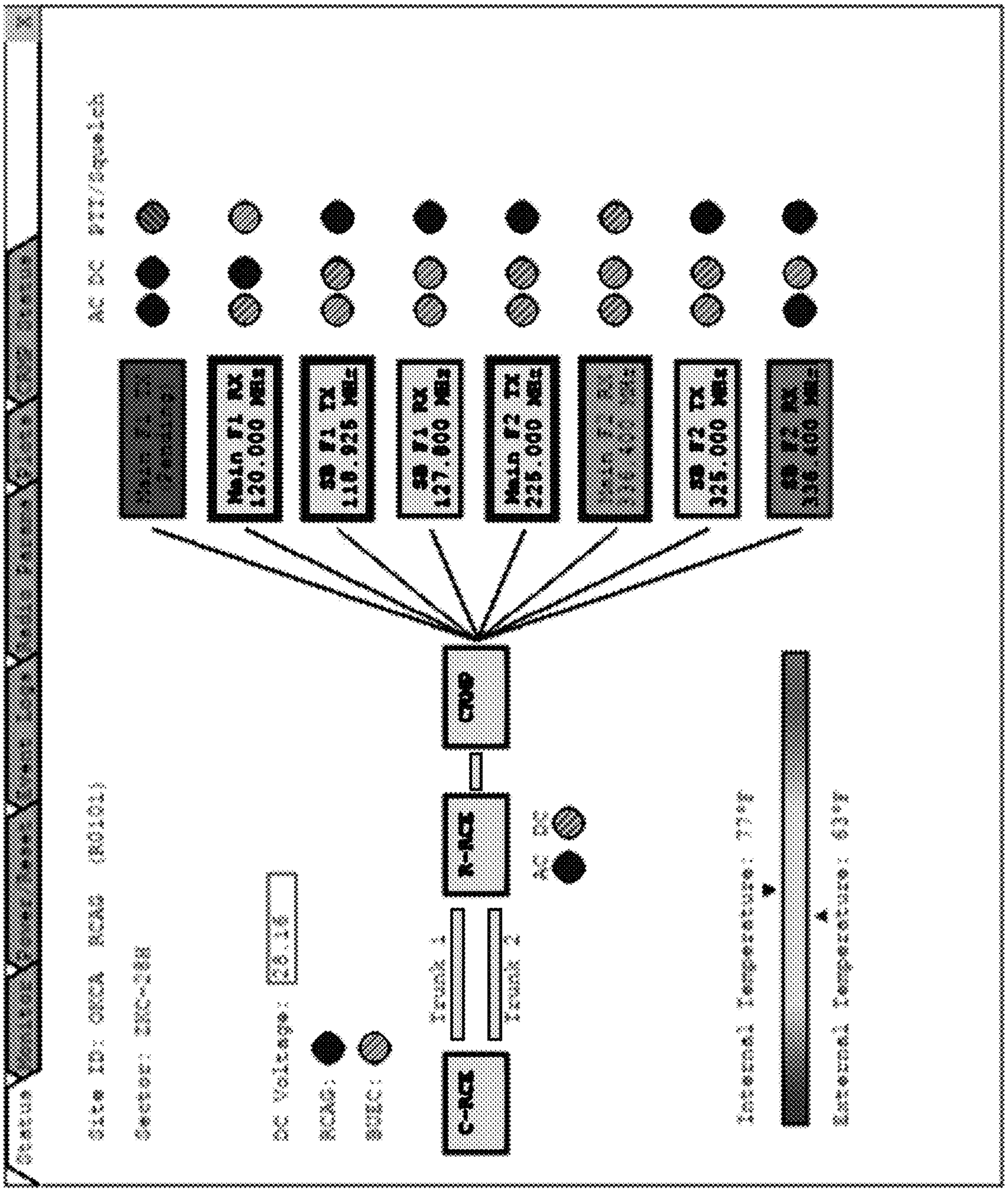

In one embodiment, a CRMP facility/Rack Status GUI is provided, as shown in FIG. 8K, which displays the high-level status of a given CRMP (301) and the radios and equipment connected thereto at the facility, along with the status of the network components between the CRMP (301) and the central location, i.e., the C-RCE at the ARTCC. The status of each component may be graphically displayed, for example, with appropriately colored graphical objects, such as green, orange, red, and blue rectangles. Moreover, a graphic of the connection between network components may also be show in the appropriate coloring, as well as graphics for each of the power options (AC and/or DC), and the voice status, e.g., PTT/Squelch. In a preferred embodiment, the internal and external temperatures may be graphically presented, as shown.

Figure 8L:
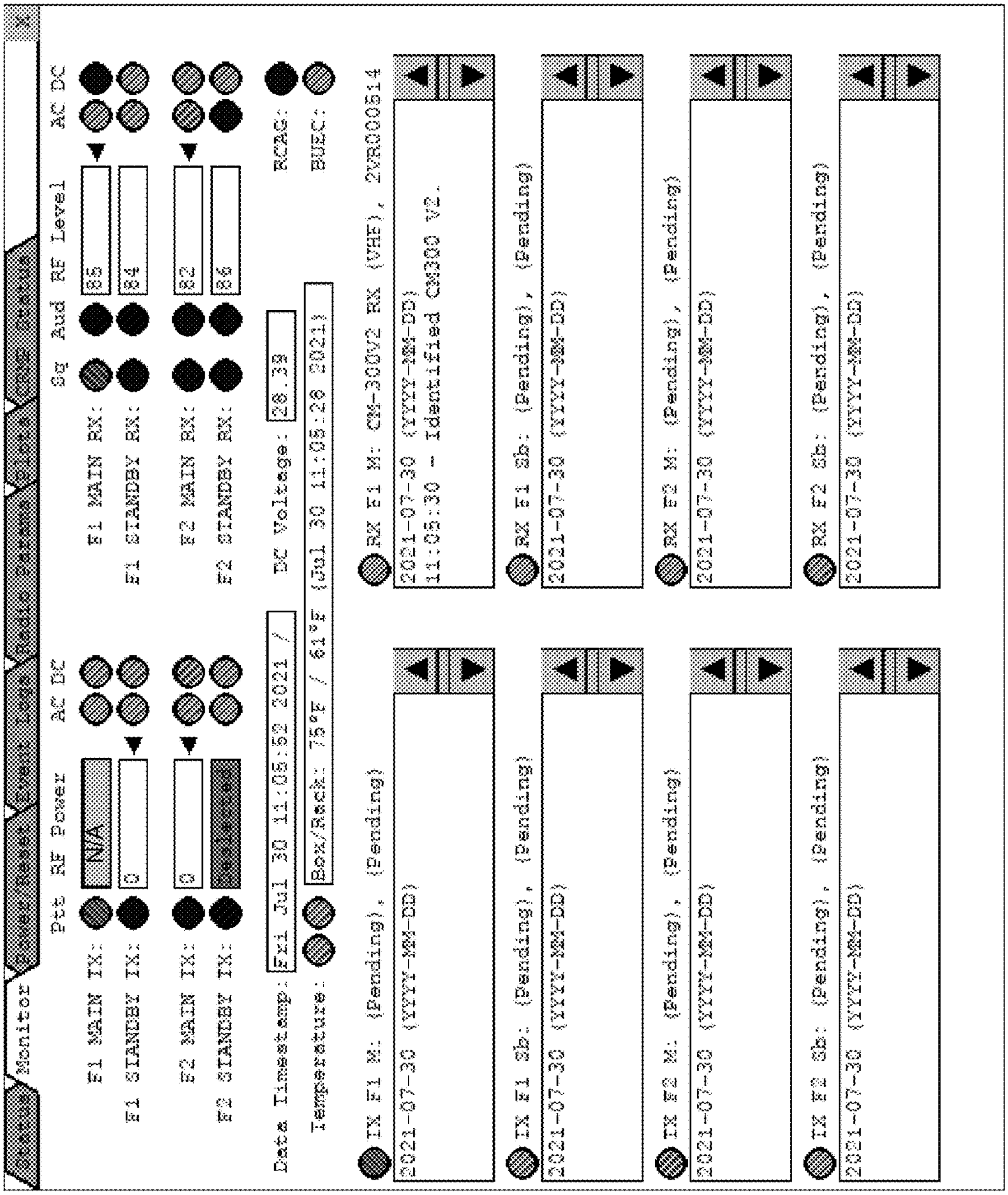

In one embodiment, a CRMP Monitor GUI is provided, as shown in FIG. 8L, which displays the lower-level status of the radios and equipment connected to a given CRMP (301). In this interface, the RF power and level may also be displayed for each radio, along with a listing of the events associated with each of the radios.

It can be appreciated that the CRMM system (300) operating in the NAS may collect a voluminous amount of operating parameter and malfunction data in a relatively short amount of time. It is believed that variations in the operating parameters over time may be predictive of undesirable equipment status, such as equipment malfunction. For instance, radios are sensitive to changes in temperature. That is, overtemperature conditions can cause scale-back of output signal strength, Alerts/Alarms, or thermal shutdown until the radio can cool down. In the short term, the CRMM system (300) may proactively monitor equipment and facility temperature to prevent overtemperature conditions. It is believed that repeated exposure to extreme temperature, for example, can present long-term issues, such as premature radio degradation or failures. In this regard, data collected by the CRMM system (300) may be used to schedule maintenance before those long-term issues present themselves.

In addition to sudden onset conditions, gradual changes in the operating parameters over time may also be informative. In this regard, the information collected in the CRMM system (300) for a given piece of equipment or facility may be monitored for drift in the operating parameters of the radios/equipment, such as (AGC), Squelch, PTT, and RF Power, as well as operating temperature (absolute or relative to rack temperatures), voltages, and telco for site-generic trending/tracking.

CRMM Process

Figure 11:
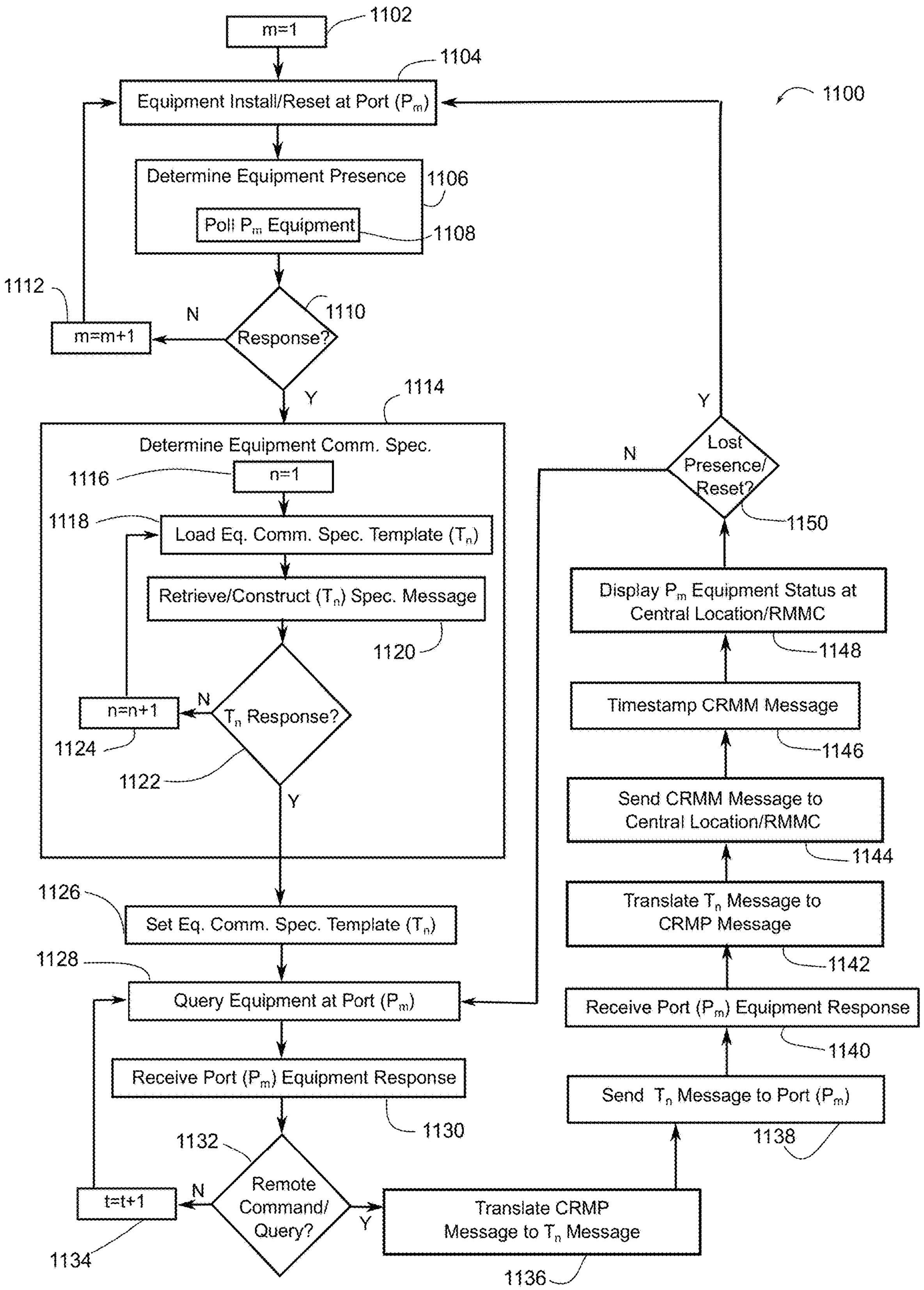
FIG. 11 is a diagram of a method for controlling remote communications equipment according to one embodiment.

Referring to FIG. 11, a process 1100 for monitoring and/or controlling equipment in a CRMM system (300) may generally begin at step 1106 by detecting the presence of equipment each time an item of equipment is connected and/or reconnected (reset) at step 1104 to a CRMP (301). As discussed above, a CRMP (301) may monitor a rack of communication equipment, which may include eight radios with a corresponding number of AC and DC Control/Detect modules (313*a*, 313*b*), via a communication port for each item of equipment being monitored/controlled. In this regard, the CRMP (301) may determine equipment presence individually for each of its communication port ($P_m$, where m is 1 to the number of communication ports in a CRMP), each time the equipment is connected/reconnected to a given CRMP port. In one embodiment, equipment presence is determined periodically by the CRMP (301) by sending at step 1108 a polling message to each port $P_m$. If a response to the polling message is not received at 1110, the CRMP (301) incrementally polls the next available CRMP (301) port ($P_{m+1}$) at step 1112.

As discussed above, the CRMP (301) may monitor radios and equipment that use a plurality of different equipment communication specifications. In this embodiment, once equipment presence is detected, the CRMP (301) may determine at step 1114 which specification from a plurality of available specifications to use to communicate with equipment connected to a given CRMP (301) port ($P_m$). As also discussed above, this may be achieved by sending queries to the newly connected/reconnected equipment in each of the communications specifications in succession until the equipment responds with a valid response message that is responsive to the particular request.

The cycling through the list of available specifications may be accomplished with a set of messages each formatted according to one of the available equipment communication specifications. In this embodiment, the CRMP (301) may retrieve and send to the equipment at port $P_m$ a pre-constructed request message at step 1120. If a valid response is not received at step 1122, the CRMP (301) incrementally selects and sends the next pre-constructed request message to the equipment at port $P_m$, at step 1124. The process generally repeats until either a valid response is received at step 1122 or until the CRMP (301) cycles through n iterations of the request message, where n is 1 to the total number of available equipment specifications. The applicable equipment communication specification may also be determined using specification templates ($T_n$). In this embodiment, the system (300) may load each of the templates $T_n$, step 1118, construct and send request messages according to template $T_n$, step 1120, and incrementally cycle through all the constructed messages, as needed, until a valid/responsive response from the equipment is received at step 1122.

Once determined, the applicable specification and/or specification template $T_n$ may be set at step 1126. Thereafter, subsequent communications between the given equipment and the CRMP (301), including queries and responses at steps 1128 and 1130, respectively, may be formatted according to the set specification/template $T_n$.

As discussed herein, the CRMP (301) may for a given item of equipment at port $P_m$ receive queries and commands from the central location, which may be in a CRMP message format. If at step 1132 the equipment communication specification format is different than the CRMP message format, the system (300), e.g., as the CRMP (301), may translate the CRMP message at step 1136 into a format compatible with the applicable specification/template $T_n$ of the equipment connected to the CRMP (301) via ports $P_m$. To this end, the CRMP (301) may at step 1136 translate, e.g., parse, transcribe, and/or transliterate, the elements of the CRMP message into the applicable specification/specification template $T_n$. Translated messages may be sent to the applicable equipment at port $P_m$ at step 1138 and responses may be received by the CRMP (301) at step 1140. Responses may conversely be translated into CRMP messages at 1142 for communication by the CRMP (301) at step 1144 to the central location. The messages may be timestamped at 1146 by the CRMP (301) based on timestamp information from the Data Manager (325). The status of the equipment at port $P_m$ may be available and/or displayed at the central location, such as the RMMC, at step 1148. When presence is lost at any one of the CRMP ports $P_m$, the process may be repeated for each item of equipment connected/reconnected to the CRMP (301) at port $P_m$ at step 1150, as shown.

Although a few example implementations have been described in detail above, these should not be construed as limitations on the scope of what may be claimed, but rather as descriptions of features that may be specific to particular embodiments. Thus, other modifications and embodiments are possible and are within the scope of the appended claims and equivalents thereof. In addition to the foregoing, it will also be understood that the logic flows and actions recited in the depicted figures and recited in the claims do not require the particular order shown, or in sequential order claimed, and may be performed in a different order and still achieve desirable results.

No language in the specification should be construed as indicating any non-claimed element as essential to the practice of the techniques of this disclosure. The terms "a" and "an" are used interchangeably above, and are equivalent to the phrase "one or more" as utilized in the present application. The terms "comprising", "having", "including", and "containing" are to be construed as open-ended terms (i.e., meaning "including, but not limited to") unless otherwise noted above. The recitation of any ranges of values herein is merely intended to serve as a shorthand technique of referring individually to each separate value falling within the range, unless otherwise indicated herein, and each separate value is incorporated into the specification as if it were individually recited. The use of any and all examples, or example language (e.g., "such as"), provided herein is intended merely to better illuminate the disclosure and does not impose a limitation on the scope of the disclosure unless otherwise claimed. Use of the language "at least one of" will be understood to refer to any combination of the listed items, including only a single item. For example, "at least one of A or B" is intended to include only A, only B, or both A and B, as well as multiples of the same item (e.g., A-A-A, A-A-B, A-B-B, etc.) Finally, any papers and publications cited herein are hereby incorporated by reference in their entirety.

We claim:

1. A system for remotely monitoring communications equipment, comprising:

at least one communications remote monitoring panel (CRMP) operatively coupled to a plurality of radios, the at least one CRMP configured for transmitting and receiving messages comprising queries for information relating to radio functionality to and information responsive to the queries for information from the plurality of radios using one of a plurality of communication specifications, comprising a first communication specification and a second communication specification different from the first communication specification, wherein a first of the plurality of radios is configured to communicate using the first communication specification and a second of the plurality of radios is configured to communicate using the second communication specification, and wherein the at least one CRMP is further configured to determine, for each of at least the first radio and the second radio, an applicable communication specification, from the plurality of communications specifications, for communicating with the first radio and second radio, and to transmit the messages to the first radio and the second radio using an applicable communication specification.

2. The system of claim 1, wherein configured to determine the applicable communication specification for communicating with a radio, comprises configured to:

detect presence of each of the plurality of radios coupled to the at least one CRMP, in response to detecting radio presence, send a first query in each of the plurality of communications specifications to a present radio in succession until a valid response from the present radio is received, and in response to receiving the valid response from the present radio, set the applicable communication specification for any further queries from the at least one CRMP to the present radio to that communication specification associated with the valid response.

3. The system of claim 2, wherein the at least one CRMP comprises a plurality of communication ports, each of the plurality of radios is coupled to the at least one CRMP using one of the plurality of the commination ports, and wherein the applicable communication specification is set for a given communication port until equipment presence at the given communication port is disrupted.

4. The system of claim 2, wherein a valid response includes at least one of a radio type and serial number.

5. The system of claim 1, wherein the first communication specification differs from the second specification with respect to at least one parameter selected from the group consisting of: baud rate, message data structure, and message syntax.

6. The system of claim 1, further comprising a data manager (DM) coupled over a communication network to the at least one CRMP, the at least one CRMP and DM configured to communicate messages between each other in a third communication specification different than the first and second communication specifications, the at least one CRMP further configured to translate first and second communications specification messages into third communication specification messages.

7. The system of claim 6, wherein the DM is coupled to the at least one CRMP at least partially via a serial connection, and wherein the at least one CRMP is coupled to at least one of the plurality of radios via an Ethernet connection or via another serial connection.

8. The system of claim 7, wherein the third communication specification uses a plurality of message types, each having a different data structure.

9. The system of claim 8, wherein at least one of the plurality of message types has a variable data structure.

10. The system of claim 9, wherein the variable data structure comprises at least one slot having at least one bit for indicating presence of information for an item of equipment coupled to the at least one CRMP, and wherein when presence of information is indicated, the variable data structure includes at least one optional slot for information relating to the present item of equipment.

11. The system of claim 10, wherein when presence of information is indicated for a first item of equipment, the variable data structure includes one optional slot for information relating to the first item of equipment, and when presence information is indicated for a second item of equipment, the variable data structure includes a plurality of optional slots for information relation to the second item of equipment.

12. The system of claim 10, wherein the variable data structure comprises one-byte slots, and wherein presence of information is indicated for each item of equipment coupled to the CRMP using at least one bit of a given one-byte slot.

13. The system of claim 12, wherein the at least one CRMP comprises a plurality of communication ports, each of a plurality of items of equipment is coupled to the at least one CRMP using one of the plurality of the commination ports, and wherein the given one-byte slot comprises a plurality of one-bit presence of information indications, each of the one-bit presence of information indications corresponding to one of the plurality of the communication ports.

14. The system of claim 13, wherein the first radio is coupled to the at least one CRMP via a first audio port and the second radio is coupled to the at least one CRMP via a second audio port, and wherein the variable data structure includes at least one slot for audio presence information for each of the first and second radios.

15. The system of claim 13, wherein the first radio is coupled to the at least one CRMP via a first communication port and the second radio is coupled to the at least one CRMP via a second communication port, the message type comprises a radio data message having a variable data structure that includes at least one optional slot, and wherein one of the plurality of one-bit presence of information indications is associated with the first radio and another of the plurality of one-bit presence of information indications is associated with the second radio, and wherein the at least one optional slot includes status information when present for each of the first and second radios.

16. The system of claim 15, wherein at least one item of the plurality of items of equipment comprises a power control and detect module that supplies individually switched power to the first radio and the second radio, and that is communicatively coupled to the at least one CRMP to exchange power control and status messages for each of the first radio and the second radio, wherein the first radio is coupled to the at least one CRMP via a third communication port and the second radio is coupled to the at least one CRMP via a fourth communication port, wherein the at least one optional slot includes power status information for each of the first and second radios based on information from the power control and detect module.

17. The system of claim 16, the at least one CRMP further configured to communicate command messages to the plurality of items of equipment connected to the at least one CRMP, wherein commands to switch power to radios monitored by the CRMP are relayed to the power control and detect module for individually switching power to the radios connected thereto, and commands to reset radios are relayed to radio to be reset.

18. The system of claim 7, comprising a terminal server (TS) communicatively coupled to the at least one CRMP and the DM, wherein the TS is coupled to the DM via an Ethernet connection, and wherein the TS is configured to encapsulate third communication specification messages and transmit third communication specification messages to the DM via an Ethernet protocol.

19. The system of claim 7, comprising at least one remote maintenance monitoring and control (RMMC) computer communicatively coupled to the DM, the RMMC computer configured to communicate queries and commands to the at least one CRMP for remotely monitoring and controlling the plurality of radios, and to cause to be displayed at at least once workstation a graphic user interface with form elements therein for users to remotely query and control the plurality of radios coupled to the CRMP.

20. The system of claim 19, wherein the commands comprise at least one of instructions to factory reset radios, warm reset radios, and switch power to radios, and wherein the queries comprise at least one of radio status, radio parameters, power status, event log queries, radio activity, CRMP status, temperature, and voltage measurements.

* * * * *